(12) United States Patent
Kutz et al.

(10) Patent No.: US 11,990,997 B2
(45) Date of Patent: May 21, 2024

(54) COMMUNICATION RESOURCE ALLOCATION FOR RATELESS CODING

(71) Applicant: QUALCOMM Incorporated, San Diego, CA (US)

(72) Inventors: Gideon Shlomo Kutz, Ramat Hasharon (IL); David Yunusov, Holon (IL); Tal Oved, Modiin (IL); Assaf Touboul, Netanya (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/529,226

(22) Filed: Nov. 17, 2021

(65) Prior Publication Data
US 2023/0155728 A1    May 18, 2023

(51) Int. Cl.
*H04L 1/00* (2006.01)
(52) U.S. Cl.
CPC ................. *H04L 1/0058* (2013.01)
(58) Field of Classification Search
None
See application file for complete search history.

(56) References Cited

U.S. PATENT DOCUMENTS

| | | | | |
|---|---|---|---|---|
| 2002/0184373 A1* | 12/2002 | Maes | ....................... | H04L 65/70 704/E15.047 |
| 2010/0208716 A1* | 8/2010 | Mujtaba | ................. | H04L 1/0606 375/261 |
| 2011/0200088 A1* | 8/2011 | Koslov | ................. | H04L 1/0003 375/228 |
| 2012/0213307 A1* | 8/2012 | Perry | ..................... | H04B 15/00 375/296 |
| 2017/0332400 A1* | 11/2017 | Kowalski | .............. | H04L 1/0003 |
| 2019/0081727 A1* | 3/2019 | Feng | ....................... | H04L 1/203 |
| 2020/0153570 A1* | 5/2020 | Peng | ..................... | H04L 5/0021 |

OTHER PUBLICATIONS

'Spinal Codes', Jonathan Perry, Peter A. Iannucci, Kermin E. Fleming, Hari Balakrishnan, and Devavrat Shah, Massachusetts Institute of Technology, Cambridge, Mass., USA, ACM SIGCOMM Computer Communication Review 42.4 (2012): 49-60.

* cited by examiner

*Primary Examiner* — Lonnie V Sweet
(74) *Attorney, Agent, or Firm* — Arun Swain

(57) ABSTRACT

This disclosure provides systems, methods and apparatus, including computer programs encoded on computer storage media, for mapping coding indices associated with a rateless coding scheme to respective sets of communication resources over which a transmitting device may perform transmissions of portions of a message corresponding to each of the coding indices. In some aspects, for example, different coding indices may correspond to different cumulative portions of the message and the transmitting device may transmit a first cumulative portion of the message corresponding to a first coding index over a first set of communication resources to which the first coding index is mapped. The transmitting device may signal an indication of such a resource mapping scheme to a receiving device and the receiving device may attempt to decode transmissions of one or more cumulative portions of the message using the indicated resource mapping scheme.

24 Claims, 15 Drawing Sheets

COMMUNICATION RESOURCE ALLOCATION FOR RATELESS CODING

TECHNICAL FIELD

This disclosure relates to wireless communications, including communication resource allocation for rateless coding.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a wireless device. The method may include receiving an indication of a resource mapping scheme associated with a rateless coding, where the rateless coding is associated with a set of multiple coding indices, where the resource mapping scheme indicates a respective set of communications resources for at least one coding index of the set of multiple coding indices, and receiving a message encoded in accordance with the rateless coding, where the message is received via the respective set of communications resources for a coding index of the set of multiple coding indices.

Another innovative aspect of the subject matter described in this disclosure can be implemented in an apparatus for wireless communications at a wireless device. The apparatus may include an interface and a processing system. The interface may be configured to obtain an indication of a resource mapping scheme associated with a rateless coding, where the rateless coding is associated with a set of multiple coding indices, where the resource mapping scheme indicates a respective set of communications resources for at least one coding index of the set of multiple coding indices, and obtain a message encoded in accordance with the rateless coding, where the message is received via the respective set of communications resources for a coding index of the set of multiple coding indices.

Another innovative aspect of the subject matter described in this disclosure can be implemented in an apparatus for wireless communications at a wireless device. The apparatus may include a processor, memory coupled with the processor, and instructions stored in the memory. The instructions may be executable by the processor to cause the apparatus to receive an indication of a resource mapping scheme associated with a rateless coding, where the rateless coding is associated with a set of multiple coding indices, where the resource mapping scheme indicates a respective set of communications resources for at least one coding index of the set of multiple coding indices, and receive a message encoded in accordance with the rateless coding, where the message is received via the respective set of communications resources for a coding index of the set of multiple coding indices.

Another innovative aspect of the subject matter described in this disclosure can be implemented in another apparatus for wireless communications at a wireless device. The apparatus may include means for receiving an indication of a resource mapping scheme associated with a rateless coding, where the rateless coding is associated with a set of multiple coding indices, where the resource mapping scheme indicates a respective set of communications resources for at least one coding index of the set of multiple coding indices, and means for receiving a message encoded in accordance with the rateless coding, where the message is received via the respective set of communications resources for a coding index of the set of multiple coding indices.

Another innovative aspect of the subject matter described in this disclosure can be implemented in a non-transitory computer-readable medium storing code for wireless communications at a wireless device. The code may include instructions executable by a processor to receive an indication of a resource mapping scheme associated with a rateless coding, where the rateless coding is associated with a set of multiple coding indices, where the resource mapping scheme indicates a respective set of communications resources for at least one coding index of the set of multiple coding indices, and receive a message encoded in accordance with the rateless coding, where the message is received via the respective set of communications resources for a coding index of the set of multiple coding indices.

In some implementations of the method, apparatuses, and non-transitory computer-readable medium described herein, receiving the indication of the resource mapping scheme may include operations, features, means, or instructions for receiving an indication that each coding index of the set of multiple coding indices may be associated with a real component and an imaginary component of a modulation constellation.

In some implementations of the method, apparatuses, and non-transitory computer-readable medium described herein, receiving the indication of the resource mapping scheme may include operations, features, means, or instructions for receiving an indication that each coding index of a first subset of the set of multiple coding indices may be associated with a real component of a modulation constellation and that each coding index of a second subset of the set of multiple coding indices may be associated with an imaginary component of the modulation constellation.

In some implementations of the method, apparatuses, and non-transitory computer-readable medium described herein, receiving the indication of the resource mapping scheme may include operations, features, means, or instructions for receiving an indication that each coding index of the set of multiple coding indices may be associated with a set of multiple spatial layers.

In some implementations of the method, apparatuses, and non-transitory computer-readable medium described herein, receiving the indication of the resource mapping scheme may include operations, features, means, or instructions for receiving an indication that each coding index of a first subset of the set of multiple coding indices may be associated with a first set of one or more spatial layers and that each coding index of a second subset of the set of multiple coding indices may be associated with a second set of one or more spatial layers.

One innovative aspect of the subject matter described in this disclosure can be implemented in a method for wireless communications at a wireless device. The method may include transmitting an indication of a resource mapping scheme associated with a rateless coding, where the rateless coding is associated with a set of multiple coding indices, and where the resource mapping scheme indicates a respective set of communications resources for at least one coding index of the set of multiple coding indices, and transmitting a message encoded in accordance with the rateless coding, where the message is transmitted using the respective set of communications resources for a coding index of the set of multiple coding indices.

Another innovative aspect of the subject matter described in this disclosure can be implemented in an apparatus for wireless communications at a wireless device. The apparatus may include an interface and a processing system. The interface may be configured to output an indication of a resource mapping scheme associated with a rateless coding, where the rateless coding is associated with a set of multiple coding indices, and where the resource mapping scheme indicates a respective set of communications resources for at least one coding index of the set of multiple coding indices, and output a message encoded in accordance with the rateless coding, where the message is transmitted using the respective set of communications resources for a coding index of the set of multiple coding indices.

Another innovative aspect of the subject matter described in this disclosure can be implemented in an apparatus for wireless communications at a wireless device. The apparatus may include a processor, memory coupled with the processor, and instructions stored in the memory. The instructions may be executable by the processor to cause the apparatus to transmit an indication of a resource mapping scheme associated with a rateless coding, where the rateless coding is associated with a set of multiple coding indices, and where the resource mapping scheme indicates a respective set of communications resources for at least one coding index of the set of multiple coding indices, and transmit a message encoded in accordance with the rateless coding, where the message is transmitted using the respective set of communications resources for a coding index of the set of multiple coding indices.

Another innovative aspect of the subject matter described in this disclosure can be implemented in another apparatus for wireless communications at a wireless device. The apparatus may include means for transmitting an indication of a resource mapping scheme associated with a rateless coding, where the rateless coding is associated with a set of multiple coding indices, and where the resource mapping scheme indicates a respective set of communications resources for at least one coding index of the set of multiple coding indices, and means for transmitting a message encoded in accordance with the rateless coding, where the message is transmitted using the respective set of communications resources for a coding index of the set of multiple coding indices.

Another innovative aspect of the subject matter described in this disclosure can be implemented in a non-transitory computer-readable medium storing code for wireless communications at a wireless device. The code may include instructions executable by a processor to transmit an indication of a resource mapping scheme associated with a rateless coding, where the rateless coding is associated with a set of multiple coding indices, and where the resource mapping scheme indicates a respective set of communications resources for at least one coding index of the set of multiple coding indices, and transmit a message encoded in accordance with the rateless coding, where the message is transmitted using the respective set of communications resources for a coding index of the set of multiple coding indices.

In some implementations of the method, apparatuses, and non-transitory computer-readable medium described herein, transmitting the indication of the resource mapping scheme may include operations, features, means, or instructions for transmitting an indication that each coding index of the set of multiple coding indices may be associated with a real component and an imaginary component of a modulation constellation.

In some implementations of the method, apparatuses, and non-transitory computer-readable medium described herein, transmitting the indication of the resource mapping scheme may include operations, features, means, or instructions for transmitting an indication that each coding index of a first subset of the set of multiple coding indices may be associated with a real component of a modulation constellation and that each coding index of a second subset of the set of multiple coding indices may be associated with an imaginary component of the modulation constellation.

In some implementations of the method, apparatuses, and non-transitory computer-readable medium described herein, transmitting the indication of the resource mapping scheme may include operations, features, means, or instructions for transmitting an indication that each coding index of the set of multiple coding indices may be associated with a set of multiple spatial layers.

In some implementations of the method, apparatuses, and non-transitory computer-readable medium described herein, transmitting the indication of the resource mapping scheme may include operations, features, means, or instructions for transmitting an indication that each coding index of a first subset of the set of multiple coding indices may be associated with a first set of one or more spatial layers and that each coding index of a second subset of the set of multiple coding indices may be associated with a second set of one or more spatial layers.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
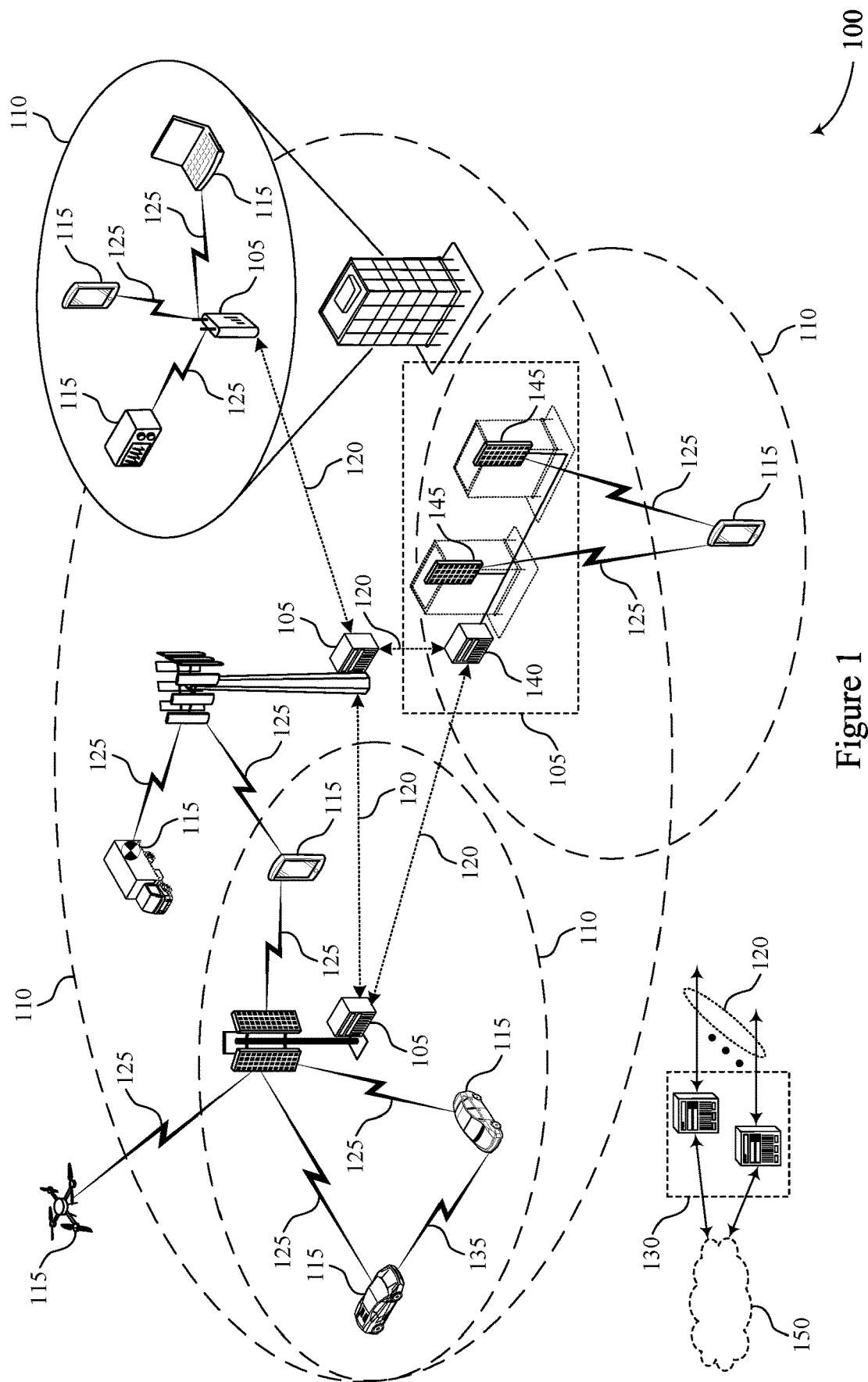
FIG. 1 shows an example wireless communications system that supports communications resource allocation for rateless coding.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some wireless communications systems, communicating devices may use a rateless coding scheme, such as a spinal coding scheme, for rate adaptation that avoids relying on channel state information (CSI) reference signal (CSI-RS) measurements and reports, among other channel estimation techniques. Such rate adaptation using a rateless coding scheme may enable communicating devices to more-efficiently approach a channel capacity in terms of bit rate or channel rate, including for frequency selective or time selective channels. Some rateless coding schemes, including a spinal coding scheme, may include multiple coding stages across which different cumulative portions of a message are encoded or decoded. In some systems, communicating devices may communicate over imperfect channels, such as fading channels, or may be capable of multiple-input multiple output (MIMO) communication, but such systems may lack signaling mechanisms or encoding and decoding procedures to support a reliable use of spinal coding techniques, which may be associated with joint encoding and modulation and joint decoding and demodulation, over such imperfect channels or for multi-layer MIMO communication.

In some implementations of the present disclosure, a transmitting device and a receiving device may support a resource mapping scheme according to which each device may be aware of how coding indices associated with a spinal coding scheme map to respective sets of communication resources. Accordingly, the devices may communicate (such as transmit or receive) messages encoded using the spinal coding scheme and in accordance with the resource mapping scheme. In some aspects, such a resource mapping scheme may indicate how an output of a coding index corresponds to a modulation constellation, a component of a modulation constellation, to one or more spatial layers, or to one or more channel uses, or various combinations thereof. A transmitting device may transmit an indication of a resource mapping scheme to a receiving device and, in some implementations, may select a resource mapping scheme in accordance with specific channel conditions (such as in accordance with a signal-to-noise ratio (SNR) of a channel or a fading channel) or specific deployment scenarios (such as a deployment scenario involving MIMO communication). The implementations described herein further include techniques for encoding and decoding messages communicated in accordance with various resource mapping schemes, including resource mapping schemes involving a mapping of two or more coding indices to a single channel use.

Particular implementations of the subject matter described in this disclosure can be implemented to realize one or more of the following potential advantages. For example, as a result of selecting a resource mapping scheme in accordance with specific channel conditions or a specific deployment scenario, and exchanging signaling associated with a resource mapping scheme selection, communicating devices may achieve more reliable or robust communication via spinal coding across various channel conditions and deployment scenarios. For instance, communicating devices may leverage a resource mapping scheme to overcome adverse impacts associated with an imperfect channel, such as a fading channel, or to extend implementation of spinal coding to MIMO communication, or both. As a result, the application of spinal code may be made possible for fading and MIMO channels. The communication over these channels may therefore achieve greater reliability and robustness or extension to MIMO communication, which may support higher data rates, greater spectral efficiency, lower latency, and longer battery life associated with affordable complexity and coding costs, among other benefits. Further, some aspects of the present disclosure can be implemented to simplify or limit a complexity of a MIMO channel, which may support reduced decoding costs.

FIG. 1 shows an example wireless communications system 100 that supports communications resource allocation for rateless coding. The wireless communications system 100 may include one or more base stations (BSs) 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or another interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (such as a duration of one modulation symbol) and one subcarrier, where the symbol period and subcarrier spacing are inversely related. The quantity of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105). In various implementations, a BS 105, or an access network entity 140, or a core network 130, or some subcomponent thereof, may be referred to as a network entity.

As described herein, a BS 105 may include one or more components that are located at a single physical location or one or more components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 (also known as a monolithic BA) or a BS 105 including components that are located at various physical locations or virtualized locations (also known as a disaggregated BS). In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (or centralized unit CU), a distributed unit (DU), or a radio unit (RU).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a CA configuration in conjunction with component carriers operating in a licensed band (such as LAA). Operations in unlicensed spectrum may include downlink transmissions, uplink transmissions, P2P transmissions, or D2D transmissions, among other transmissions.

ABS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (such as antenna panels) to conduct beamforming operations for directional communications with a UE 115. Some signals (such as synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (such as by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (such as a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (such as by a BS 105 or a UE 115) may be performed using multiple beam directions, and the device may use a combination of digital precoding or radio frequency beamforming to generate a combined beam for transmission (such as from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (such as when receiving a data signal). The single receive configuration may be aligned in a beam direction determined based on listening according to different receive configuration directions (such as a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some implementations, communicating devices may employ an incremental redundancy scheme, such as a multi-incremental redundancy scheme (MIRS), which also may be referred to as an MRS, to reduce a gap between a suitable or optimal link adaptation and link adaptation performance associated with some other schemes. In some aspects, an MIRS may be associated with rateless codes to achieve better performance across coding rates (and IR-HARQ transmissions) relative to fixed rate codes such as low-density parity-check (LDPC) codes. Further, in addition to rate selection (such as an MCS selection), a device may employ an MIRS to facilitate selection of a precoding matrix indicator (PMI) and a rank indicator (RI).

Further, a device, using an MIRS, may rely on usage of IR-HARQ for rate or link adaptation instead of attempting to predict a channel capacity (such as via a CSI-RS measurement). For example, a transmitting device employing an MIRS may perform a first transmission corresponding to or using a highest speculated, assumed, or possible MCS for a current channel (such that if multiple options exist, the device may select a highest MCS of the multiple options) and may add a relatively small amount of redundancy for each subsequent transmission (such as each subsequent retransmission) if the first transmission fails. The transmitting device may terminate or stop transmissions (such as retransmissions) once a message is successfully decoded at a receiving device (in accordance with continuous ACK/NACK being sent to the transmitting device from the receiving device). The transmitting device may optionally use the continuous ACK/NACK received from the receiving device to adjust a wideband precoding associated with the transmitted message. In accordance with or as a result of using an MIRS, communicating devices may communicate at a code rate which is at or near a capacity (such as an upper limit code rate supported by a channel) regardless of mobility level of the communicating devices.

A transmitting device may employ different types of MIRS, including a first type associated with an adaptive MCS in accordance with an MIRS principle with fixed precoding and a second type associated with an adaptive MCS in accordance with an MIRS principle with variable precoding (such as a variable precoding facilitated by continuous feedback). In some implementations, a transmitting device may achieve a higher data rate using an MIRS as compared to a baseline selection of a highest MCS that is fixed in a CSI interval. For example, the first type of MIRS associated with a fixed precoding scheme may result in similar MCS selection at some velocities (such as a velocity of approximately 10 kilometers per hour) and more suitable MCS selection for relatively higher velocities (such as velocities greater than approximately 10 kilometers per hour) because MIRS may provide ACK/NACK per codeblock. Further, the second type of MIRS associated with an adaptive precoding may result in a higher data rate (such as by an approximately 0.6-3.1 dB gain) as compared to a baseline selection of a highest transmission power for a precoding that is fixed in a CSI interval.

Some systems, such as the wireless communications system 100, may support rateless coding schemes. Such rateless coding schemes may be associated with a rate adaptation technique that does not rely on CSI-RS-based adaptations, and may allow communicating devices, such as one or more UEs 115 or one or more components of a BS 105, to achieve or approach channel capacity even in high mobility scenarios. For example, rateless coding schemes may provide a greater capability of bit loading to approach capacity in frequency selective or time selective channels. Even for additive white Gaussian noise (AWGN), for example, rateless coding schemes may achieve higher data rates as compared to fixed rate systems (due, in part, to a hedging effect).

In some aspects, the wireless communications system 100 may implement an MIRS to support rateless coding schemes. For example, to capitalize on potential use implementations for an MIRS, communicating devices may incorporate rateless codes with the MIRS adaptation scheme. The wireless communications system 100 may support one or more types of rateless codes, including spinal codes. In some aspects, communicating devices may use a pre-defined or pre-configured puncturing scheme to support rate adaptation for rateless codes and may support one or more signaling mechanisms for exchanging information associated with a puncturing scheme or updates to a puncturing scheme.

In some implementations, a rateless code may be associated with a cumulative or sequential encoding of a set of message segments. For example, as part of a rateless coding scheme, a transmitting device may partition or segment a message into a set of message segments and may cumulatively encode the message across multiple stages or indices of the rateless coding scheme (each stage involving an encoding with an additional next message segment). As such, different coding indices may correspond to different quantities of encoded message segments and a transmitting device may transmit one or more signals associated with one or more coding indices in accordance with a puncturing scheme.

In some implementations of the wireless communications system 100, communicating devices may support a resource mapping scheme to map one or more coding indices to communication resources, such as modulation constellations, portions of modulation constellations, a quantity of spatial layers, or any combination thereof. Such a resource mapping scheme may facilitate an extension of spinal codes (which may be associated with joint encoding and modulation and joint decoding and demodulation), to some channel types or conditions (such as fading channels) or to MIMO settings while maintaining signal quality and reliability. In some implementations, a transmitting device may transmit an indication of a resource mapping scheme to a receiving device. Additionally, or alternatively, a resource mapping scheme may be pre-configured (such as pre-loaded) at a transmitting device and a receiving device. The transmitting device may encode a message in accordance with a spinal coding scheme, mapping symbol values of one or more coding indices to one or more modulation constellations, to one or more components or portions of a modulation constellation, to a quantity of layers, or to a quantity of channel uses, or any combination thereof, in accordance with a resource mapping scheme, and may transmit the encoded message over communication resources in accordance with the mapping (and, in some implementations, in accordance with a transmission puncturing scheme).

Figure 2:
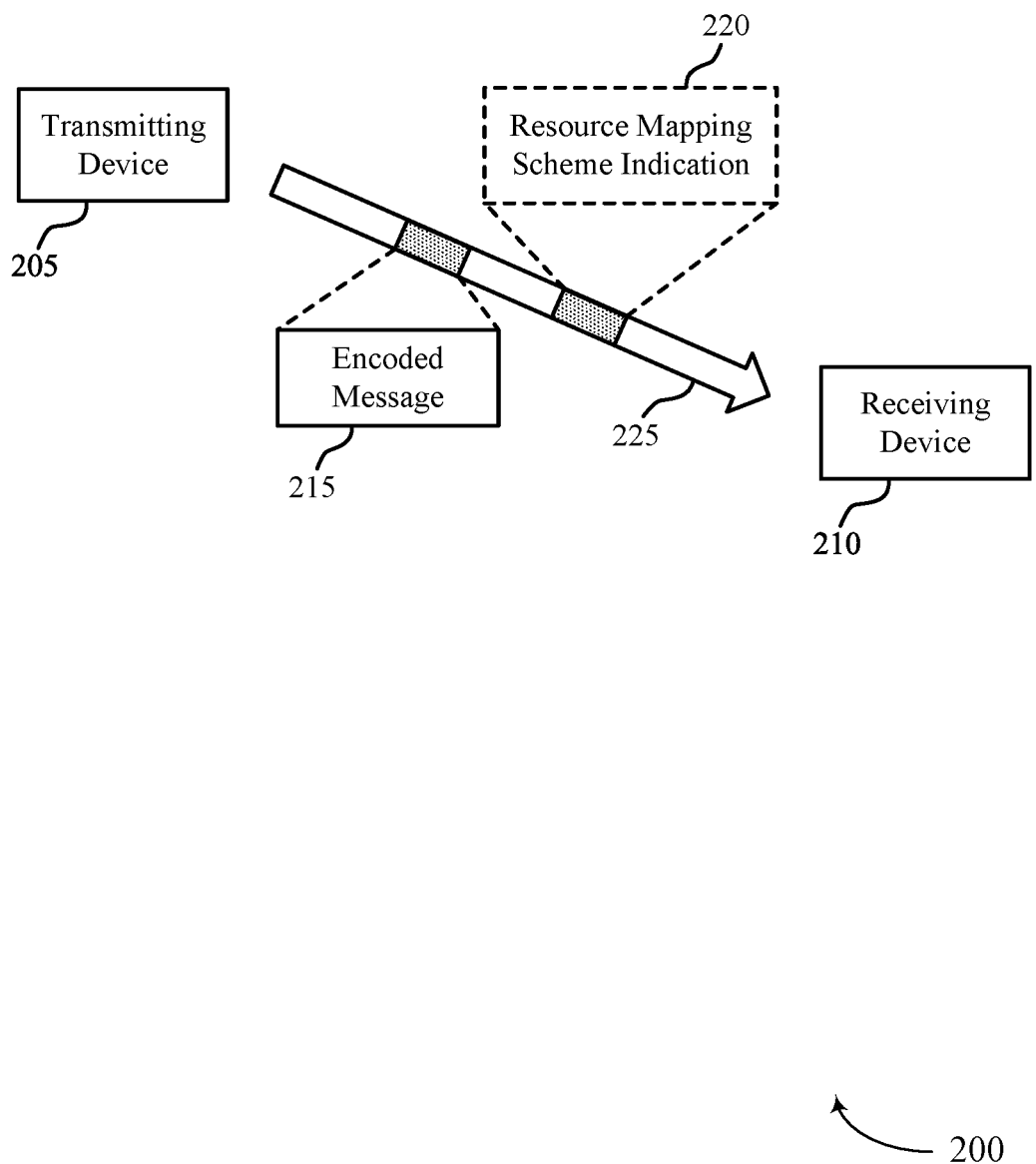
FIG. 2 shows an example signaling diagram that supports communications resource allocation for rateless coding.

FIG. 2 shows an example signaling diagram 200 that supports communications resource allocation for rateless coding. The signaling diagram 200 may implement or be implemented to realize aspects of the wireless communications system 100. For example, the signaling diagram 200 illustrates communication between a transmitting device 205 and a receiving device 210. A transmitting device 205 may be an example of any device capable of wireless communication and, as such, may be an example of a UE 115, one or more components of a BS 105, a TRP, a small cell, or a relay node, among other examples, which may perform one or more aspects of encoding and transmitting a message in accordance with examples as disclosed herein. A receiving device 210 may be an example of any device capable of wireless communication and, as such, may be an example of a UE 115, one or more components of a BS 105, a TRP, a small cell, or a relay node, among other examples, which may perform one or more aspects of receiving and decoding a message in accordance with examples as disclosed herein. In some implementations, a transmitting device 205 and a receiving device 210 may employ a rateless coding scheme, such as a spinal coding scheme, and may support a resource mapping scheme to map coding indices associated with the rateless coding scheme to various communication resources.

Some rateless coding techniques, such as techniques involving spinal codes, may be associated with joint demodulation and decoding and some systems may support rateless coding for channels associated with specific conditions or on a single spatial layer. For example, some systems may support rateless coding for AWGN channels. In some aspects, devices in such systems may assume AWGN to facilitate (such as to be able to assume or expect) orthogonality between different components of a modulation constellation (which may be equivalently referred to herein as components of a modulation symbol or constellation point) in a modulation process. In other words, devices in such systems may assume AWGN to be able to assume or expect orthogonality between an in-phase (I) component and a quadrature (Q) component of a modulation constellation, among other orthogonal axes of a modulation system.

For some channel types or conditions, devices may be unable to assume orthogonality between components of a modulation constellation, such as orthogonality between an I component and a Q component. For example, for a fading channel, an I component and a Q component of a modulation constellation may not be orthogonal. In some systems, a lack of orthogonality may result in or be associated with increased demodulation and decoding complexity. Further, for some deployment scenarios (such as deployment scenarios associated with relatively higher order constellations or MIMO communication), a search space that a receiving device 210 may monitor for a signal sent from a transmitting device 205 may be prohibitively large, which may result in or be associated with increased demodulation and decoding complexity.

In some implementations, a transmitting device 205 and a receiving device 210 may support an extension of rateless codes to fading channels, MIMO channels, or higher order modulations in an affordable complexity, which may include corresponding signaling and physical layer procedures associated with the extension. As such, a transmitting device 205 and a receiving device 210 may reliably use rateless codes, such as a spinal code, for communicating in diverse conditions or deployment scenarios, which may be suitable for some systems (such as an NR system). In some implementations, and to achieve such an extension of rateless codes to diverse channel conditions or deployment scenarios, a transmitting device 205 and a receiving device 210 may support a resource mapping scheme according to which one or more coding indices associated with a rateless coding are mapped to one or more communication resources, such as one or more modulation constellations, one or more components of a modulation constellation, a quantity of layers, a quantity of channel uses, or any combination thereof.

In some aspects, a transmitting device 205 may configure the resource mapping scheme and may transmit a resource mapping scheme indication 220 to a receiving device 210 (to facilitate system-wide awareness of the resource mapping scheme) via a communication link 225. Additionally, or alternatively, a transmitting device 205 and a receiving device 210 may be pre-configured with one or more resource mapping schemes. A transmitting device 205 and a receiving device 210 may support a signaling or pre-configuration of one resource mapping scheme or multiple resource mapping schemes. In implementations in which a transmitting device 205 and a receiving device 210 support multiple resource mapping schemes, the transmitting device 205 and the receiving device 210 may select to use one of the multiple resource mapping schemes in accordance with signaling (such as a resource mapping scheme indication 220) or in accordance with a selection criteria (which may be implicit, such as being performed without a resource mapping scheme indication 220, or being assumed based on detected channel conditions or based on an indication sent by the receiving device 210 to the transmitting device 205).

Further, in some implementations, a transmitting device 205 may transmit, to a receiving device 210, an indication or configuration of a set of parameters associated with a resource mapping scheme. For example, a transmitting device 205 may transmit, to a receiving device 210, an indication of a parameter k associated with a quantity of bits per coding index (such as per spinal stage), a parameter k' associated with a quantity of basic bits per channel use (before puncturing), a parameter B associated with a quantity of bits per channel use after puncturing, a parameter C associated with a constellation size, a parameter L associated with a quantity of spatial layers, and an indication of a puncturing pattern, among other parameter signaling.

In some implementations, a parameter k may influence a maximum likelihood (ML) complexity, and a scanning size (at a receiving device 210) may be $2^k$ for each coding stage, such as each spinal stage of a spinal coding. In some implementations, k may be set or configured such that $1 \leq k \leq 5$ and may be associated with a capabilities of a receiving device 210 (such as a UE capability), which may be indicated to the transmitting device 205. In some aspects, a receiving device 210 may signal its search or scanning capabilities and a transmitting device 205 may encode a message accordingly (such that k is configured in accordance with the capability of the receiving device 210). Additionally, or alternatively, a value of k may be fixed, such as in a specification or communications standard.

The parameter k' may be applied for a concatenation of n consecutive k bits to a single channel use, such that k'=nk. In some implementations, k' may be set or configured such that $1 \leq k \leq k' \leq 4k$. In some aspects, the parameter k' may close a gap between scan complexity and capacity and may be pre-defined in a table according to SNR and rank (L) or may be associated with an initial assumption of channel capacity (if a first transmission in an MIRS or rateless system) together with a per-UE (or per receiving device) k definition. Additionally, or alternatively, k' may be signaled as part of a control signal, such as an RRC message or downlink control information (DCI), per receiving device 210 (such as per UE 115) in accordance with a capability of the receiving device 210 and any signaled CSI-RS feedback.

The parameter B may be associated with an overall channel capacity over a set of (such as all) MIMO layers. In some aspects, the parameter B may be dynamic. For example, a value of B may change for some (such as every) (re)transmissions associated with an encoded message 215 in accordance with an MIRS. In some aspects, B may start from an initial assumption on channel capacity (which may be associated with CSI-RS estimation value or MIRS overestimation value, or a value associated with a combination thereof) and may decrease per (re)transmission by differential MCS.

The parameter C may be associated with single-input single-output (SISO) communication and, for SISO, C may be configured such that $C \gg k'$. In some aspects, a value of C may be adaptive and associated with an initial B value. For example, for SISO, $C=x*B$, where x may sometimes be set equal to four. A value of x may be fixed (such as pre-configured or pre-loaded, or such as defined in a specification or communications standard) or may be signaled via a control signal, such as an RRC message or DCI.

The parameter L may sometimes be associated with MIMO communication and, for MIMO, L may be configured such that $C^L \gg k'$. In some aspects, L may be associated with a CSI-RS rank estimation or an optional over-estimation as may be used in an MRS, or a combination thereof. A value of L may be adaptive and associated with an initial B value. For example, for MIMO, $C^L=x*B$, where x may sometimes be set equal to four. A value of x may be fixed (such as pre-configured or pre-loaded, or such as defined in a specification or communications standard) or may be signaled via a control signal, such as an RRC message or DCI. Additionally, or alternatively, a value of C may be adaptive for each layer such that $\Pi_i C_i = x*B$. In such implementations, a transmitting device 205 and a receiving device 210 may support an extension to CSI-RS to report a ratio (such as a suitable or desirable ratio) of a constellation size between layers.

A transmitting device 205 may transmit, to a receiving device 210 via a communication link 225, an encoded message 215 in accordance with a rateless coding and a resource mapping scheme. For example, the transmitting device 205 may transmit the encoded message 215 (as encoded using a rateless coding) over a set of communication resources to which the transmitting device 205 has mapped one or more coding indices of the rateless coding (as specified by the resource mapping scheme). The receiving device 210 may likewise receive and attempt a decoding of the encoded message 215 over the set of communication resources to which the transmitting device 205 has mapped the one or more coding indices of the rateless coding. Additional details relating to example resource mapping schemes are illustrated by and described in more detail with reference to FIGS. 4 and 8-10.

Figure 3:
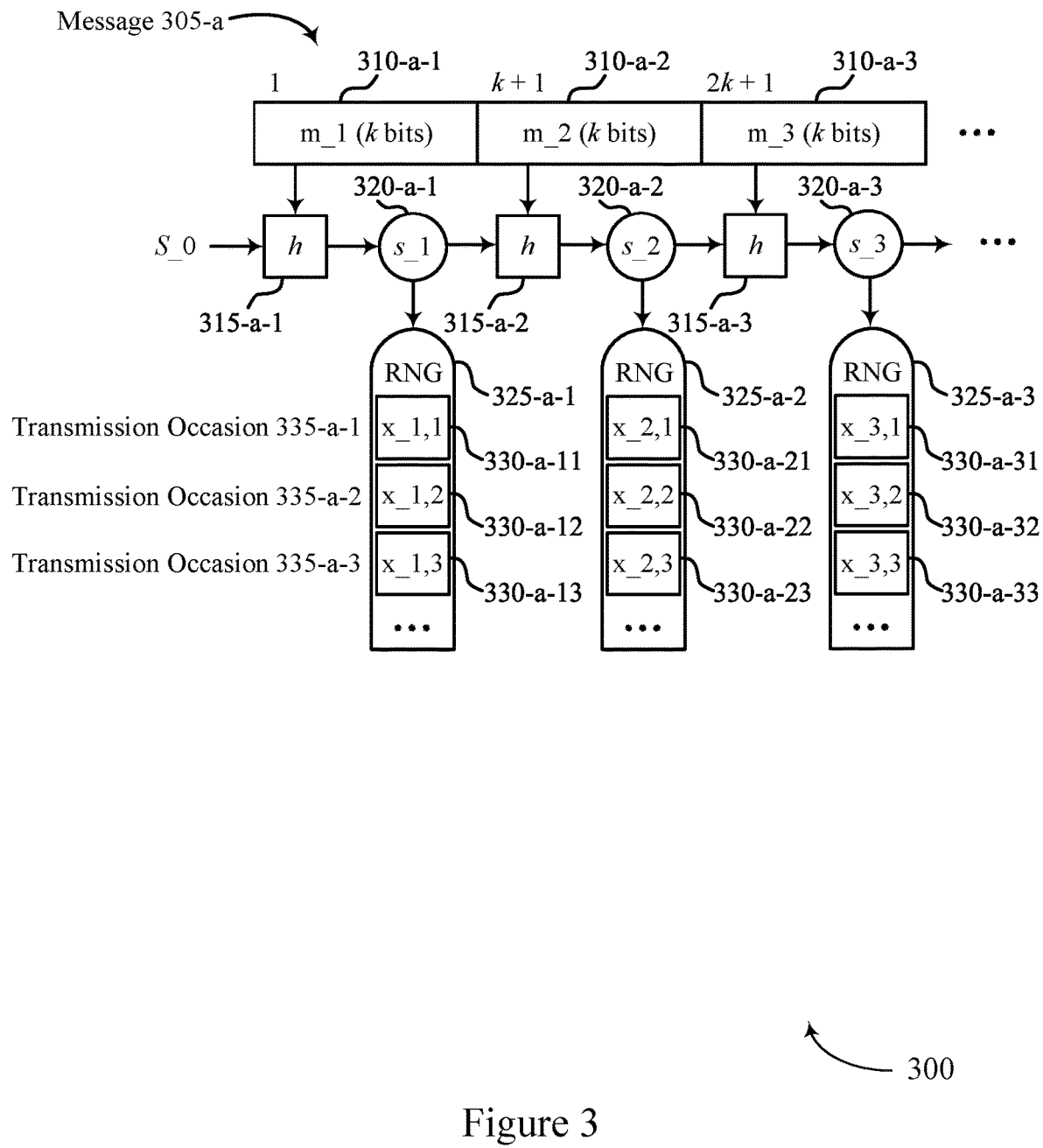
FIG. 3 shows an example rateless coding scheme that supports communications resource allocation for rateless coding.

FIG. 3 shows an example rateless coding scheme 300 that supports communications resource allocation for rateless coding. The rateless coding scheme 300 may be implemented to realize aspects of the wireless communications system 100 and the signaling diagram 200. For example, the rateless coding scheme 300 illustrates a sequential or cumulative coding of a message 305-$a$, such as a sequential or cumulative encoding of message segments 310. In some implementations, an encoder of a transmitting device 205 may calculate, obtain, or otherwise receive a spine 320 and a corresponding symbol value 330 for one or more of a set of coding stages of the rateless coding scheme 300, and may map the corresponding symbol values 330 to communication resources, such as one or more modulation constellations, one or more components of a modulation constellation, a quantity of one or more spatial layers, a quantity of one or more channel uses, or any combination thereof.

For example, the rateless coding scheme 300 may be an example of a spinal code encoding scheme or may otherwise illustrate spinal coding. Spinal codes may be a class of rateless codes that are compatible with time-varying channel conditions in a natural or simple way without use of an explicit bit rate selection. In other words, rateless coding, such as spinal coding, may be associated with an absence or lack of explicit signaling for bit rates of a transmission. For example, communicating devices may refrain from transmitting an indication of one or more aspects of an MCS while implementing rateless coding. Instead, a transmitting device 205 may use rateless codes, such as spinal codes, to perform an initial transmission of a message 305-$a$ at a high bit rate (such as a relatively highest bit rate) and, if one or more NACKs associated with the message 305-$a$ are received from a receiving device 210, to perform iterative transmission of additional information associated with the message via one or more additional transmissions (such as retransmissions), which may lower an effective bit rate until the receiving device 210 is able to successfully decode the message (such as until the transmitting device 205 receives an ACK associated with the message 305-$a$). In some aspects, such use of spinal codes may result in the transmitting device 205 performing the initial transmission at a higher rate than a channel over which the transmitting device 205 performs the transmission is able to sustain and the iterative additional transmissions (such as the iterative retransmissions) may gradually or progressively reduce the bit rate until the reduced bit rate is sustained by the channel (as may be evidenced by reception of an ACK).

In accordance with encoding techniques that implement spinal codes, a transmitting device 205 may perform the encoding of the message 305-$a$ once (which may be associated with a single generation of spines 320 for a given message 305-$a$) and may change a bit rate (which also may be referred to as a rate or as a channel rate) through some quantity of channel uses. On the other hand, in some other coding schemes, a transmitting device 205 may change a bit rate of a signal via a re-encoding of the signal (such that changing a rate may be considered as re-encoding data associated with the signal). As part of the rateless coding scheme 300, a transmitting device 205 may apply a hash function 315 (such as a random hash function) sequentially or cumulatively to bits of a message 305-$a$ (such as segments or portions of the message 305-$a$) to produce a sequence of coded bits and symbols (such as modulation symbols) for transmission. In some aspects, the transmitting device 205 may employ the encoding such that two input messages that differ in even one bit lead to different coded sequences after a point at which the two input messages differ, which may provide resilience to noise or bit errors.

As such, the rateless coding scheme 300 (a spinal coding scheme) may involve or pertain to a cumulative or sequential encoding of a message 305-$a$ across a set of message segments 310. For example, as part of the rateless coding scheme 300, a transmitting device 205 may partition or segment the message 305-$a$ into a set of message segments 310 and may cumulatively encode the message 305-$a$ across multiple stages of the rateless coding scheme 300 (each stage involving an encoding with an additional next message segment 310). In some aspects, a message 305-$a$ may include a quantity of n bits and a transmitting device 205 may partition or segment the message 305-$a$ into a set of message segments 310 such that each message segment includes k bits. In various implementations, k may be the same for each message segment 310 or may be different for some message segments 310 (such that some message segments 310 may include different quantities of bits than other message segments 310). In some aspects, and in accordance with the rateless coding scheme 300 being associated with a lack of an explicit bit rate selection, the rateless coding scheme 300 may be associated with a non-selection (by communicating devices) of the k and n parameters (as the k and n parameters may influence the bit rate of the message 305-$a$). The set of message segments 310 may accordingly include a quantity of n/k message segments 310.

For example, a transmitting device 205 may partition the message 305-$a$ into a message segment 310-$a$-1 (which may be referred to or denoted as a message segment $m_1$ or m_1) starting at bit 1 of the message 305-$a$, a message segment 310-$a$-2 (which may be referred to or denoted as a message segment $m_2$ or m_2) starting at bit k+1 of the message 305-$a$, a message segment 310-$a$-3 (which may be referred to or denoted as a message segment $m_3$ or m_3) starting at bit 2k+1 of the message 305-$a$, and so on for each message segment 310-$a$ of the message 305-$a$. An encoder of the transmitting device 205 may include, for each stage of the rateless coding scheme 300, a hash function 315 and a numeric transposition function, such as a random number generator (RNG) 325 or other scrambling function. The hash functions 315 and the RNGs 325 of the rateless coding scheme 300 may be known to both a transmitting device 205 and a receiving device 210. For example, the hash functions 315 and the RNGs 325 may be pre-configured (such as pre-loaded) at both a transmitting device 205 and a receiving device 210, or one or more aspects or configurations of such functions may be signaled between a transmitting device 205 and a receiving device 210. In some aspects, an encoder of a transmitting device 205 or a decoder of a receiving device 210, or both, may combine a hash function 315 with an RNG 325 into a single or same processing block. Moreover, although each instance of a hash function 315 and each instance of an RNG 325 are illustrated separately, in some implementations, the separately illustrated instances of a hash function 315, or an RNG 325, or both may be performed by a same set of functional instructions, or by a same set of processing circuitry, which may be performed with different inputs to provide different outputs.

A transmitting device 205 may implement a hash function 315 with two inputs including a spine 320 (which may be referred to as an encoded value and may be an example of a v bit state) and a message segment 310 (which may include a portion, chunk, or quantity of k bits of the message 305-*a*) and may obtain, as an output of a hash function 315, a new spine 320 (a new encoded value or a new v bit state). Thus, a hash function 315 may take a first input (a spine 320) of size v bits and a second input (a message segment 310) of size k bits and may output a spine 320 of size v bits. A hash function 315 may be represented by Equation 1 and a value of a spine 320 may be represented by Equation 2, where an index i may refer to or indicate a coding index or stage (such as an encoding stage or a decoding stage) and $\overline{m}_i$ may refer a message segment 310 corresponding to that coding index or stage i. In some aspects, $s_0$ (or s_0) may be an initial input spine 320 or some other initial value and may be set equal to zero, or to some other default or pre-configured value. Additionally, or alternatively, a transmitting device 205 and a receiving device 210 may coordinate (such as via an exchange of one or more signals) on a value of $s_0$. In some implementations, for example, a transmitting device 205 may set or configure a value of $s_0$ to be equal to an identifying value or parameter associated with an intended receiving device 210, such as a radio network temporary identifier (RNTI), which may support various techniques for partial decoding of a search space by various receiving devices 210 in accordance with examples as disclosed herein. In some aspects, an output of a hash function 315 may include 32 bits (such that v=32).

$$h: \{0,1\}^v \times \{0,1\}^k \to \{0,1\}^v \quad (1)$$

$$s_i = h(s_{i-1}, \overline{m}_i) \quad (2)$$

A transmitting device 205 may generate a spine 320 of v bit states by sequentially or cumulatively hashing together groups of k bits from the input message 305-*a* and, in some implementations, may refrain from adding any redundancy bits (as may be added for some other coding schemes). For example, a transmitting device 205 may obtain a spine 320-*a*-1 as an output of a hash function 315-*a*-1, may obtain a spine 320-*a*-2 as an output of a hash function 315-*a*-2, and may obtain a spine 320-*a*-3 as an output of a hash function 315-*a*-3. Further, in some aspects, a transmitting device 205 may use or otherwise reach a hash function 315 with a low probability of hash collisions (in part as a result of the sequential or cumulative hashing of groups or segments of k bits from the input message 305-*a*).

The transmitting device 205 may generate a spine 320 for each message segment 310 and may use each of the n/k spines 320 as a seed or input into a respective instance of an RNG 325. A spine 320 may include or otherwise convey information associated with a message segment 310 of a same coding indices or stage as well as information associated with message segments 310 of preceding coding indices or stages. For instance, the spine 320-*a*-1 may include or otherwise convey information associated with the message segment 310-*a*-1 (and a seed value S_0, where applicable), the spine 320-*a*-2 may include or otherwise convey information associated with the message segment 310-*a*-1 and the message segment 310-*a*-2, and the spine 320-*a*-3 may include or otherwise convey information associated with the message segment 310-*a*-1, the message segment 310-*a*-2, and the message segment 310-*a*-3. As such, a last or final spine 320 may include encoded information associated with the entire message 305-*a* and a transmitting device 205 may, in some scenarios, transmit a signal associated with the last spine 320 (and suppress transmission of a signal associated with other spines 320) to achieve an upper limit bit or channel rate (because the transmission of the signal associated with the last spine 320 may convey the entire message 305-*a* via a single channel use). Such scenarios in which the transmitting device 205 exclusively transmits a signal associated with the last spine 320 may include scenarios of a relatively high SNR (such as an SNR greater than a threshold SNR or a theoretically infinite SNR) or scenarios associated with a relatively high constellation order (such as a constellation order greater than a threshold constellation order).

Each instance of an RNG 325, in accordance with receiving a spine 320 as an input, may output a symbol value 330 (such as a sequence of c-bit numbers or a sequence of c bits). As such, an RNG 325 may take a value of a spine 320 as an input (having a size of v bits) and may apply some numeric transposition function $\mathbb{N}$ to the value of the spine 320. Such a numeric transposition function $\mathbb{N}$ may be an RNG, a pseudo-random RNG, a mapping function, a scrambling function, a scaling function, or any combination thereof. In some aspects, an RNG 325 may be represented by Equation 3.

$$RNG: \{0,1\}^v \times \mathbb{N} \to \{0,1\}^c \quad (3)$$

In some implementations, a symbol value 330 may be an example of, or may be otherwise associated with (such as mapped to) one or more modulation symbols, such as an in-phase and quadrature (IQ) constellation symbol or point, or other types of modulation symbols, such as a pulse-amplitude modulation (PAM) symbol. In some aspects, an IQ constellation symbol may be or may be associated with two orthogonal PAM symbols. In some other implementations, the transmitting device 205 may convert a symbol value 330 into an IQ constellation symbol or point (such as via an IQ constellation mapping function). In implementations in which the transmitting device 205 converts a symbol value 330 into an IQ constellation symbol or point, the transmitting device 205 may use an IQ constellation mapping function to generate a transmitted symbol (such as a constellation symbol or a modulation symbol) from an output of an RNG 325. In such implementations, a transmitting device 205 may use the IQ constellation mapping function to map each symbol value 330 to a (different) modulation symbol (which may be equivalently referred to herein as a constellation symbol or point). Thus, the rateless coding scheme 300 may illustrate an example implementation that includes a combination of an encoding operation and a modulation operation (such as a scheme where encoding and modulation are performed jointly, or a rateless encoding and modulation scheme, or a rateless modulation and coding scheme). However, the described techniques may implement other schemes where encoding and modulation are performed jointly, including schemes associated with coding indices corresponding to a cumulative encoding of different quantities of message segments 310. In some aspects, and because a receiving device 210 may jointly decode over all received symbols, any mapping may be suitable or compatible with the rateless coding scheme 300.

Additional details relating the mapping of symbol values 330 to modulation symbols are illustrated by and described in more detail with reference to FIG. 4.

In some aspects, a transmitting device 205 may generate an in-phase (I) value, such as a real component, and a quadrature (Q) value, such as an imaginary component, in accordance with or under an average power constraint P. For example, if b is a symbol value 330 (a c-bit output) from an RNG 325, the transmitting device 205 may generate an I value and a Q value in accordance with Equations 4-7.

$$u = \frac{b + 0.5}{2^c} \quad (4)$$

Uniform: $b \to (u - 0.5) \cdot \sqrt{6P}$ \quad (5)

Truncated Gaussian: $b \to \Phi^{-1}(\gamma + (1 - 2\gamma)u)\sqrt{P/2}$ \quad (6)

$\gamma \equiv \Phi(-\beta)$ limits the Gaussian's range to $\pm \beta\sqrt{P/2}$ \quad (7)

In some implementations, a transmitting device 205 may achieve higher bit rates (without increasing a decoding cost) via a puncturing of the transmitted symbols at the transmitter side, where such transmission puncturing may refer to various techniques for performing transmissions associated with a subset of the spines 320 for a given message 305-a, such as refraining from performing transmissions associated with one or more spines 320 for at least in an initial transmission associated with the given message 305-a. For example, a transmitting device 205 may transmit one or more signals associated with one or more specific spines 320 over a set of transmission occasions 335 in accordance with a transmission puncturing scheme. The transmission puncturing scheme may define or otherwise indicate which one or more spines 320 a transmitting device 205 is to transmit at each of the set of transmission occasions 335. For example, a transmitting device 205 may transmit a signal associated with the spine 320-a-3 during a transmission occasion 335-a-1, may transmit a signal associated with the spine 320-a-2 during a transmission occasion 335-a-2, and may transmit a signal associated with the spine 320-a-1 during a transmission occasion 335-a-3, where applicable.

Further, and as shown in the rateless coding scheme 300, a transmitting device 205 may obtain various symbol values 330 from each RNG 325 depending on a transmission occasion 335. For example, the RNG 325-a-1 may output, for the input spine 320-a-1, a symbol value 330-a-11 (as illustrated by or denoted as an $x_{1,1}$ or x_1,1 value) for the transmission occasion 335-a-1, a symbol value 330-a-12 (as illustrated by or denoted as an $x_{1,2}$ or x_1,2 value) for the transmission occasion 335-a-2, and a symbol value 330-a-13 (as illustrated by or denoted as an $x_{1,3}$ or x_1,3 value) for the transmission occasion 335-a-3. The RNG 325-a-2 may output, for the input spine 320-a-2, a symbol value 330-a-21 (as illustrated by or denoted as an $x_{2,1}$ or x_2,1 value) for the transmission occasion 335-a-1, a symbol value 330-a-22 (as illustrated by or denoted as an $x_{2,2}$ or x_2,2 value) for the transmission occasion 335-a-2, and a symbol value 330-a-23 (as illustrated by or denoted as an $x_{2,3}$ or x_2,3 value) for the transmission occasion 335-a-3. The RNG 325-a-3 may output, for the input spine 320-a-3, a symbol value 330-a-31 (as illustrated by or denoted as an $x_{3,1}$ or x_3,1 value) for the transmission occasion 335-a-1, a symbol value 330-a-32 (as illustrated by or denoted as an $x_{3,2}$ or x_3,2 value) for the transmission occasion 335-a-2, and a symbol value 330-a-33 (as illustrated by or denoted as an $x_{3,3}$ or x_3,3 value) for the transmission occasion 335-a-3. Although a symbol value 330 is illustrated for each spine 320 at each transmission occasion 335, a transmitting device 205 may refrain from generating those symbol values 330 that are not configured or scheduled for transmission, such as those spines 320 that have been punctured by a transmission puncturing scheme for a given transmission occasion 335.

As such, if the transmitting device 205 transmits signals associated with the spine 320-a-3 during the transmission occasion 335-a-1, transmits signals associated with the spine 320-a-2 during the transmission occasion 335-a-2, and transmits signals associated with the spine 320-a-1 during the transmission occasion 335-a-3, the transmitting device 205 may transmit signals associated with the symbol value 330-a-31 during the transmission occasion 335-a-1, may transmit signals associated with the symbol value 330-a-22 during the transmission occasion 335-a-2, and may transmit signals associated with the symbol value 330-a-13 during the transmission occasion 335-a-3. Each transmission, which may collectively be associated with or otherwise based on a transmission puncturing scheme may use any modulation constellation, such as any one or more of a quadrature amplitude modulation (QAM) constellation, a non-square constellation, or a Gaussian constellation, among other examples. Additional details relating to such a transmission puncturing scheme are illustrated by and described in more detail with reference to FIG. 5.

Figure 4:
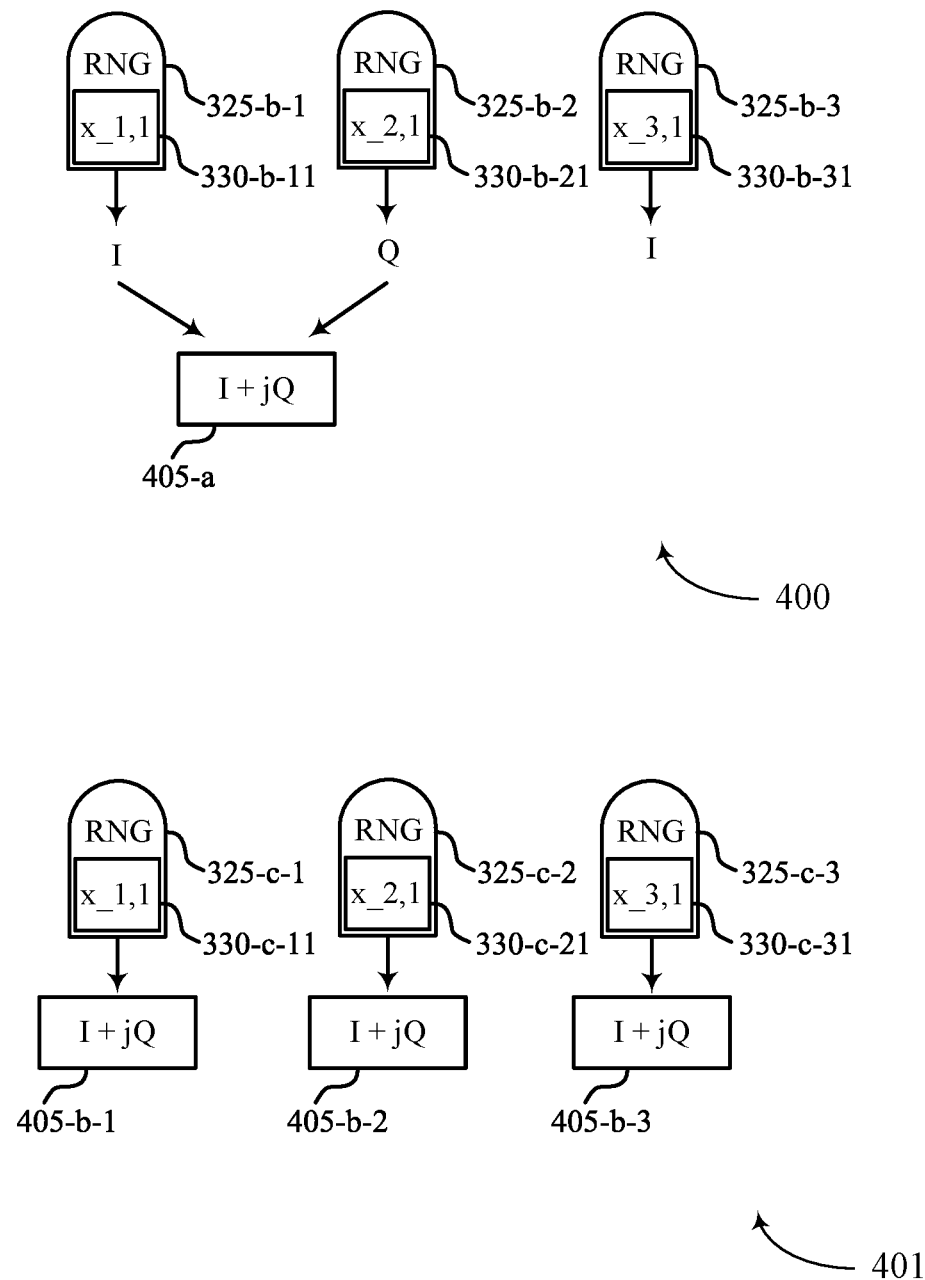
FIG. 4 shows example mapping functions that support communications resource allocation for rateless coding.

FIG. 4 shows example mapping functions 400 and 401 that support communications resource allocation for rateless coding. The mapping functions 400 and 401 may be implemented to realize aspects of the wireless communications system 100 or the signaling diagram 200. For example, the mapping functions 400 and 401 illustrate a mapping or conversion from a symbol value 330 (an output of an RNG 325) to a modulation symbol 405 (which may be equivalently referred to herein as a constellation symbol or a constellation point).

In some implementations, an encoder of a transmitting device 205 may employ the mapping functions 400 and 401 to map encoded portions or segments of a message 305 to modulation symbols 405 to facilitate a mapping to communication resources over which the transmitting device 205 may transmit signals associated with the encoded portions or segments. In some aspects, the mapping functions 400 and 401 may be examples resource mapping schemes according to which a transmitting device may map one or more coding indices (or symbol values 330 associated with one or more coding indices) to one or more modulation constellations or to one or more components or portions of a modulation constellation.

In some implementations, a transmitting device 205 may perform transmissions over one or more transmission occasions 335 in accordance with a transmission puncturing scheme. In accordance with or as a result of the transmission puncturing scheme, a decoder may be bound by an upper limit maximal working rate that the decoder can work with. In some aspects, such a working rate (such as an instantaneous rate, an instantaneous bit rate, or an instantaneous channel rate) may be increased without any decoder loss or complexity via multiple implementation options at a transmitting device 205.

In some implementations, and as shown by the mapping function 400, a transmitting device 205 may map a modulation symbol 405 (which may be an example of a symbol of a modulation constellation) with two spines 320 or two coding indices, such as mapping a modulation symbol 405 with the output of two RNGs 325, where a first output may be mapped along a first axis of a modulation scheme (such as a real component or an I component of modulation scheme) and a second output may be mapped along a second axis of the modulation scheme (such as an imaginary component or a Q component of the modulation scheme). For example, the mapping function 400 illustrates an RNG 325-*b*-1, an RNG 325-*b*-2, and an RNG 325-*b*-3 (each of which may take, as an input, a different spine 320), and the RNG 325-*b*-1 may output a symbol value 330-*b*-11, the RNG 325-*b*-2 may output a symbol value 330-*b*-21, and the RNG 325-*b*-3 may output a symbol value 330-*b*-31. In some aspects, at least some of the symbol values 330-*b* obtained as outputs from the RNGs 325-*b* may be associated with a same transmission occasion 335, such as a transmission occasion associated with transmission of the modulation symbol 405-*a*.

In accordance with the mapping function 400, a transmitting device 205 may map the symbol value 330-*b*-11 to a real portion (such as an I value) of the modulation symbol 405-*a*, and map the symbol value 330-*b*-21 to an imaginary portion (such as a Q value) of the modulation symbol 405-*a*. In other words, each $x_{p,l}$ (where p refers to a coding index and l refers to a transmission occasion 335) may be mapped to one of a quantity C one dimensional constellation points (where C=order per dimension). For C=6 and a QAM constellation type, for example, a transmitting device 205 may have 64 points per dimension and a resulting complex modulation may be $64^2$=4096 QAM (such that there may be a total of 4096 points in a constellation). A receiving device 210 may monitor or search for an encoded message 305 for each dimension because, for example, I and Q may be orthogonal to each other for some channel conditions (such as for an AWGN channel). As such, a receiving device 210 may search for an encoded message 305 over 64-point modulations (because, for example, a first spine 320 and a second spine 320 may each be associated with 64 points and accordingly 64-point scans by the receiving device 210).

In some implementations, such as if a spine 320 associated with the RNG 325-*b*-3 is scheduled or configured for a transmission, the transmitting device 205 may map the symbol value 330-*b*-31 to a real portion (such as an I value) of another modulation symbol 405 (not shown), which may be associated with a same transmission occasion 335 or a different transmission occasion 335 than the modulation symbol 405-*a*. Although shown as mapping symbol values 330 in an order of real first, imaginary second (such that a relatively earlier of two spines 320 or symbol values 330 maps to an I value and a relatively later of the two spines 320 or symbol values 330 maps to a Q value), a transmitting device 205 also may map symbol values 330 in an order of imaginary first, real second (such that a relatively earlier of two spines 320 or symbol values 330 maps to a Q value and a relatively later of the two spines 320 or symbol values 330 maps to an I value).

In some implementations, and as shown by the mapping function 401, a transmitting device 205 may map a modulation symbol 405 with one spine 320, such as mapping a modulation symbol 405 with the output of one RNG 325, where the output may be mapped as a combination of a first axis of a modulation scheme (such as a real component of modulation scheme) and a second axis of the modulation scheme (such as an imaginary component of the modulation scheme). For example, the mapping function 401 illustrates an RNG 325-*c*-1, an RNG 325-*c*-2, and an RNG 325-*c*-3 (each of which may take, as an input, a different spine 320) and the RNG 325-*c*-1 may output a symbol value 330-*c*-11, the RNG 325-*c*-2 may output a symbol value 330-*c*-21, and the RNG 325-*c*-3 may output a symbol value 330-*c*-31. In various examples, the symbol values 330-*c* obtained as outputs from the RNGs 325-*c* may be associated with a same transmission occasion 335, or different transmission occasions 335.

In accordance with the mapping function 401, a transmitting device 205 may map the symbol value 330-*c*-11 to both a real portion (such as an I value) and an imaginary portion (such as a Q value) of a modulation symbol 405-*b*-1. In other words, each $x_{p,l}$ (where p refers to a coding index and l refers to a transmission occasion 335) may be mapped to a complex modulation of $C^2$ points (where C=order per dimension). A receiving device 210 may monitor or search for an encoded message 305 jointly on I and Q.

In some implementations, such as when a respective spine 320 associated with the RNG 325-*c*-2 or the RNG 325-*c*-3 is scheduled or configured for a transmission, the transmitting device 205 may map the symbol value 330-*b*-31 to a real portion and an imaginary portion of a modulation symbol 405-*b*-2, or map the symbol value 330-*c*-31 to a real portion and an imaginary portion of a modulation symbol 405-*b*-3, either or both of which may be associated with a same transmission occasion 335 or a different transmission occasion 335 than the modulation symbol 405-*b*-1.

In an example of the mapping function 400, for n=256, k=4, and c=6, and using 64 PAM per spine 320 and 4096 QAM per channel use, a transmitting device 205 may start with R=8 bits per channel use (such as if transmitting all spines without puncturing). In an example of the mapping function 401, for n=256, k=4, and c=12 and using 4096 QAM per spine 320 and per channel use, a transmitting device 205 may start with R=4 bits per channel use (such as if transmitting all spines without puncturing). Thus, in an implementation of the mapping function 400 according to which a transmitting device 205 transmits one of either a real part or an imaginary part per spine 320, the transmitting device 205 may double an effective instantaneous rate (an effective bit rate or channel rate) for a same constellation mapping. A channel may still be associated with a limit on an achievable rate and a total quantity of symbols being used by communicating devices may still be the same across the two options (the mapping function 400 and the mapping function 401), but, in some implementations, communicating devices may employ different puncturing schemes while maintaining decoder complexity. Additional details relating to an example puncturing scheme are illustrated by and described in more detail with reference to FIG. 5.

In accordance with examples disclosed herein and using one or both of the mapping function 400 or the mapping function 401, scanning complexity (such as at a receiving device 210) may not be dependent on the QAM (such as the real or complex order), but instead may be dependent on an effective number of bits per channel use. In other words, a receiving device 210 may scan two to the power of bits-per-channel-use (such as $2^k$) regardless of a constellation size used for transmitted signals associated with an encoded message 305. The decoding metric or path cost, which may be equivalently referred to herein as a receiver branch metric, at an $i^{th}$ state or coding index may be given as $\|\bar{y}_i - \bar{x}_i(s_i')\|^2$ in accordance with Equation 9 (as described with reference to FIG. 6) and, for fading channels and for implementations in which a transmitting device 205 and a receiving device 210 employ the mapping function 401, the cost function may become $\|\bar{y}_i - h\bar{x}_i(s_i')\|^2$, where h reflects information about a channel (such as a channel response or a channel estimate).

For implementations in which a transmitting device 205 and a receiving device 210 employ the mapping function 400, a quantity of bits per channel use (such as before puncturing) may be k'=2k. In some aspects, the quantity of bits per channel use may be referred to as a quantity of basic bits per channel use if associated with bits per channel use prior to implementation of any puncturing scheme. As such, in some implementations, a receiving device 210 may search (such as exhaustively search) over $2^{k'}=2^{2k}$ points with a same metric $\|\bar{y}_i-h\bar{x}_i(s_i')\|^2$. Additionally, or alternatively, such as when spines 320 are combined by a linear combination for mapping to a multi-dimensional constellation, a receiving device 210 may perform linear equalization to restore an orthogonality between I and Q and may search over $2^k$ points for each coding stage or index. A potentially resulting decoding metric or path cost (such as branch metric) is shown by Equation 8.

$$\left\|\frac{h^*}{|h|^2}\bar{y}_i-\bar{x}_i(s_i')\right\|^2 \quad (8)$$

Thus, the mapping function 400 and the mapping function 401 illustrate examples of decoding different resource mappings where a branch metric may be based at least in part on information about a channel (such as a channel response or a channel estimate). Moreover, the mapping function 400 and the mapping function 401 illustrate examples where the calculation implemented for a branch metric may be selected based at least in part on which resource mapping is implemented (such as which resource mapping was applied by an encoding or transmitting device).

In some aspects, and assuming suitable channel estimation, a transmitting device 205 or a receiving device 210, or both, may maintain performance while employing an adaptive resource mapping scheme to overcome a channel condition. Further, a transmitting device 205 and a receiving device 210 may support various resource mapping schemes to facilitate a resource mapping (such as a mapping to communication resources, such as to one or more spatial layers for MIMO communication) for scenarios in which the devices use the mapping function 400 to map coding indices to different portions of a modulation constellation. Such resource mapping schemes are illustrated by and described with reference to FIGS. 8-10 and, in some aspects, may assume a complex amplitude for simplicity and explanatory purposes.

Figure 5:
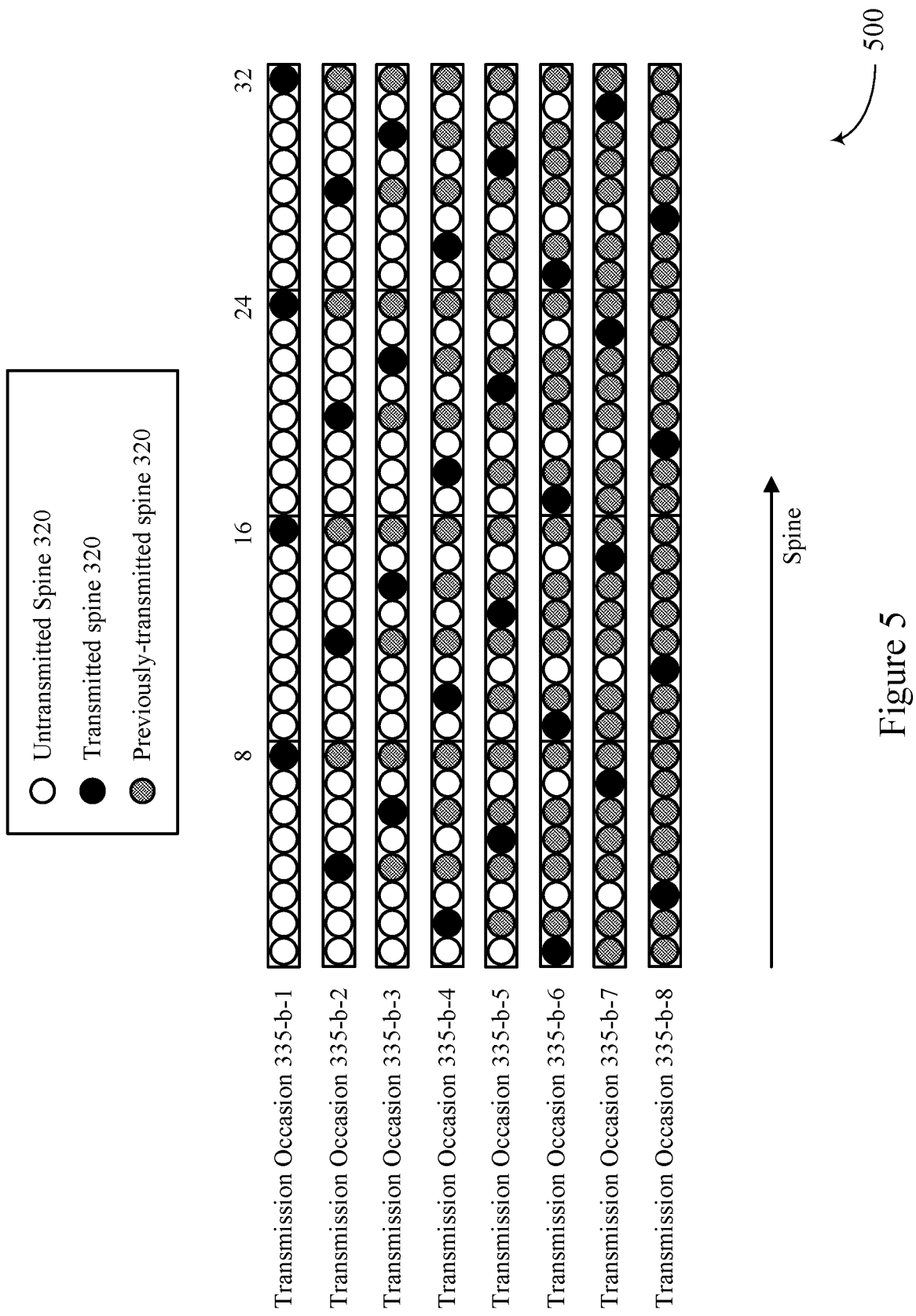
FIG. 5 shows an example puncturing scheme that supports communications resource allocation for rateless coding.

FIG. 5 shows an example puncturing scheme 500 that supports communications resource allocation for rateless coding. The puncturing scheme 500 may be implemented to realize aspects of the wireless communications system 100 or the signaling diagram 200. For example, the puncturing scheme 500 illustrates transmissions of signals associated with different spines 320 or symbol values 330 over multiple transmission occasions 335 in accordance with a puncturing pattern. In some implementations, a transmitting device 205 may perform transmissions associated with different spines 320 over the multiple transmission occasions 335 in accordance with the puncturing scheme 500 to increase an achievable bit rate associated with a message 305 by iterative transmission of segments of the message via the different spines 320. In various examples, transmissions associated with a given transmission occasion 335 may be performed concurrently (such as in a same symbol duration and over different frequency resources or different spatial resources), or sequentially (such as in successive symbol durations, which may or may not be over the same frequency resources or the same spatial resources), or any combination thereof, among other organizations of transmissions in a given transmission occasion 335.

For example, a message 305 associated with transmission using the puncturing scheme 500 may include a set of message segments 310, and different spines 320 may include or otherwise convey information associated with a cumulative encoding of different portions of the message 305, as illustrated by and described in more detail with reference to FIG. 3. As such, a transmitting device 205 may effectively attempt different bit rates in accordance with transmitting signals associated with different spines 320 (such as different coding indices) over different transmission occasions 335, where later (higher indexed) spines 320 may include or convey larger cumulative portions of the message 305 (a greater quantity of sequentially encoded message segments 310) than earlier (lower indexed) spines 320. Accordingly, if a transmitting device 205 transmits one modulation symbol 405 per spine 320 per transmission occasion 335 (per pass or sub-pass), and if it takes l transmission occasions 335 (l passes or sub-passes) for a receiving device 210 to successfully decode the message 305, the effective bit rate becomes k/l bits per channel use (where a maximum or upper limit bit rate may be k). In other words, if there are n/k symbols (such as spines 320) and k bits per symbol in a basic form (such as a form with no puncturing), an effective quantity of bits per channel use may be n/(quantity of symbols in all transmissions). As such, a maximum or upper limit effective quantity of bits per channel use may be n (as such a maximum or upper limit may be associated with transmission of one symbol) and a minimum or lower limit effective quantity of bits per channel use may approach zero (as such a minimum or lower limit may be associated with transmission of many symbols, such as a quantity of symbols that can approach infinity).

In some implementations, a transmitting device 205 may puncture spines 320 or associated symbol values 330 of a rateless encoding scheme to achieve a higher or finer bit rate without increasing a decoding cost. For example, instead of transmitting a symbol value 330 for all of the spines 320 of an encoded message 305 (such as in an initial transmission occasion 335, or per pass or sub-pass), a transmitting device 205 may initially skip or puncture some spines 320 or symbol values 330. In such implementations, the transmitting device 205 may transmit one or more of the initially skipped spines 320 or symbol values 330 (such as the spines 320 or symbol values 330 that were not initially transmitted) if a receiving device 210 is unable to successfully receive and decode the initial transmission (as may be evidenced by reception of a NACK or by a lack of reception of an ACK at the transmitting device 205). In some aspects, the transmitting device 205 may, in a next or other transmission occasion 335, transmit a spine 320 or a symbol value 330 that was previously left untransmitted and may refrain from or suppress transmission of spines 320 or symbol values 330 that were previously transmitted (before starting a new pass of the entire message 305 or a next message 305).

The puncturing scheme 500 may illustrate an example for defining or indicating which spines 320 (such as which coding indices) a transmitting device 205 transmits at which transmission occasions 335 and, in some implementations, the puncturing scheme 500 may be known to both the transmitting device 205 and any one or more receiving devices 210. A transmitting device 205 (potentially with coordination with a receiving device 210 and in accordance with one or more capabilities or channel conditions) may select a combination of transmitted or spines 320 or symbol values 330 to define or control a rate granularity.

For example, and as shown by the puncturing scheme 500, a transmitting device 205 may, during a transmission occasion 335-b-1, perform a transmission associated with a spine 320 having a spine index 8, a spine 320 having a spine index of 16, a spine 320 having a spine index of 24, and a spine 320 having a spine index of 32. As such, the transmitting device 205 may transmit one or more signals associated with a message 305, such as signals associated with symbol values 330 or modulation symbols 405, at an effective bit rate of 8k bits per channel use (as each transmitted spine 320 includes information for at least seven other spines 320, each conveying k bits). If the transmission during the transmission occasion 335-b-1 is unsuccessful, the transmitting device 205 may, during a transmission occasion 335-b-2, perform a transmission associated with a spine 320 having a spine index 4, a spine 320 having a spine index of 12, a spine 320 having a spine index of 20, and a spine 320 having a spine index of 28. As such, the transmitting device 205 may transmit a signal associated with the message 305 at an effective bit rate of 4k bits per channel use.

The transmitting device 205 may similarly perform transmissions associated with one or more remaining spines 320 (untransmitted spines 320) over one or more other transmission occasions 335, potentially including one or more of a transmission occasion 335-b-3, a transmission occasion 335-b-4, a transmission occasion 335-b-5, a transmission occasion 335-b-6, a transmission occasion 335-b-7, and a transmission occasion 335-b-8, which may proceed until a receiving device 210 is able to successfully receive and decode the message 305 (as may be evidenced by reception, at the transmitting device 205, of an ACK). As an example, for n=256, k=4, and a quantity of symbols $N_{sym}$=n/k=64, a transmitting device 205 may transmit every other symbol value 330 or spine 320 from an initial symbol value 330 or spine 320 (as may be represented by a "1:2 symbol transmission" labeling convention) over all 32 transmitted symbol values or spines 320 during a first transmission occasion 335 (such as a first pass) and, for another pass, the transmitting device 205 may transmit one symbol value 330 or spine 320 starting from an end of a spine vector (where the transmission is wrapped around in a spine domain). As illustrated by the puncturing scheme 500, the transmitting device 205 may start with 8k bits per channel use and may decrease the bit rate over a number of other transmission occasions 335, where a total quantity of transmitted symbol values 330 or spines 320 per pass dictates the effective rate granularity.

Further, although illustrated as occurring sequentially, the transmission occasions 335 may occur in any order or at any time. In some implementations, for example, each of the transmission occasions 335 may occur over distinct time periods such that each subsequent transmission occasion 335 is later in time relative to a previous transmission occasion 335. In some other implementations, one or more of the transmission occasions 335 may overlap in time.

Figure 6:
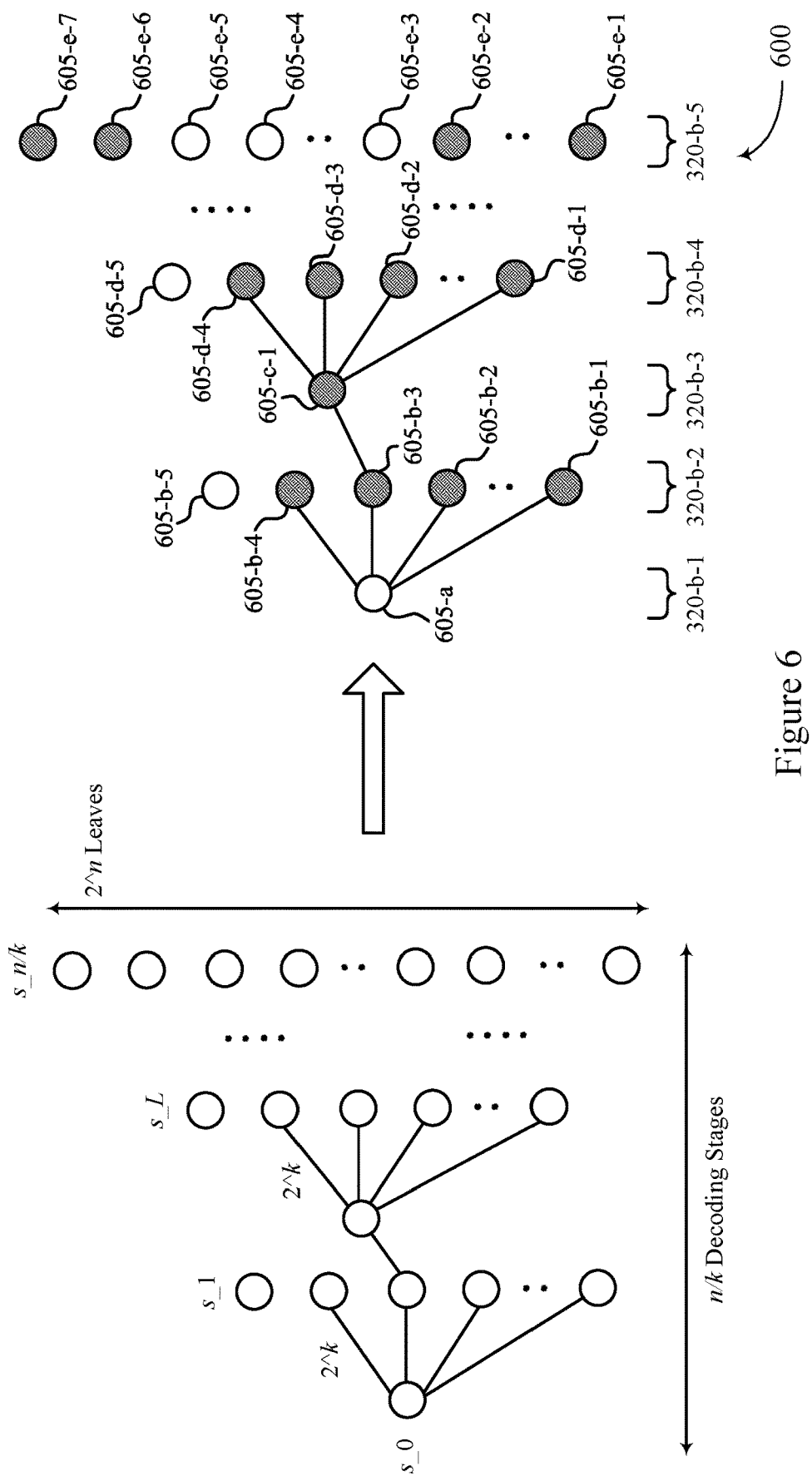
FIGS. 6 and 7 show example decoding schemes that support communications resource allocation for rateless coding.

FIG. 6 shows an example decoding scheme 600 that supports communications resource allocation for rateless coding. The decoding scheme 600 may be implemented to realize aspects of the wireless communications system 100 or the signaling diagram 200. For example, the decoding scheme 600 illustrates a decoding process at a receiving device 210 for decoding one or more signals associated with a rateless code, such as a spinal code. In some implementations, a receiving device 210 may receive a signal associated with a message 305 encoded according to a rateless coding scheme (such as a spinal coding scheme) and may employ a cost function associated with a Euclidean distance between a channel measurement associated with the signal and each of a set of candidate symbol values 605 multiplied by the channel (or an estimated channel). In other words, the cost function may be associated with a Euclidean distance between a received signal and a product of each of the candidate symbol values 605 and the channel (or the estimated channel).

In some aspects, an ML decoder may generate a set of (such as all) codewords out of a size n (such that a total quantity of codewords is $2^n$) and may calculate a distance between generated symbol values (such as symbol values 330) at the receiver and actually received (noisy) symbol values per codeword. In such aspects, the decoder may infer, ascertain, or otherwise determine that the decoded message is the one with a minimal distance over all received symbol values 330 or spines 320. In other words, given a vector of observations $\bar{y}$ and an encoder function $\bar{x}(M')$ that yields the vector of transmitted symbol values or spines 320 for a message M', the ML rule may be defined in accordance with Equation 9.

$$\hat{M} \in \underset{M' \in \{0,1\}^n}{\operatorname{argmin}} \|\bar{y} - \bar{x}(M')\|^2 \qquad (9)$$

In implementations in which a transmitting device 205 employs a puncturing scheme to transmit a signal associated with a message encoded using a rateless code (such as a spinal code), a receiving device 210 may refrain from evaluating missing observations (corresponding to a punctured spine 320 or symbol value 330) during the calculation of the distance between the generated symbol values and the actually received or measured symbol values. Instead, for any untransmitted modulation symbols or spines 320, the receiving device may advance to a next decoding stage associated with an actually transmitted modulation symbol or spine 320. Further, in implementations in which a receiving device 210 receives one or more signals over multiple transmission occasions 335 (such as in decoding scenarios involving multiple passes), the receiving device 210 may average or sum (such as accumulate) a distance metric of each symbol or spine 320 between transmission occasions 335. Such a decoding implementation may be computationally demanding and may be unsuitable for some devices.

As such, in some implementations of the present disclosure, a receiving device 210 may employ a decoder scheme, which may be referred to as a bubble decoder or a list decoder, that is able to achieve lower computational complexity and leverage aspects associated with rateless coding (such as spinal coding). For example, because a spinal encoder may apply a hash function 315 sequentially or cumulatively across multiple message segments 310, input messages with a common prefix also may have a common spine value (such as a common spine prefix or a common value of a spine 320 conveying information associated with the common prefix), whereas symbol values 330 produced or output by an RNG 325 from the common spine values may or may not be identical. As such, a receiving device 210 may use this structure to decompose a total distance into a summation over spines 320. For example, a receiving device 210 may break y into sub-vectors $\bar{y}_1 \ldots \bar{y}_{n/k}$, which may represent the symbols from spines values $s_i$ of a correct message (as well as for $\bar{x}(M')$). With such a representation of $\bar{y}$ as sub-vectors $\bar{y}_1 \ldots \bar{y}_{n/k}$, the cost function may be defined in accordance with Equation 10.

$$\|\bar{y} - \bar{x}(M')\|^2 = \sum_{i=1}^{n/k} \|\bar{y}_l - \bar{x}_i(s_i')\|^2 \quad (10)$$

Accordingly, a receiving device 210 may calculate a summation for a set of (such as all) transmissions or candidates that share a same spine value $s_i$. Thus, in some implementations, a receiving device 210 may implement a decoding process as a tree decoding with a root at spine $s_0$. The receiving device 210 may sum or accumulate branch costs on a path from the root to a node and calculate a path cost (which may be referred to as a path metric or a decoding metric) of the node using Equation 10.

In accordance with the cost function shown by Equation 10, and supposing, as an example, an ML message M* and some other message M' that differ in an $i^{th}$ bit, spines 320 including and after a spine index of ceil(i/k) may be dissimilar (and all other symbols before a spine index of ceil(i/k) may be the same across the two transmissions) such that the difference between the two decoded transmissions is present in the last O(log n) bits. As such, the earlier the error in M', the larger the path cost may be. If a receiving device 210 constructs an entire ML decoding tree and computes path costs for each of the nodes (which may be referred to as leaves), the receiving device 210 may select a best B nodes (such as the B nodes or leaves having the lowest path cost) and may trace back through the decoding tree to find that each of the B selected nodes converge to a relatively small number of common "ancestors," where an "ancestor" may refer to a node of a decoding tree relatively closer to a root of the tree than the B selected nodes and where a common "ancestor" may refer to a node from which each of the B selected nodes can be traced back to.

Thus, a receiving device 210 may implement a bubble decoder associated with a depth parameter d and a beam width parameter B and, instead of searching an entire decoding tree, the receiving device 210 may maintain B common ancestors (beams) and a partial decoding tree rooted at each ancestor of depth d. In some aspects, B=4 and d=1. In some implementations, the receiving device 210 may select a node with a lowest path cost and may return a complete message corresponding to the selected node (such as a complete message conveyed by a spine 320 associated with the selected node of the decoding tree). Additionally, or alternatively, the receiving device 210 may perform a cyclic redundancy check (CRC) on a set of (such as all) left codewords, which may include a total of B2$^{kd}$ left codewords.

In some implementations, a receiving device 210 may combine a bubble decoder with a puncturing scheme, such as the puncturing scheme 500, to reduce the complexity associated with generating a decoding tree. For example, if a transmission (such as a retransmission) occurs at a specific stage or index of the decoding tree (where such a specific stage or index of the decoding tree may correspond to a spine 320 or symbol), a receiving device 210 may use a previously calculated sub-tree until that specific stage or index and save the complexity associated with re-generating the sub-tree until that specific stage or index for the (re) transmission. To keep complexity low while maintaining or increasing system performance, a receiving device 210 may accordingly maintain retransmission symbols starting from the end of the tree (corresponding to the last symbols or spines 320). For the (re)transmission, the receiving device 210 may begin expanding the tree again at the specific stage or index using new information obtained from the (re) transmission. As such, the decoding scheme 600 may be associated with a reduced complexity ML approach (which may be referred to as a bubble decoder), which may run in a time polynomial in a message size. The decoding scheme 600 may further be a joint demodulation-decode process in which a receiving device 210 may skip a de-mapper block (such as a log-likelihood ratio (LLR) computation).

A width of the decoding tree may be associated with or given by the parameter k (such that the tree may expand by $2^k$ nodes or leaves at each stage). As such, the width of the decoding tree may decrease as k decreases and the decoding tree may correspondingly include more decoding stages (as a result of n/k increasing) as k decreases. Further, as the width of the decoding tree decreases and as a quantity of decoding stages increases, a latency until a next transmission (such as a next retransmission) may increase as well. Likewise, the width of the decoding tree may increase as k increases and the decoding tree may correspondingly include fewer decoding stages (as a result of n/k decreasing) as k increases. Further, as the width of the decoding tree increases and as a quantity of decoding stages decreases, a latency until a next transmission (such as a next retransmission) may decrease as well.

Accordingly, and as shown in the decoding scheme 600, a receiving device 210 may generate or otherwise use a decoding tree of n/k decoding stages or levels and $2^n$ leaves or nodes at a last or final decoding stage. A root of the decoding tree may be $s_0$ (or s_0) and may branch out to $2^k$ leaves at a first decoding stage associated with a spine $s_1$ (or s_1). Each leaf of the first decoding stage associated with the spine $s_1$ may branch out to $2^k$ leaves at a next decoding stage associated with a next spine, and eventually to a decoding stage associated with a spine $s_L$ (or s_L). The decoding tree may end at a final decoding stage associated with a spine $s_{n/k}$ (or s_n/k).

In some implementations, a receiving device 210 may recognize that decoding hypotheses, which may be equivalently referred to as candidate symbol values 605, that have same initial states that share same symbol hypotheses or guesses (such as decoding hypotheses for nodes or leaves that have a common "ancestor" node in the decoding tree) are identical in a decoding stage associated with the same initial states that share the same symbol hypotheses or guesses. In other words, decoding stages up to the common "ancestor" node in the decoding tree may be the same for decoding hypotheses of later decoding stages that share the same symbol hypotheses or guesses for that common "ancestor" node. As such, the receiving device 210 may merge such initial identical states (and thus save some decoding complexity and computational cost).

Each of the leaves or nodes at each decoding stage of the decoding tree may correspond to decoding hypotheses or candidate symbol values 605 associated with an encoded message 305 at a receiving device 210. As part of the decoding scheme 600, for example, a receiving device 210 may generate a set of candidate symbol values 605 at each decoding stage corresponding to a spine 320 and may select one or more candidate symbol values 605 at each decoding stage or for each spine 320. For example, a receiving device 210 may evaluate a set of candidate symbol values 605 in accordance with a cost function associated with a distance (such as a Euclidean distance) between each of the set of candidate symbol values 605 and an actually received or measured symbol value and may select the one or more candidate symbol values 605 associated with the smallest cost functions (or the shortest Euclidean distances). The cost function may be defined in accordance with Equation 11.

$$cost_{L,i} = \sum_{i=1}^{L} |y_{i,j} - x_{i,j}(s_i)|^2 \qquad (11)$$

For example, the receiving device 210 may initialize or begin a decoding tree assuming a candidate symbol value 605-*a* associated with an $s_0$ value, which may be associated with a spine 320-*b*-1. In some aspects, $s_0$ may be a constant or static value, such as zero, or may be a value associated with an identifier of one or more devices.

The receiving device 210 may generate a set of candidate symbol values 605-*b* for a subsequent spine 320-*b*-2, including a candidate symbol value 605-*b*-1, a candidate symbol value 605-*b*-2, a candidate symbol value 605-*b*-3, a candidate symbol value 605-*b*-4, and a candidate symbol value 605-*b*-5. In some implementations, the receiving device 210 may generate the set of candidate symbol values 605-*b* by inputting, into a first hash function 315, the $s_0$ value and multiple first sets of k candidate bits (which may function as or be examples of possibilities for bits included in a first message segment 310, such as possible bit string values of a message segment 310-*a*-1 as shown in FIG. 3) and obtaining, as an output of the first hash function 315, a first set of candidate encoded values (such as a first set of candidate spine values for the spine 320-*b*-2). The receiving device 210 may input, into a first RNG 325, the first set of candidate encoded values (such as the first set of candidate spines) and obtain, as an output of the first RNG 325, the set of candidate symbol values 605-*b* for the spine 320-*b*-2. The receiving device 210 may compare each of the set of candidate symbol values 605-*b* to a channel measurement (for that spine 320-*b*-2, if transmitted) and may select B candidate symbol values 605-*b* that are associated with a smallest cost function or Euclidean distance relative to the channel measurement. As shown in the decoding scheme 600, B=4 (such that the receiving device 210 may select four candidate symbol values 605 for further consideration or evaluation).

The receiving device 210 may generate a set of candidate symbol values 605-*c* for a subsequent spine 320-*b*-3 (shown as including a single candidate symbol value 605-*c* for illustrative purposes). In some implementations, the receiving device 210 may generate the set of candidate symbol values 605-*c* by inputting, into a second hash function 315, a candidate spine value associated with the candidate symbol value 605-*b*-3 and multiple second sets of k candidate bits (which may function as or be examples of possibilities for bits included in a second message segment 310, such as possible bit string values of a message segment 310-*a*-2 as shown in FIG. 3) and obtaining, as an output of the second hash function 315, a second set of candidate encoded values (such as a second set of candidate spines for the spine 320-*b*-3). The receiving device 210 may input, into a second RNG 325, the second set of candidate encoded values (such as the second set of candidate spines) and obtain, as an output of the second RNG 325, the set of candidate symbol values 605-*c*. The receiving device 210 may compare each of the set of candidate symbol values 605-*c* to a channel measurement (of a modulation symbol for that spine 320-*b*-3, if transmitted) and may select B candidate symbol values 605-*c* that are associated with a smallest cost function or Euclidean distance relative to the channel measurement.

As shown by the decoding scheme 600, the receiving device 210 may select the one candidate symbol value 605-*c* shown, potentially among other candidate symbol values 605-*c* associated with potential spine values for the spine 320-*b*-3.

The receiving device 210 may generate a set of candidate symbol values 605-*d* for a subsequent spine 320-*b*-4, including a candidate symbol value 605-*d*-1, a candidate symbol value 605-*d*-2, a candidate symbol value 605-*d*-3, a candidate symbol value 605-*d*-4, and a candidate symbol value 605-*d*-5. In some implementations, the receiving device 210 may generate the set of candidate symbol values 605-*d* by inputting, into a third hash function 315, a spine value associated with the candidate symbol value 605-*c* and multiple third sets of k candidate bits (which may function as or be examples of possibilities for bits included in a third message segment 310, such as possible bit string values of a message segment 310-*a*-3 as shown in FIG. 3) and obtaining, as an output of the third hash function 315, a third set of candidate encoded values (such as a third set of candidate spines 320 for a spine 320-*b*-4). The receiving device 210 may input, into a third RNG 325, the third set of candidate encoded values (such as the third set of candidate spines 320) and obtain, as an output of the third RNG 325, the set of candidate symbol values 605-*d*. The receiving device 210 may compare each of the set of candidate symbol values 605-*d* to a channel measurement (of a modulation symbol for that spine 320-*b*-4, if transmitted) and may select B candidate symbol values 605-*d* that are associated with a smallest cost function or Euclidean distance relative to the channel measurement.

The receiving device 210 may likewise generate other sets of candidate symbol values 605 until the receiving device 210 reaches an $n/k^{th}$ decoding stage associated with a spine 320-*b*-5, where the receiving device 210 may generate a set of candidate symbol values 605-*e*. The set of candidate symbol values 605-*e* may include a candidate symbol value 605-*e*-1, a candidate symbol value 605-*e*-2, a candidate symbol value 605-*e*-3, a candidate symbol value 605-*e*-4, a candidate symbol value 605-*e*-5, a candidate symbol value 605-*e*-6, and a candidate symbol value 605-*e*-7. The receiving device 210 may generate the set of candidate symbol values 605-*e* similarly to how the receiving device 210 generates the other sets of candidate symbol values 605 and may similarly select B candidate symbol values 605-*e* that are associated with a smallest cost function or Euclidean distance relative to a channel measurement (of a modulation symbol for that spine 320-*b*-5, if transmitted). In some aspects, the $n/k^{th}$ decoding stage associated with the spine 320-*b*-5 may be a final decoding stage associated with a final spine 320 (such that the spine 320-*b*-5 conveys information associated with the entire message 305). In such aspects, the receiving device 210 may measure, detect, or otherwise identify which of the candidate symbol values 605 is closest to the channel measurement and may infer that whichever candidate symbol value 605 is closest is associated with a correct decoding of the message 305.

In some implementations, a decoder of a receiving device 210 may calculate a Euclidean distance metric at each step or stage of the decoding scheme 600. For example, the decoder may implement an encoder block on each possible codeword with a length of n and, on each stage of the decoding scheme 600, may calculate a metric between a set of candidate symbol values 605 (a set of generated constellation symbols or points) relative to a received constellation symbol or point using Equation 11. A receiving device 210 may store or otherwise save the metric throughout (all of)

the stages of the decoding scheme 600 (such as across a quantity of transmission occasions 335 associated with a given message 305) and may identify, notice, or otherwise determine that if a hash function 315 received two inputs that differ (even by one bit), an output of the hash function 315 may be different as a result of the properties of the hash functions 315. Thus, the calculated metric, which may be an example of a decoding metric, a path cost metric, or a value of the cost function, may be different as well. A receiving device 210 may calculate and save the path cost metric and the path cost metric may increase from a first (such as earliest) symbol, spine, or coding index at which the decoder of the receiving device 210 begins to diverge from an actually received or measured constellation symbol or point.

In accordance with examples disclosed herein, a transmitting device 205 or a receiving device 210, or both, may map spines 320 or symbol values 330 associated with one or more coding stages or indices of the decoding scheme 600 to communication resources in accordance with a resource mapping scheme. The resource mapping scheme may indicate a mapping of a spine 320 or symbol value 330 to one or more components of a constellation modulation, one or more modulation constellations, one or more spatial layers, one or more channel uses, or any combination thereof. Further, the decoding scheme 600 may be described in the context of some channel conditions (such as in the context of an AWGN channel). Coding schemes and example resource mappings are further described in the context of other channel conditions (such as in the context of a fading channel or a MIMO channel) herein, including with reference to FIGS. 8-10.

Figure 7:
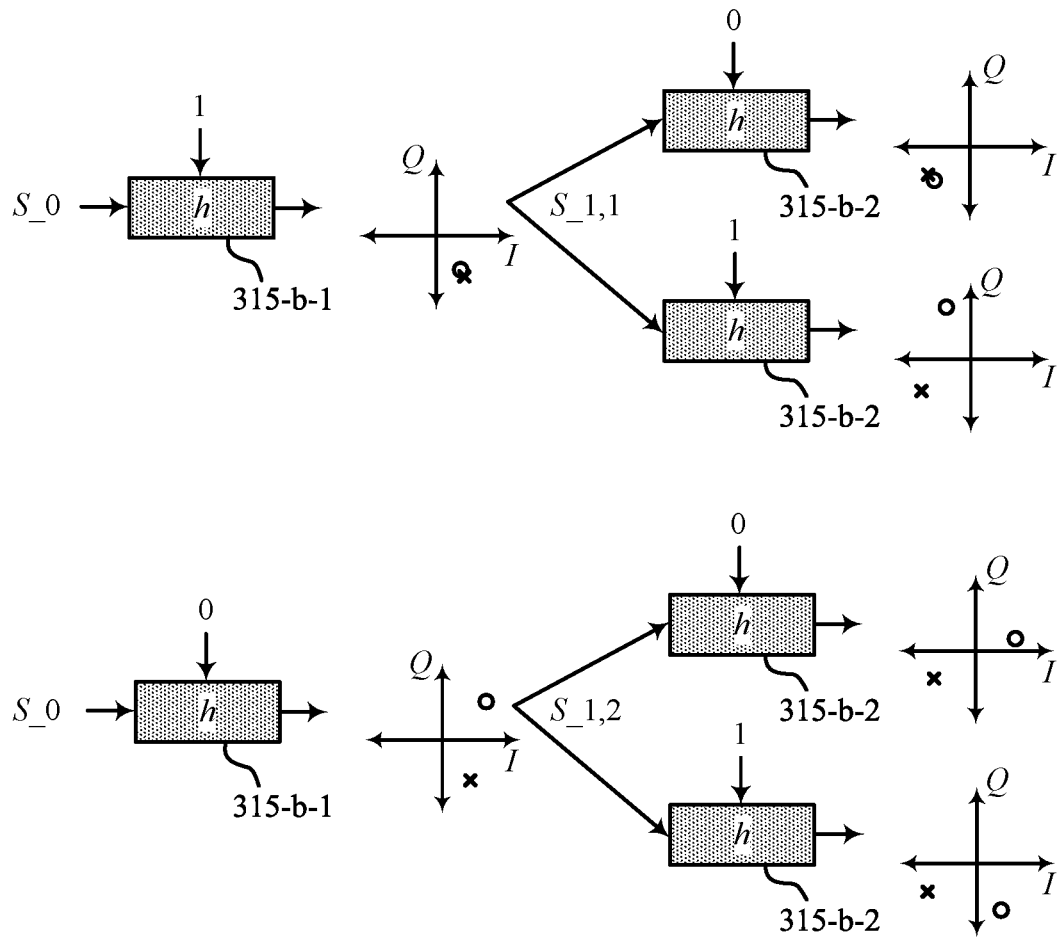

FIG. 7 shows an example decoding scheme 700 that supports communications resource allocation for rateless coding. The decoding scheme 700 may be implemented to realize aspects of the signaling diagram 200. For example, the decoding scheme 700 illustrates a decoding process at a receiving device 210 for decoding one or more signals associated with a rateless code, such as a spinal code. In some implementations, a receiving device 210 may implement the decoding scheme 700 to identify which of a set of candidate symbol values 605 have a lowest path cost in accordance with which of the set of candidate symbol values 605 have a shortest distance (such as a shortest Euclidean distance) to a channel measurement 705.

For example, at each decoding stage or spine 320 of a decoder (such as a bubble decoder) at a receiving device 210, the receiving device 210 may compare each of a set of candidate symbol values 605 to a channel measurement 705 to identify one or more of the set of candidate symbol values 605 that have a shortest distance (such as a shortest Euclidean distance) to the channel measurement 705. The receiving device 210 may select the one or more of the set of candidate symbol values 605 that have the shortest distance as candidate symbol values 605 that are relatively more likely to be an actually transmitted symbol value 330 from a transmitting device 205 and may trim or focus a decoding tree, such as a decoding tree illustrated by the decoding scheme 600, to the selected one or more of the set of candidate symbol values 605 at that decoding stage or spine 320 of the decoder. In some aspects, a quantity of the one or more candidate symbol values 605 that a receiving device 210 selects at each decoding stage or spine 320 of the decoder may be equal to B, as described in more detail with reference to FIG. 6.

In some implementations, and as illustrated by the decoding scheme 700, a receiving device 210 may obtain, calculate, ascertain, or otherwise determine different candidate symbol values 605 in accordance with or as a result of inputting, into a hash function 315, different candidate bits or different spines 320 (such as different spine values), or both. In some aspects, a receiving device 210 may input a quantity of different candidate bits in accordance with a quantity of possible permutations of bits that may be included in or conveyed by a given message segment 310. For example, a receiving device 210 may input, into a hash function 315-$b$-1, $s_0$ (or s_0, which may be an example of an initial spine value or a seed value and, in some implementations, may be set equal to an identifying value or parameter of an intended receiving device 210, such as an RNTI of the intended receiving device 210) and candidate bit values of 1 or 0 in scenarios in which a message segment 310 includes or conveys one bit (such that k=1).

The receiving device 210 may receive, calculate, or otherwise obtain, from the hash function 315-$b$-1, two different candidate spines 320 in accordance with the two different candidate bit value inputs, may obtain two different candidate symbol values 605 using the two different candidate spine values as inputs into an RNG 325, and may map the two different candidate symbol values 605 to constellation points (such as an I+jQ point in a modulation domain) or other coordinate point representations. The receiving device 210 may measure a transmitted symbol value 330 via a channel measurement 705 and may similarly map the channel measurement 705 to a constellation point (such as an I+jQ point in a modulation domain) or another coordinate point representation and may compare the two different candidate symbol values 605 to the channel measurement 705. In some implementations, the receiving device 210 may compare the two different candidate symbol values 605 to the channel measurement 705 by calculating or otherwise determining a distance between each of the candidate symbol values 605 and the channel measurement 705. For example, the receiving device 210 may calculate or otherwise determine a first distance between the candidate symbol value 605 obtained from the inputting of the candidate bit value 1 and the channel measurement 705 and may calculate or otherwise determine a second distance between the candidate symbol value 605 received or obtained from the inputting of the candidate bit value 0 and the channel measurement 705. The receiving device 210 may compare the first distance with the second distance to identify or otherwise determine which of the candidate bit value 1 or the candidate bit value 0 is more likely a bit value conveyed by a received signal associated with that decoding stage or spine 320.

In some aspects, the receiving device 210 may identify or determine that the first distance associated with the candidate symbol value 605 obtained from the inputting of the candidate bit value 1 is smaller than the second distance associated with the candidate symbol value 605 obtained from the inputting of the candidate bit value 0. In some implementations, the receiving device 210 may elect to continue the decoding of the received signal assuming that the candidate bit value of 1 is a correct input for the hash function 315-$b$-1. Further, in some implementations, the receiving device 210 may elect to continue the decoding of the received signal assuming that both the candidate bit value of 1 and the candidate bit value of 0 may potentially be correct inputs for the hash function 315-$b$-1. For example, the receiving device 210 may continue the decoding down a sub-tree from each of the candidate symbol value 605 obtained from the inputting of the candidate bit value 1 and the candidate symbol value 605 obtained from the inputting of the candidate bit value 0 if both are within the B candidate symbol values 605 selected for a given decoding stage or spine 320 (such that both the first distance and the second distance satisfy, or are lower than, a threshold distance or such that the first distance and the second distance are among a quantity B of relatively shortest distances measured by the receiving device 210 for the given decoding stage or spine 320).

In scenarios in which the receiving device 210 continues the decoding down sub-trees from each of the candidate symbol value 605 obtained from the inputting of the candidate bit value 1 and the candidate symbol value 605 obtained from the inputting of the candidate bit value 0, the receiving device 210 may use the two different spines 320 obtained from the hash function 315-b-1 as inputs into a hash function 315-b-2 (a next hash function 315 of a rateless coding scheme). For example, the receiving device 210 may input a first spine 320 of $s_{1,1}$ (or s_1,1) and a second spine 320 of $s_{1,2}$ (or s_1,2), both of which may be candidate spines 320 for a next decoding stage or spine 320 of the decoder at the receiving device 210, into the hash function 315-b-2 along with candidate bit values for information that may be included or conveyed by a message segment 310 associated with that next decoding stage or spine 320.

As illustrated by the decoding scheme 700, the receiving device 210 may obtain two different candidate spines 320 in accordance with inputting, into the hash function 315-b-2, the candidate spine 320 $s_{1,1}$ and each of a candidate bit value 0 and a candidate bit value 1 and may obtain another two different candidate spines 320 in accordance with inputting, into the hash function 315-b-2, the candidate spine $s_{1,2}$ and each of a candidate bit value 0 and a candidate bit value 1. The receiving device 210 may obtain four different candidate symbol values 605 in accordance with inputting each of the (four) different candidate spines 320 into an RNG 325 and may map the four different candidate symbol values 605 to constellation points (such as an I+jQ point in a modulation domain) or other coordinate point representations. The receiving device 210 may measure an actually transmitted symbol value 330 associated with that decoding stage or spine 320 via a channel measurement 705 and may similarly map the channel measurement 705 to a constellation point (such as an I+jQ point in a modulation domain) or another coordinate point representation and may compare the four different candidate symbol values 605 to the channel measurement 705.

In some implementations, the receiving device 210 may compare the four different candidate symbol values 605 to the channel measurement 705 by calculating or otherwise determining a distance between each of the candidate symbol values 605 and the channel measurement 705. For example, the receiving device 210 may calculate or otherwise determine a first distance between the candidate symbol value 605 obtained from the inputting of the spine 320 $s_{1,1}$ and the candidate bit value 0 and the channel measurement 705, may calculate or otherwise determine a second distance between the candidate symbol value 605 received or obtained from the inputting of the spine 320 $s_{1,1}$ and the candidate bit value 1 and the channel measurement 705, and so on for each of a third distance and a fourth distance for the candidate symbol values 605 obtained from spine 320 $s_{1,2}$ and the candidate bit values 0 and 1, respectively. The receiving device 210 may compare the first distance, the second distance, the third distance, and the fourth distance to identify or otherwise determine which one or more of the candidate symbol values 605 are more likely actually transmitted symbol values 330 associated with that decoding stage or spine 320.

In some aspects, the receiving device 210 may identify or determine that the first distance associated with the candidate symbol value 605 obtained from the inputting of the candidate spine 320 $s_{1,1}$ and the candidate bit value 0 is smaller than the second distance, the third, distance, and the fourth distance. In some implementations, the receiving device 210 may elect to continue the decoding of the received signal assuming that the candidate spine 320 $s_{1,1}$ and the candidate bit value 0 are or may be correct inputs for the hash function 315-b-2. Further, in some implementations, the receiving device 210 may elect to continue the decoding of the received signal assuming that one or more other candidate spine values or candidate bit values are or may be correct inputs for the hash function 315-b-2. For example, the receiving device 210 may continue the decoding down a sub-tree from each candidate symbol value 605 that are within the B candidate symbol values 605 selected for a given decoding stage or spine 320.

Further, although described in the context of candidate bit values of a single bit (having a bit value of either 0 or 1), a receiving device 210 may similarly input other candidate bit values in scenarios in which message segments 310 include or convey other quantities of bits. For example, a receiving device 210 may input a candidate bit value 11, a candidate bit value 10, a candidate bit value 01, or a candidate bit value 00 into a hash function 315 in scenarios in which a message segment 310 (associated with a current decoding stage or spine 320 of the decoder) includes or conveys two bits (such that k=2). A receiving device 210 may similarly input any quantity of candidate bits corresponding to a quantity of bits that are included or conveyed by a message segment 310 (associated with a current decoding stage or spine 320 of the decoder) and, in some aspects, may support an upper limit of k (such as an upper limit of k=4). In some implementations, a receiving device 210 or a transmitting dive, or both, may signal such an upper limit of k to one or more other devices, such as the other of the receiving device 210 or the transmitting device 205.

In accordance with the calculation of the decoding metric using a Euclidean distance metric (either or both of which may be referred to as a spinal decoder metric), during a bubble decoder process, the decoding metric may become large on symbols that are unlikely to be an actually received symbol and the nodes with the lowest decoding metrics are the ones that survive the decoder process. Further, and as illustrated by and described in more detail with reference to FIG. 6, for each symbol there are $2^k$ other hypotheses that a receiving device 210 may make in order decode a correct symbol in each stage. Thus, in some implementations, a transmitting device 205 may focus on the hypotheses giving relatively low decoding metrics or path costs, as these are the hypotheses that may expand the decoding tree at the receiver side and potentially expand wrong codewords during the process.

For example, during encoding, an encoder of a transmitting device 205 may check the cost of a quantity of decoding hypothesis symbols (which may be equivalently referred to as decoding hypotheses or candidate symbol values 605), such as $2^k$ decoding hypothesis symbols, and may mark one or more symbol hypotheses with a path cost satisfying a threshold, such as path cost<threshold path cost, because those hypotheses are the ones that may be mostly likely to diverge a receiver from a correct codeword. The transmitting device may use the one or more marked symbols (which may correspond to or be associated with spines 320) for a next retransmission due to the relatively higher likelihood for the one or more marked symbols to be associated with a relatively higher error probability than other symbols.

In accordance with examples disclosed herein, a transmitting device 205 or a receiving device 210, or both, may map spines 320 or symbol values 330 associated with one or more coding stages or indices of the decoding scheme 700 to communication resources in accordance with a resource mapping scheme. The resource mapping scheme may indicate a mapping of a spine 320 or symbol value 330 to one or more components of a constellation modulation, one or more modulation constellations, one or more spatial layers, one or more channel uses, or any combination thereof.

Figure 8:
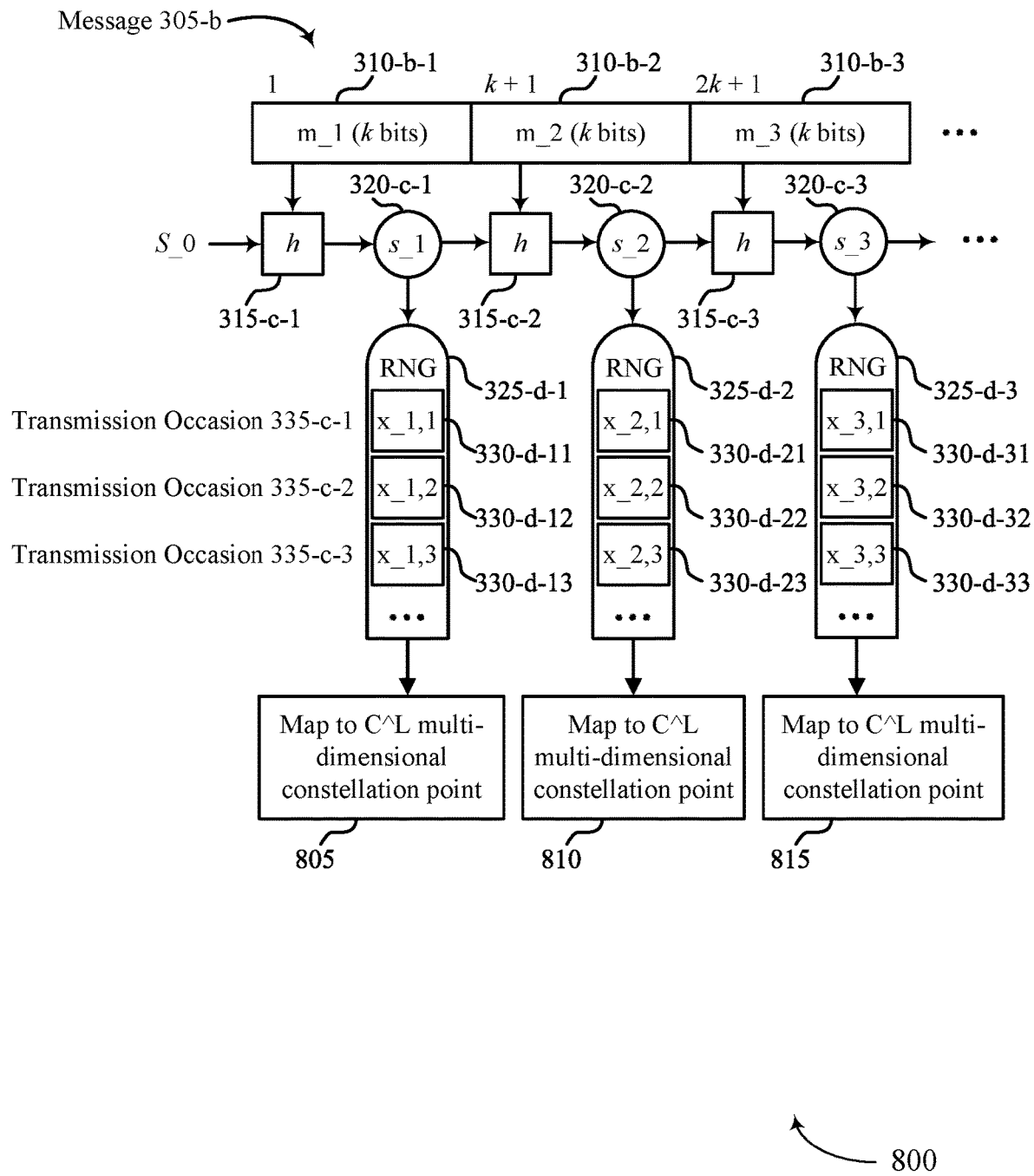
FIGS. 8-10 show example resource mapping schemes that support communications resource allocation for rateless coding.

FIG. 8 shows an example resource mapping scheme 800 that supports communications resource allocation for rateless coding. The resource mapping scheme 800 may implement or be implemented to realize aspects of the wireless communications system 100 or the signaling diagram 200. For example, the resource mapping scheme 800 illustrates an example resource mapping for one or more coding indices of a rateless coding scheme to communication resources over which a transmitting device 205 may transmit one or more signals associated with the one or more coding indices and over which a receiving device 210 may receive the one or more signals associated with the one or more coding indices. In some implementations, for example, a transmitting device 205 and a receiving device 210 may employ the resource mapping scheme 800 to adapt or extend rateless codes, such as spinal codes, to deployment scenarios associated with MIMO communication.

The resource mapping scheme 800 may illustrate a resource mapping of coding indices associated with a spinal coding scheme, which may be an example of the rateless coding scheme 300. For example, the rateless coding illustrated by FIG. 8 may involve or pertain to a cumulative or sequential encoding of a message 305-$b$ across a set of message segments 310-$b$. A transmitting device 205 may partition the message 305-$b$ into a message segment 310-$b$-1 starting at bit 1 of the message 305-$b$, a message segment 310-$b$-2 starting at bit k+1 of the message 305-$b$, a message segment 310-$b$-3 starting at bit 2k+1 of the message 305-$b$, and so on for each message segment 310-$b$ of the message 305-$b$. An encoder of the transmitting device 205 may include, for each stage of the rateless coding scheme 300, a hash function 315 and a numeric transposition function, such as an RNG 325 or other scrambling function.

A transmitting device 205 may obtain a spine 320-$c$-1 as an output of a hash function 315-$c$-1, may obtain a spine 320-$c$-2 as an output of a hash function 315-$c$-2, and may obtain a spine 320-$c$-3 as an output of a hash function 315-$c$-3. Further, and as shown in the rateless coding scheme illustrated in FIG. 8, a transmitting device 205 may obtain various symbol values 330 from each RNG 325 depending on a transmission occasion 335. For example, an RNG 325-$d$-1 may output, for the input spine 320-$c$-1, a symbol value 330-$d$-11 for the transmission occasion 335-$c$-1, a symbol value 330-$d$-12 for the transmission occasion 335-$c$-2, and a symbol value 330-$d$-13 for the transmission occasion 335-$c$-3. An RNG 325-$d$-2 may output, for the input spine 320-$c$-2, a symbol value 330-$d$-21 for the transmission occasion 335-$c$-1, a symbol value 330-$d$-22 for the transmission occasion 335-$c$-2, and a symbol value 330-$d$-23 for the transmission occasion 335-$c$-3. An RNG 325-$d$-3 may output, for the input spine 320-$c$-3, a symbol value 330-$d$-31 for the transmission occasion 335-$c$-1, a symbol value 330-$d$-32 for the transmission occasion 335-$c$-2, and a symbol value 330-$d$-33 for the transmission occasion 335-$c$-3.

In accordance with examples disclosed herein (and for implementations in which communicating devices map a coding index or symbol value 330 to one of a real component or an I component of a modulation constellation or an imaginary component or a Q component of a modulation constellation), communicating devices may map a symbol value 330 (which may be represented as $x_{p,l}$ and may be an output for a specific coding stage or index p of an encoder) to a multi-dimensional constellation of $C^L$ constellation points, where C is a QAM order per layer and L is a quantity of layers. Further, in some aspects, a transmitting device 205 and a receiving device 210 may use or otherwise support non-equal constellation sizes per layer, which may be associated with an overall quantity of constellation points $\Pi_l C_l$, where $C_l$ refers to a constellation order for an $l^{th}$ layer. For example, one or both of a transmitting device 205 and a receiving device 210 may adapt a constellation size for each layer (such as on a per-layer basis) in accordance with a relative SNR of the layer (which may be associated with an eigenvalue of the layer).

At 805, a transmitting device 205 (such as in an encoding operation) and a receiving device 210 (such as in a decoding operation) may map an output of a first coding index of the rateless coding scheme (such as an output symbol value 330 associated with the spine 320-$c$-1, if a symbol value 330 is output for the spine 320-$c$-1) to a $C^L$ multi-dimensional constellation point, where a multi-dimensional constellation point may include or otherwise refer to a modulation constellation associated with an I component, a Q component, and a quantity of spatial layers (such as to support a three-dimensional constellation point).

At 810, the transmitting device 205 and the receiving device 210 may map an output of a second coding index of the rateless coding scheme (such as an output symbol value 330 associated with the spine 320-$c$-2, if a symbol value 330 is output for the spine 320-$c$-2) to a different $C^L$ multi-dimensional constellation point.

At 815, the transmitting device 205 and the receiving device 210 may map an output of a third coding index of the rateless coding scheme (such as an output symbol value 330 associated with the spine 320-$c$-3, if a symbol value 330 is output for the spine 320-$c$-3) to a different $C^L$ multi-dimensional constellation point. The transmitting device 205 and the receiving device 210 may similarly map any other output symbol values 330 associated with any other coding stages or indices associated with the rateless coding scheme in accordance with a quantity of coding indices and the resource mapping scheme 800.

In some aspects, and as described in more detail with reference to FIGS. 3 and 5, among others, a transmitting device 205 and a receiving device 210 may support more than k bits per channel use by puncturing. For example, puncturing every even symbol may result in B=2k bits per channel use, puncturing three quarters of the symbols may result in B=4k bits per channel use, and so on. In some implementations, a transmitting device 205 and a receiving device 210 may employ a transmission puncturing scheme in combination with a resource mapping scheme, as illustrated by and described in more detail with reference to FIG. 9.

Figure 9:
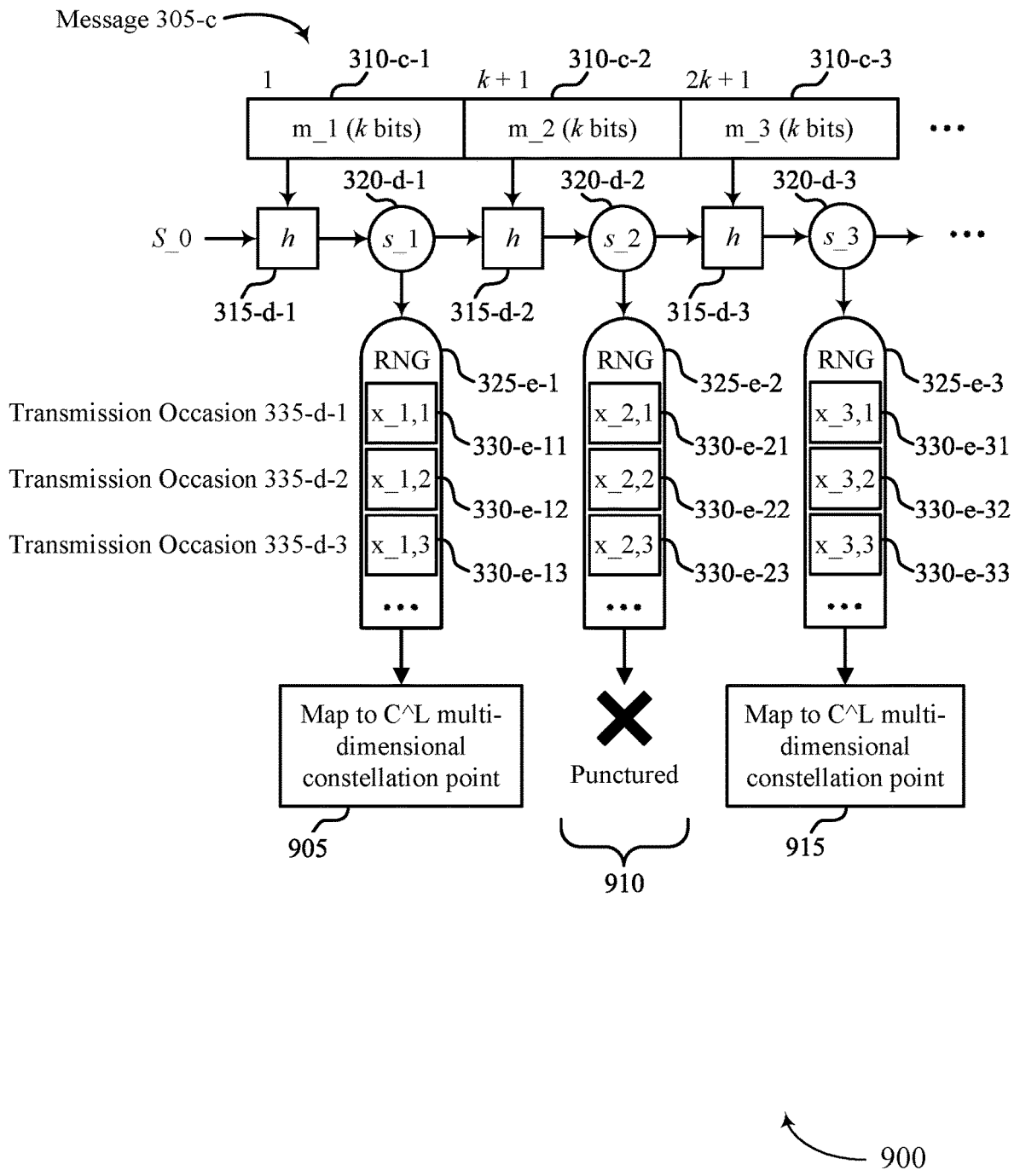

FIG. 9 shows an example resource mapping scheme 900 that supports communications resource allocation for rateless coding. The resource mapping scheme 900 may implement or be implemented to realize aspects of the wireless communications system 100 or the signaling diagram 200. For example, the resource mapping scheme 900 illustrates an example resource mapping for one or more coding indices of a rateless coding scheme to communication resources over which a transmitting device 205 may transmit one or more signals associated with the one or more coding indices and over which a receiving device 210 may receive the one or more signals associated with the one or more coding indices. In some implementations, for example, a transmitting device 205 and a receiving device 210 may employ the resource mapping scheme 900 to adapt or extend rateless codes, such as spinal codes, to deployment scenarios associated with MIMO communication.

The resource mapping scheme 900 may illustrate a resource mapping of coding indices associated with a spinal coding scheme, which may be an example of the rateless coding scheme 300. For example, the rateless coding illustrated by FIG. 9 may involve or pertain to a cumulative or sequential encoding of a message 305-c across a set of message segments 310-c. A transmitting device 205 may partition the message 305-c into a message segment 310-c-1 starting at bit 1 of the message 305-c, a message segment 310-c-2 starting at bit k+1 of the message 305-c, a message segment 310-c-3 starting at bit 2k+1 of the message 305-c, and so on for each message segment 310-c of the message 305-c. An encoder of the transmitting device 205 may include, for each stage of the rateless coding scheme 300, a hash function 315 and a numeric transposition function, such as an RNG 325 or other scrambling function.

A transmitting device 205 may obtain a spine 320-d-1 as an output of a hash function 315-d-1, may obtain a spine 320-d-2 as an output of a hash function 315-d-2, and may obtain a spine 320-d-3 as an output of a hash function 315-d-3. Further, and as shown in the rateless coding scheme illustrated in FIG. 9, a transmitting device 205 may obtain various symbol values 330 from each RNG 325 depending on a transmission occasion 335. For example, an RNG 325-e-1 may output, for the input spine 320-d-1, a symbol value 330-e-11 for the transmission occasion 335-d-1, a symbol value 330-e-12 for the transmission occasion 335-d-2, and a symbol value 330-e-13 for the transmission occasion 335-d-3. An RNG 325-e-2 may output, for the input spine 320-d-2, a symbol value 330-e-21 for the transmission occasion 335-d-1, a symbol value 330-e-22 for the transmission occasion 335-d-2, and a symbol value 330-e-23 for the transmission occasion 335-d-3. An RNG 325-e-3 may output, for the input spine 320-d-3, a symbol value 330-e-31 for the transmission occasion 335-d-1, a symbol value 330-e-32 for the transmission occasion 335-d-2, and a symbol value 330-e-33 for the transmission occasion 335-d-3.

In accordance with examples disclosed herein (and for implementations in which communicating devices map a coding index or symbol value 330 to one of a real component or an I component of a modulation constellation or an imaginary component or a Q component of a modulation constellation), communicating devices may map a symbol value 330 (which may be represented as $x_{p,l}$ and may be an output for a specific coding stage or index p of an encoder) to a multi-dimensional constellation of $C^L$ constellation points, where C is a QAM order per layer and L is a quantity of layers.

At 905, for example, a transmitting device 205 and a receiving device 210 may map an output of a first coding index of the rateless coding scheme (such as an output symbol value 330 associated with the spine 320-d-1, if a symbol value 330 is output for the spine 320-d-1) to a $C^L$ multi-dimensional constellation point.

At 910, the transmitting device 205 and the receiving device 210 may refrain from mapping an output of a second coding index of the rateless coding scheme (such as an output symbol value 330 associated with the spine 320-d-2, if a symbol value 330 is output for the spine 320-d-2) to a $C^L$ multi-dimensional constellation point. For example, the transmitting device 205 and the receiving device 210 may support a puncturing at the second coding index and the transmitting device may refrain from transmitting one or more signals associated with the second coding index (for at least a current transmission occasion 335).

At 915, the transmitting device 205 and the receiving device 210 may map an output of a third coding index of the rateless coding scheme (such as an output symbol value 330 associated with the spine 320-d-3, if a symbol value 330 is output for the spine 320-d-3) to a $C^L$ multi-dimensional constellation point.

In some implementations, a spinal receiver complexity may be proportional to an actual quantity of bits per channel use regardless of a constellation order or a quantity of layers used for a given transmission. For example, some ML demodulators may scan $C^L$ constellation points, but, in accordance with the examples described herein, a decoder or demodulator for a spinal code may scan $2^B$ constellation points (where B is equal to the quantity of bits per channel use) regardless of the full constellation (which may be multi-dimensional for MIMO communication) size.

Further, the quantity of bits per channel use may follow, track, align with, or merge to a channel capacity. For example, for quantities of bits per channel use that are less than or equal to eight (such that B≤8), a decoder or demodulator for a spinal code may perform a less than or equal to 256 point scan. Such a scan may be comparable to a threshold complexity of four layers and a 64 point size scan per layer, as such a scenario amounts to a 4*64=256 scan size. Thus, for at least up to eight bits per channel use, a spinal code may be decoded with a threshold complexity (or lower) and with similar performance to an ML approach. Such a relatively low decoding complexity with performance similar or equal to ML joint demodulation and decoding may facilitate a natural extension of spinal code, which may enable communicating devices to shape a constellation per layer and thus control code and adapt the code to specific channel or rank conditions.

Figure 10:
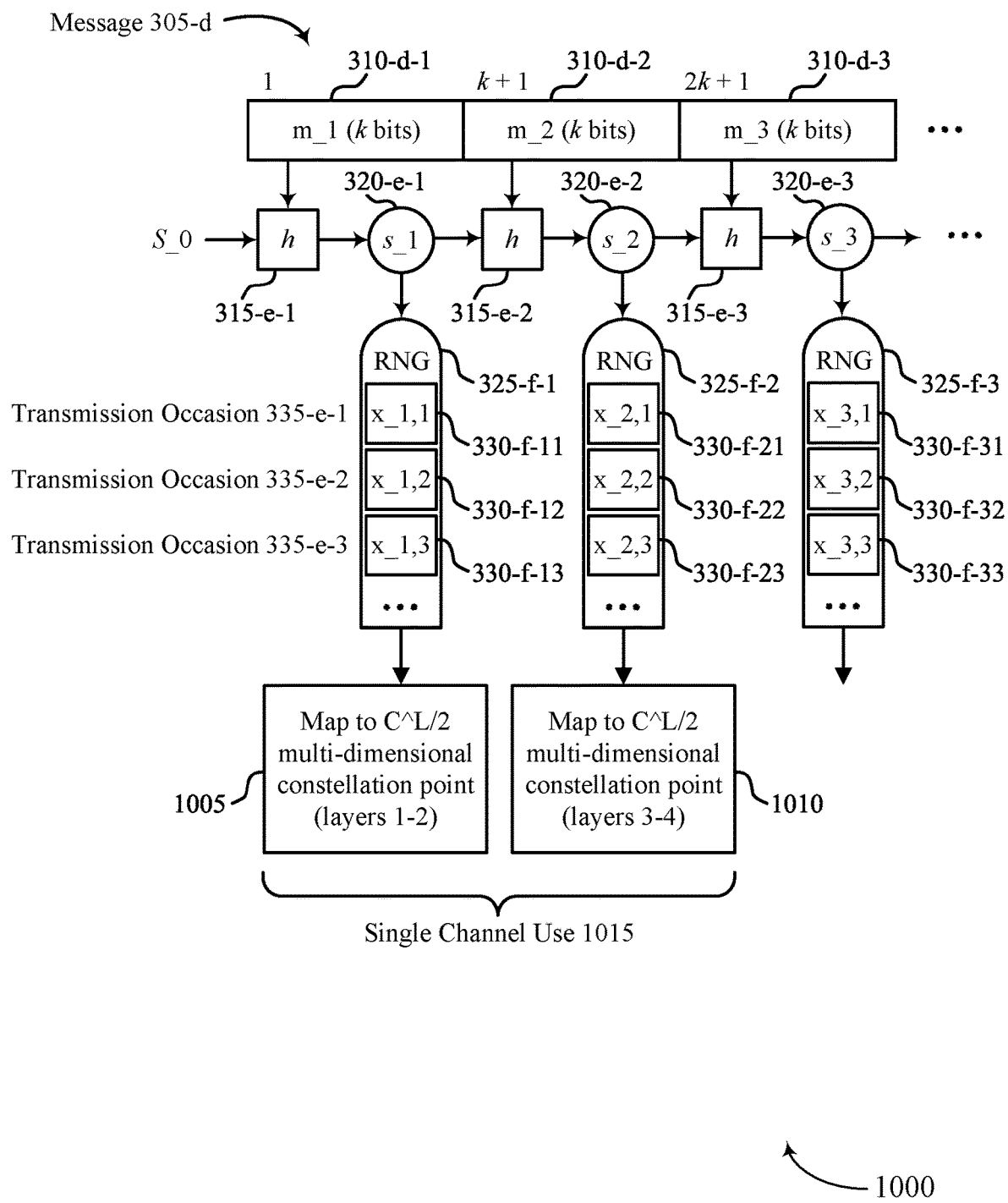

In some implementations, a transmitting device 205 and a receiving device 210 may elect to use different resource mapping schemes depending on a channel condition or one or more channel measurements. For example, a transmitting device 205 and a receiving device 210 may select between mapping different coding indices to different channel uses for some channel conditions (as illustrated by FIGS. 8 and 9) and mapping different coding indices to a single channel use for some other channel conditions (as illustrated by FIG. 10). In some implementations, a transmitting device 205 and a receiving device 210 may support a threshold channel measurement, such as a threshold SNR, according to which the transmitting device 205 and the receiving device may select between different resource mapping schemes.

As such, a transmitting device 205 and a receiving device 210 may select a resource mapping scheme, such as the resource mapping scheme 800 or the resource mapping scheme 900, associated with mapping different coding indices to different channel uses if an SNR measurement fails to satisfy (such as is less than) a threshold SNR or may select a resource mapping scheme associated with mapping different coding indices to a single channel use if the SNR measurement satisfies (such as is greater than) the threshold SNR. For example, resource mapping schemes associated with mapping different coding indices to a single channel use may scale with relatively greater performance (such as with relatively lower decoding complexity) as compared to resource mapping schemes associated with mapping different coding indices to different channel uses in higher SNR scenarios. An SNR of approximately 40 dB, for example, may enable communicating devices to achieve k=13 bits per channel use using a rateless coding scheme, which may result in $2^k=2^{13}$ scans and may be too computationally complex for a receiving device 210. Accordingly, for such or similarly high SNRs, a transmitting device 205 and a receiving device may use a resource mapping scheme associated with mapping different coding indices to a single channel use, as illustrated by and described in more detail with reference to FIG. 10.

FIG. 10 shows an example resource mapping scheme 1000 that supports communications resource allocation for rateless coding. The resource mapping scheme 1000 may implement or be implemented to realize aspects of the wireless communications system 100 or the signaling diagram 200. For example, the resource mapping scheme 1000 illustrates an example resource mapping for one or more coding indices of a rateless coding scheme to communication resources over which a transmitting device 205 may transmit one or more signals associated with the one or more coding indices and over which a receiving device 210 may receive the one or more signals associated with the one or more coding indices. In some implementations, for example, a transmitting device 205 and a receiving device 210 may employ the resource mapping scheme 1000 to adapt or extend rateless codes, such as spinal codes, to deployment scenarios associated with MIMO communication.

The resource mapping scheme 1000 may illustrate a resource mapping of coding indices associated with a spinal coding scheme, which may be an example of the rateless coding scheme 300. For example, the rateless coding illustrated by FIG. 10 may involve or pertain to a cumulative or sequential encoding of a message 305-*d* across a set of message segments 310-*d*. A transmitting device 205 may partition the message 305-*d* into a message segment 310-*d*-1 starting at bit 1 of the message 305-*d*, a message segment 310-*d*-2 starting at bit k+1 of the message 305-*d*, a message segment 310-*d*-3 starting at bit 2k+1 of the message 305-*d*, and so on for each message segment 310-*d* of the message 305-*d*. An encoder of the transmitting device 205 may include, for each stage of the rateless coding scheme 300, a hash function 315 and a numeric transposition function, such as an RNG 325 or other scrambling function.

A transmitting device 205 may obtain a spine 320-*e*-1 as an output of a hash function 315-*e*-1, may obtain a spine 320-*e*-2 as an output of a hash function 315-*e*-2, and may obtain a spine 320-*e*-3 as an output of a hash function 315-*e*-3. Further, and as shown in the rateless coding scheme illustrated in FIG. 10, a transmitting device 205 may obtain various symbol values 330 from each RNG 325 depending on a transmission occasion 335. For example, an RNG 325-*f*-1 may output, for the input spine 320-*e*-1, a symbol value 330-*f*-11 for the transmission occasion 335-*e*-1, a symbol value 330-*f*-12 for the transmission occasion 335-*e*-2, and a symbol value 330-*f*-13 for the transmission occasion 335-*e*-3. An RNG 325-*f*-2 may output, for the input spine 320-*e*-2, a symbol value 330-*f*-21 for the transmission occasion 335-*e*-1, a symbol value 330-*f*-22 for the transmission occasion 335-*e*-2, and a symbol value 330-*f*-23 for the transmission occasion 335-*e*-3. An RNG 325-*f*-3 may output, for the input spine 320-*e*-3, a symbol value 330-*f*-31 for the transmission occasion 335-*e*-1, a symbol value 330-*f*-32 for the transmission occasion 335-*e*-2, and a symbol value 330-*f*-33 for the transmission occasion 335-*e*-3.

In accordance with examples disclosed herein (and for implementations in which communicating devices map a coding index or symbol value 330 to one of a real component or an I component of a modulation constellation or an imaginary component or a Q component of a modulation constellation), communicating devices may perform one or more channel measurements and select to concatenate or otherwise combine two or more output symbol values 330 to a single channel use to encode more bits in a single channel use if the one or more channel measurements satisfy a threshold channel measurement (such as a threshold SNR). For example, an encoder of a transmitting device 205 may concatenate two outputs $x_{p,2l}$ and $x_{p,2l+1}$ to a single channel use to encode k'=2k bits (and also may concatenate more than two output symbol values 330 following a same principle). In such implementations, a received signal may be shown by Equation 12.

$$y_l = H \begin{bmatrix} x_{p,2l} \\ x_{p,2l+1} \end{bmatrix} + n = H_1 x_{p,2l} + H_2 x_{p,2l+1} + n \tag{12}$$

To separate $H_1$ and $H_2$, a transmitting device 205 may, in some implementations, split by layers such that $H_1$ describes or is associated with a first subset of spatial layers (such as layers 1 and 2 out of four total layers) and $H_2$ describes or is associated with a second subset of spatial layers (such as layers 3 and 4 out of the four total layers). At 1005, for example, a transmitting device 205 may map an output of a first coding index of the rateless coding scheme (such as an output symbol value 330 associated with the spine 320-*e*-1, if a symbol value 330 is output for the spine 320-*e*-1) to a $C^L/2$ multi-dimensional constellation point and to a first subset of layers (such as layers 1 and 2). At 1010, the transmitting device 205 may map an output of a second coding index of the rateless coding scheme (such as an output symbol value 330 associated with the spine 320-*e*-2, if a symbol value 330 is output for the spine 320-*e*-2) to a $C^L/2$ multi-dimensional constellation point and to a second subset of layers (such as layers 3 and 4). The transmitting device 205 may concatenate or combine the two $C^L/2$ multi-dimensional constellation points mapped to the different subsets of layers to a single channel 1015 (such as a single MIMO channel) and may transmit one or more signals associated with the two $C^L/2$ multi-dimensional constellation points over the single channel 1015.

In addition, or as an alternative, to a layers split, a transmitting device 205 may apply an arbitrary split where constellations are "nested" or pre-coded such that a multi-dimensional constellation may be described or understood as a linear combination of $x_{p,2l}$ and $x_{p,2l+1}$. For example, such a multi-dimensional constellation for which an arbitrary split is applied may be described or understood as $Ax_{p,2l}$+ $Bx_{p,2l+1}$. In such examples, the received signal may be shown by equation 13.

$$y_l = \widetilde{H_1} A x_{p,2l} + \widetilde{H_2} B x_{p,2l+1} + n = H_1 x_{p,2l} + H_2 x_{p,2l+1} + n \tag{13}$$

In some aspects, a transmitting device 205 may select values for A and B such that $x_{p,2l}$ may have a greater SNR and likelihood of detection than $x_{p,2l+1}$. Such a setup or configuration for $x_{p,2l}$ to have a greater SNR and likelihood of detection than $x_{p,2l+1}$ may be associated with one or more advantages at a decoder (such as at a receiving device 210). For example, reception of one or more signals mapped to communication resources in accordance with the resource mapping scheme 1000 may involve or otherwise be associated with two processing tasks or steps. A first processing task may be associated with linear processing (such as a linear demodulation) to restore orthogonality between $x_{p,2l}$ and $x_{p,2l+1}$ (as $x_{p,2l}$ and $x_{p,2l+1}$ may be associated with different components of a complex modulation constellation, such as I and Q components, which may lose orthogonality in some channel conditions). A second processing task may be associated with scanning over $2^k$ decoding hypotheses to update branch metrics (such as decoding metrics or path costs) for $x_{p,2l}$ and independently scanning over $2^k$ decoding hypotheses to update decoding metrics (such as path costs or branch metrics) for $x_{p,2l+1}$. In some aspects, such a mapping involving linear processing and hypothesis testing or searching may be described or understood as a summation of two MIMO channels followed by two-step demodulation and may support a limited complexity of a MIMO channel.

As part of the first processing task, a receiving device 210 may attempt to restore orthogonality between $x_{p,2l}$ and $x_{p,2l+1}$ using Equations 14-16.

$$x_{est,2l} = R_{x_p} H_1^H (H R_{x_p} H^H)^{-1} \quad (14)$$

$$x_{est,2l+1} = R_{x_p} H_2^H (H R_{x_p} H^H)^{-1} y_l \quad (15)$$

$$R_{x_p} = E[x_{p,2l} x_{p,2l}^H] = E[x_{p,2l+1} x_{p,2l+1}^H] \quad (16)$$

As part of the second processing task, a receiving device 210 may calculate or otherwise update decoding metrics (such as path costs or branch metrics) for the two coding stages or indices of a spinal decoder (such as a bubble decoder) corresponding to $x_{p,2l}$ and $x_{p,2l+1}$, but with a modified metric of $\|x_{est,2l} - \bar{x}_{2l}(s_{2l})\|^2$ for the stage or index 2l and $\|x_{est,2l+1} - \bar{x}_{2l+1}(s_{2l+1})\|^2$ for state or index 2l+1. Alternatively, a receiving device 210 may use a metric of $\|y_l - H_1 x_{p,2l} - H_2 x_{p,2l+1}\|^2$ for stage or index 2l+1, where $x_{p,2l}$ may be tentative, intermediate, or estimated decisions from a previous spinal stage or index and $x_{p,2l+1}$ may be current spinal stage hypotheses. In some aspects, such as in aspects in which an encoder of a transmitting device 205 designed or configured A and B such that $x_{p,2l}$ has a greater SNR and likelihood for detection than $x_{p,2l+1}$, such use of a metric of $\|y_l - H_1 x_{p,2l} - H_2 x_{p,2l+1}\|^2$ for stage or index 2l+1 may support more reliable or robust performance.

Thus, the resource mapping scheme 800, the resource mapping scheme 900, and the resource mapping scheme 1000 illustrate further examples of decoding different resource mappings where a branch metric may be based at least in part on information about a channel (such as a channel response or a channel estimate). Moreover, the resource mapping scheme 800, the resource mapping scheme 900, and the resource mapping scheme 1000 illustrate further examples where the calculation implemented for a branch metric may be selected based at least in part on which resource mapping is implemented (such as which resource mapping was applied by an encoding or transmitting device).

Figure 11:
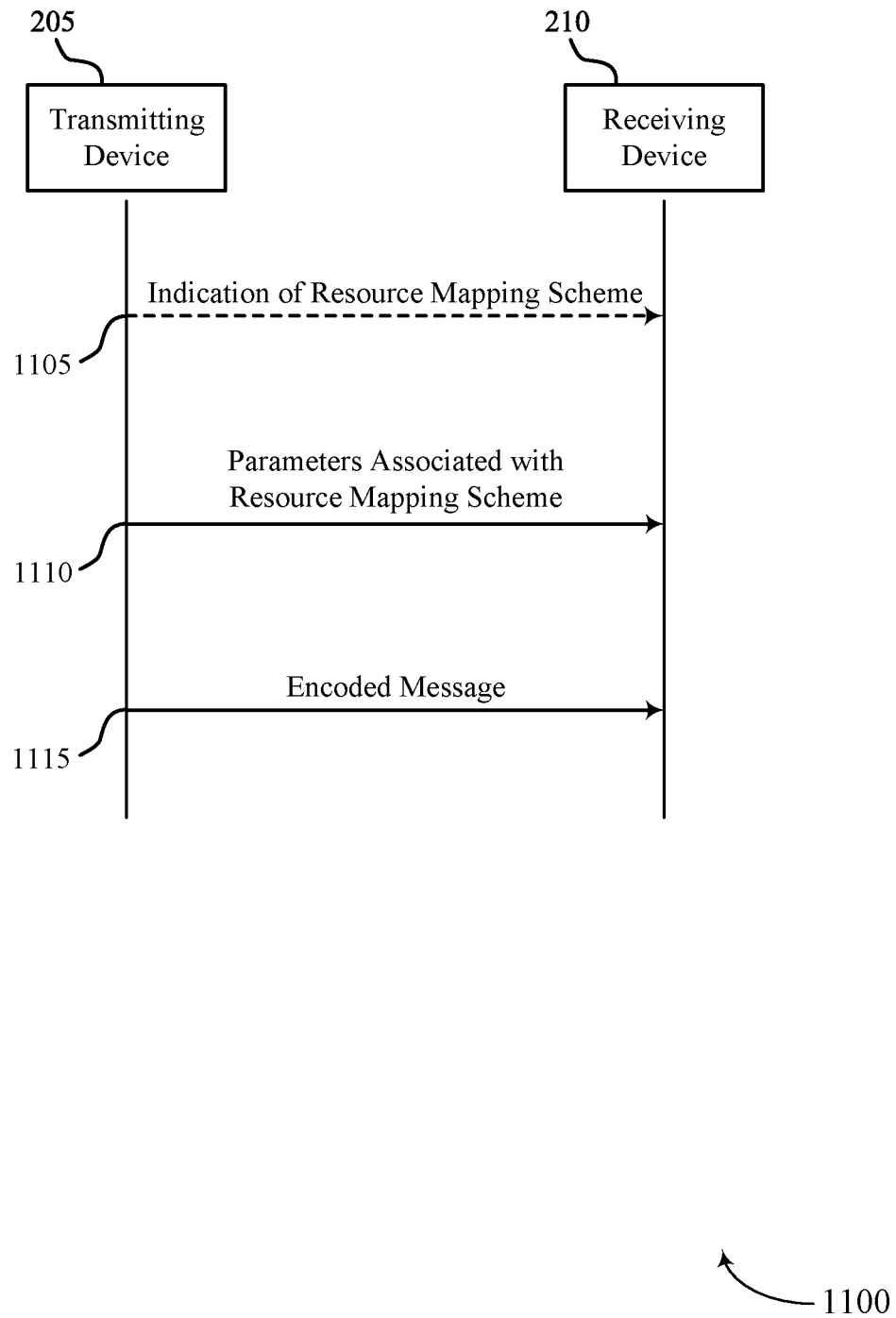
FIG. 11 shows an example process flow that supports communications resource allocation for rateless coding.

FIG. 11 shows an example process flow 1100 that supports communications resource allocation for rateless coding. The process flow 1100 may implement or be implemented to realize aspects of the wireless communications system 100 or the signaling diagram 200. For example, the process flow 1100 illustrates communication between a transmitting device 205 and a receiving device 210. In some implementations, the transmitting device 205 may encode a message using a rateless code, such as a spinal code, and the transmitting device 205 and the receiving device 210 may support a resource mapping scheme according to which one or more coding indices of the rateless code are mapped to communication resources.

In the following description of the process flow 1100, the operations may be performed (such as reported or provided) in a different order than the order shown, or the operations performed by the example devices may be performed in different orders or at different times. Some operations also may be omitted from the process flow 1100, or other operations may be added to the process flow 1100. Further, although some operations or signaling may be shown to occur at different times for discussion purposes, these operations may actually occur at the same time or otherwise concurrently.

In some implementations, at 1105, the transmitting device 205 may transmit, to the receiving device 210, an indication of a resource mapping scheme associated with a rateless coding (such as a spinal coding, a rateless modulation and coding scheme, or other scheme that includes a joint encoding and modulation or joint decoding and demodulation). In some aspects, the resource mapping scheme may indicate a respective set of communication resources for at least one coding index of a set of coding indices associated with the rateless coding. In some implementations, the resource mapping scheme may indicate that each coding index of the set of coding indices is associated with both a real component and an imaginary component of a modulation constellation (such as a modulation symbol 405). In some other implementations, the resource mapping scheme may indicate that each coding index of a first subset of coding indices is associated with a real component (such as an I component) of a modulation constellation and that each coding index of a second subset of coding indices is associated with an imaginary component (such as a Q component) of a modulation constellation.

Additionally, or alternatively, the resource mapping scheme may indicate that each coding index of the set of coding indices is associated with multiple spatial layers. In some other implementations, the resource mapping scheme may indicate that each coding index of a first subset of coding indices is associated with a first set of one or more spatial layers and that each coding index of a second subset of coding indices is associated with a second set of one or more spatial layers. Additionally, or alternatively, the resource mapping scheme may indicate that two or more coding indices of the set of coding indices are associated with a combined mapping to a multi-dimensional modulation constellation (such as a single multi-dimensional modulation constellation). The transmitting device 205 may transmit the indication of the resource mapping scheme via one or more control signals, such as via one or more DCI messages or one or more RRC messages, or a combination thereof. For example, the transmitting device 205 may transmit one or more signals associated with the indication of the resource mapping scheme as part of a link establishment (such as via RRC signaling) or dynamically (such as via DCI).

At 1110, the transmitting device 205 may transmit, to the receiving device 210, one or more parameters associated with the resource mapping scheme. For example, the transmitting device 205 may transmit, to the receiving device 210, an indication of a parameter k associated with a quantity of bits per spinal stage, a parameter k' associated with a quantity of basic bits per channel use (before puncturing), a parameter B associated with a quantity of bits per channel use after puncturing, a parameter C associated with a constellation size, a parameter L associated with a quantity of spatial layers, and an indication of a puncturing pattern. In some implementations, the parameters may indicate a constellation size for one or more of the coding indices or may indicate a first constellation size for a first one or more coding indices and a second constellation size for a second one or more coding indices. The transmitting device 205 may transmit the indication of the parameters via one or more control signals, such as via one or more DCI messages or one or more RRC messages, or a combination thereof. For example, the transmitting device 205 may transmit one or more signals associated with the indication of the parameters as part of a link establishment (such as via RRC signaling) or dynamically (such as via DCI).

At 1115, the transmitting device 205 may transmit, to the receiving device 210, a message encoded in accordance with the rateless coding and via the respective set of communication resources for a coding index of the set of coding indices associated with the rateless coding. In some implementations, such as in implementations in which a first subset of coding indices are associated with a first one or more spatial layers and a second subset of coding indices are associated with a second one or more spatial layers, the transmitting device 205 may transmit, to the receiving device 210 via the first one or more spatial layers, a first transmission of a first set of segments of the message associated with a first coding index of the first subset and, to the receiving device 210 via the second one or more spatial layers, a second transmission of a second set of segments of the message associated with a second coding index of the second subset.

In some implementations, such as implementations in which two or more coding indices of the set of coding indices are associated with a combined mapping to a multi-dimensional modulation constellation (such as a single multi-dimensional modulation constellation), the receiving device 210 may estimate a first symbol value corresponding to a first set of segments of the message encoded in accordance with a first coding index and a second symbol value corresponding to a second set of segments of the message encoded in according with a second coding index. As such, the receiving device 210 may evaluate first decoding hypotheses for the first coding index using the first estimated symbol value (and a corresponding first decoding metric) and may evaluate second decoding hypotheses for the second coding index using the second estimated symbol value (and a corresponding second decoding metric). Additionally, or alternatively, the receiving device 210 may use a linear combination of the first transmission and the second transmission and use a single decoding metric associated with tentative decisions at an earlier of the first coding index and the second coding index to evaluate hypotheses at a relatively later of the first coding index and the second coding index.

Figure 12:
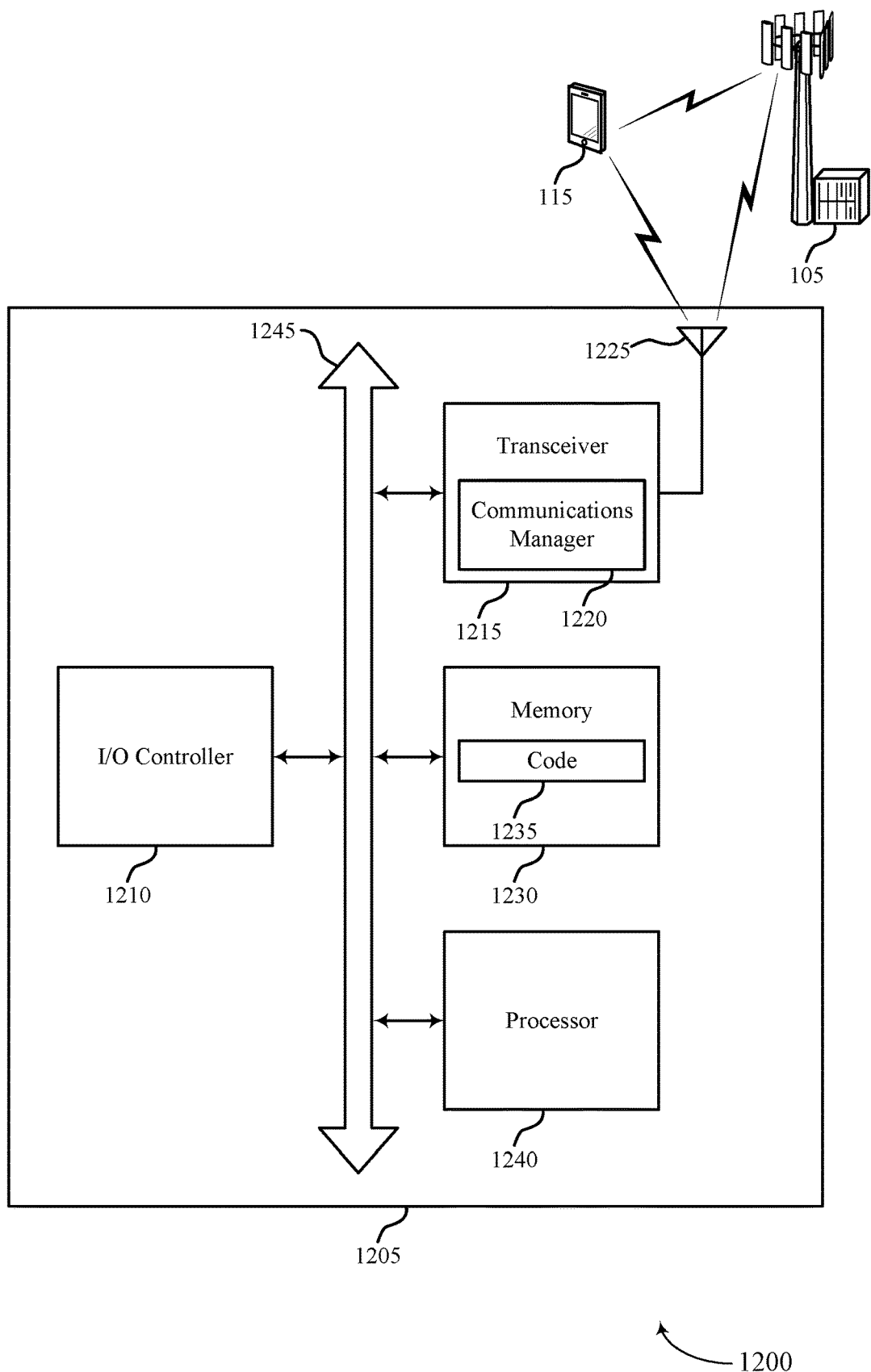
FIGS. 12 and 13 show block diagrams of example devices that support communications resource allocation for rateless coding.

FIG. 12 shows a block diagram 1200 of an example device 1205 that supports communications resource allocation for rateless coding. The device 1205 may be an example of a UE 115 and may communicate wirelessly with one or more BSs 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (such as operatively, communicatively, functionally, electronically, electrically) via one or more buses (such as a bus 1245).

The I/O controller 1210 may manage input and output signals for the device 1205. The I/O controller 1210 also may manage peripherals not integrated into the device 1205. In some implementations, the I/O controller 1210 may represent a physical connection or port to an external peripheral. In some implementations, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some implementations, the I/O controller 1210 may be implemented as part of a processor or processing system, such as the processor 1240. In some implementations, a user may interact with the device 1205 via the I/O controller 1210 or via hardware components controlled by the I/O controller 1210.

In some implementations, the device 1205 may include a single antenna 1225. However, in some other implementations, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 also may include a modem to modulate the packets, to provide the modulated packets to one or more antennas 1225 for transmission, and to demodulate packets received from the one or more antennas 1225.

In some implementations, the transceiver 1215 may include one or more interfaces, such as one or more interfaces coupled with the one or more antennas 1225 that are configured to support various receiving or obtaining operations, or one or more interfaces coupled with the one or more antennas 1225 that are configured to support various transmitting or outputting operations, or a combination thereof. In some implementations, the transceiver 1215 may include or be configured for coupling with one or more processors or memory components that are operable to perform or support operations based on received or obtained information or signals, or to generate information or other signals for transmission or other outputting, or any combination thereof. In some implementations, the transceiver 1215, or the transceiver 1215 and the one or more antennas 1225, or the transceiver 1215 and the one or more antennas 1225 and one or more processors or memory components (such as the processor 1240, or the memory 1230, or both), may be included in a chip or chip assembly that is installed in the device 1205.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some implementations, the code 1235 may not be directly executable by the processor 1240 but may cause a computer (such as when compiled and executed) to perform functions described herein. In some implementations, the memory 1230 may contain, among other things, a basic I/O system (BIOS) which may control basic hardware or software operation such as the interaction with peripheral components or devices.

The processor 1240 may be any one or more suitable processors capable of executing scripts or instructions of one or more software programs stored in the device 1205 (such as within the memory 1230). In some implementations, the processor 1240 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1240, or the transceiver 1215, or the communications manager 1220, or other components or combinations of components of the device 1205.

The processing system of the device 1205 may interface with other components of the device 1205, and may process information received from other components (such as inputs or signals) or output information to other components. For example, a chip or modem of the device 1205 may include a processing system, a first interface to output information, and a second interface to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

The communications manager 1220 may support wireless communication at a wireless device in accordance with examples as disclosed herein. For example, the communications manager 1220 may be configured as or otherwise support a means for receiving an indication of a resource mapping scheme associated with a rateless coding, where the rateless coding is associated with a set of multiple coding indices, where the resource mapping scheme indicates a respective set of communications resources for at least one coding index of the set of multiple coding indices. The communications manager 1220 may be configured as or otherwise support a means for receiving a message encoded in accordance with the rateless coding, where the message is received via the respective set of communications resources for a coding index of the set of multiple coding indices.

In some implementations, to support receiving the indication of the resource mapping scheme, the communications manager 1220 may be configured as or otherwise support a means for receiving an indication that each coding index of the set of multiple coding indices is associated with a real component and an imaginary component of a modulation constellation.

In some implementations, to support receiving the indication of the resource mapping scheme, the communications manager 1220 may be configured as or otherwise support a means for receiving an indication that each coding index of a first subset of the set of multiple coding indices is associated with a real component of a modulation constellation and that each coding index of a second subset of the set of multiple coding indices is associated with an imaginary component of the modulation constellation.

In some implementations, to support receiving the indication of the resource mapping scheme, the communications manager 1220 may be configured as or otherwise support a means for receiving an indication that each coding index of the set of multiple coding indices is associated with a set of multiple spatial layers.

In some implementations, to support receiving the indication of the resource mapping scheme, the communications manager 1220 may be configured as or otherwise support a means for receiving an indication that each coding index of a first subset of the set of multiple coding indices is associated with a first set of one or more spatial layers and that each coding index of a second subset of the set of multiple coding indices is associated with a second set of one or more spatial layers.

In some implementations, to support receiving the message encoded in accordance with the rateless coding, the communications manager 1220 may be configured as or otherwise support a means for receiving, over a symbol duration and in accordance with the first set of one or more spatial layers, a first transmission of a first set of segments of the message that are encoded in accordance with a first coding index of the first subset. In some implementations, to support receiving the message encoded in accordance with the rateless coding, the communications manager 1220 may be configured as or otherwise support a means for receiving, over the symbol duration and in accordance with the second set of one or more spatial layers, a second transmission of a second set of segments of the message that are encoded in accordance with a second coding index of the second subset.

In some implementations, to support receiving the indication of the resource mapping scheme, the communications manager 1220 may be configured as or otherwise support a means for receiving an indication that two or more coding indices of the set of multiple coding indices are associated with a combined mapping to a multi-dimensional modulation constellation.

In some implementations, to support receiving the message, the communications manager 1220 may be configured as or otherwise support a means for determining, from a measured constellation point of the multi-dimensional modulation constellation, a first estimated symbol value corresponding to a first quantity of message segments of the message encoded in accordance with a first coding index of the set of multiple coding indices. In some implementations, to support receiving the message, the communications manager 1220 may be configured as or otherwise support a means for determining, from the measured constellation point, a second estimated symbol value corresponding to a second quantity of message segments of the message encoded in accordance with a second coding index of the set of multiple coding indices. In some implementations, to support receiving the message, the communications manager 1220 may be configured as or otherwise support a means for evaluating first decoding hypotheses for the first coding index based on the first estimated symbol value and a first decoding metric. In some implementations, to support receiving the message, the communications manager 1220 may be configured as or otherwise support a means for evaluating second decoding hypotheses for the second coding index based on the second estimated symbol value and a second decoding metric that is different than the second decoding metric.

In some implementations, to support receiving the message, the communications manager 1220 may be configured as or otherwise support a means for attempting to decode one or more signals associated with the message using a decoder metric calculated in accordance with the received indication of the resource mapping scheme.

In some implementations, to support receiving the indication of the resource mapping scheme, the communications manager 1220 may be configured as or otherwise support a means for receiving an indication of a constellation size for one or more of the set of multiple coding indices.

In some implementations, to support receiving the indication of the resource mapping scheme, the communications manager 1220 may be configured as or otherwise support a means for receiving an indication of a first constellation size for a first set of one or more spatial layers. In some implementations, to support receiving the indication of the resource mapping scheme, the communications manager 1220 may be configured as or otherwise support a means for receiving an indication of a second constellation size for a second set of one or more layers that is different than the first set of one or more spatial layers.

In some implementations, each coding index of the set of multiple coding indices corresponding to a cumulative encoding of a respective quantity of message segments. In some implementations, each coding index of the set of multiple coding indices corresponds to a different coding rate of the rateless coding.

Additionally, or alternatively, the communications manager 1220 may support wireless communication at a wireless device in accordance with examples as disclosed herein. For example, the communications manager 1220 may be configured as or otherwise support a means for transmitting an indication of a resource mapping scheme associated with a rateless coding, where the rateless coding is associated with a set of multiple coding indices, and where the resource mapping scheme indicates a respective set of communications resources for at least one coding index of the set of multiple coding indices. The communications manager 1220 may be configured as or otherwise support a means for transmitting a message encoded in accordance with the rateless coding, where the message is transmitted using the respective set of communications resources for a coding index of the set of multiple coding indices.

In some implementations, to support transmitting the indication of the resource mapping scheme, the communications manager 1220 may be configured as or otherwise support a means for transmitting an indication that each coding index of the set of multiple coding indices is associated with a real component and an imaginary component of a modulation constellation.

In some implementations, to support transmitting the indication of the resource mapping scheme, the communications manager 1220 may be configured as or otherwise support a means for transmitting an indication that each coding index of a first subset of the set of multiple coding indices is associated with a real component of a modulation constellation and that each coding index of a second subset of the set of multiple coding indices is associated with an imaginary component of the modulation constellation.

In some implementations, to support transmitting the indication of the resource mapping scheme, the communications manager 1220 may be configured as or otherwise support a means for transmitting an indication that each coding index of the set of multiple coding indices is associated with a set of multiple spatial layers.

In some implementations, to support transmitting the indication of the resource mapping scheme, the communications manager 1220 may be configured as or otherwise support a means for transmitting an indication that each coding index of a first subset of the set of multiple coding indices is associated with a first set of one or more spatial layers and that each coding index of a second subset of the set of multiple coding indices is associated with a second set of one or more spatial layers.

In some implementations, to support transmitting the message encoded in accordance with the rateless coding, the communications manager 1220 may be configured as or otherwise support a means for transmitting, over a symbol duration and in accordance with the first set of one or more spatial layers, a first transmission of a first set of segments of the message that are encoded in accordance with a first coding index of the first subset. In some implementations, to support transmitting the message encoded in accordance with the rateless coding, the communications manager 1220 may be configured as or otherwise support a means for transmitting, over the symbol duration and in accordance with the second set of one or more spatial layers, a second transmission of a second set of segments of the message that are encoded in accordance with a second coding index of the second subset.

In some implementations, to support transmitting the indication of the resource mapping scheme, the communications manager 1220 may be configured as or otherwise support a means for transmitting an indication that two or more coding indices of the set of multiple coding indices are associated with a combined mapping to constellation points of a multi-dimensional modulation constellation.

In some implementations, to support transmitting the message, the communications manager 1220 may be configured as or otherwise support a means for determining a first encoded symbol value corresponding to a first quantity of message segments of the message encoded in accordance with a first coding index of the set of multiple coding indices. In some implementations, to support transmitting the message, the communications manager 1220 may be configured as or otherwise support a means for determining a second encoded symbol value corresponding to a second quantity of message segments of the message encoded in accordance with a second coding index of the set of multiple coding indices. In some implementations, to support transmitting the message, the communications manager 1220 may be configured as or otherwise support a means for mapping a linear combination of the first encoded symbol value and the second encoded symbol value to a constellation point of the multi-dimensional modulation constellation.

In some implementations, to support transmitting the indication of the resource mapping scheme, the communications manager 1220 may be configured as or otherwise support a means for transmitting an indication of a constellation size for one or more of the set of multiple coding indices.

In some implementations, to support transmitting the indication of the resource mapping scheme, the communications manager 1220 may be configured as or otherwise support a means for transmitting an indication of a first constellation size for a first set of one or more spatial layers. In some implementations, to support transmitting the indication of the resource mapping scheme, the communications manager 1220 may be configured as or otherwise support a means for transmitting an indication of a second constellation size for a second set of one or more layers that is different than the first set of one or more spatial layers.

In some implementations, each coding index of the set of multiple coding indices corresponding to a cumulative encoding of a respective quantity of message segments. In some implementations, each coding index of the set of multiple coding indices corresponds to a different coding rate of the rateless coding.

In some implementations, the communications manager 1220 may be configured to perform various operations (such as receiving, monitoring, transmitting) using or otherwise in cooperation with the transceiver 1215, the one or more antennas 1225, or any combination thereof. Although the communications manager 1220 is illustrated as a separate component, in some implementations, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of communications resource allocation for rateless coding as described herein, or the processor 1240 and the memory 1230 may be otherwise configured to perform or support such operations.

Figure 13:
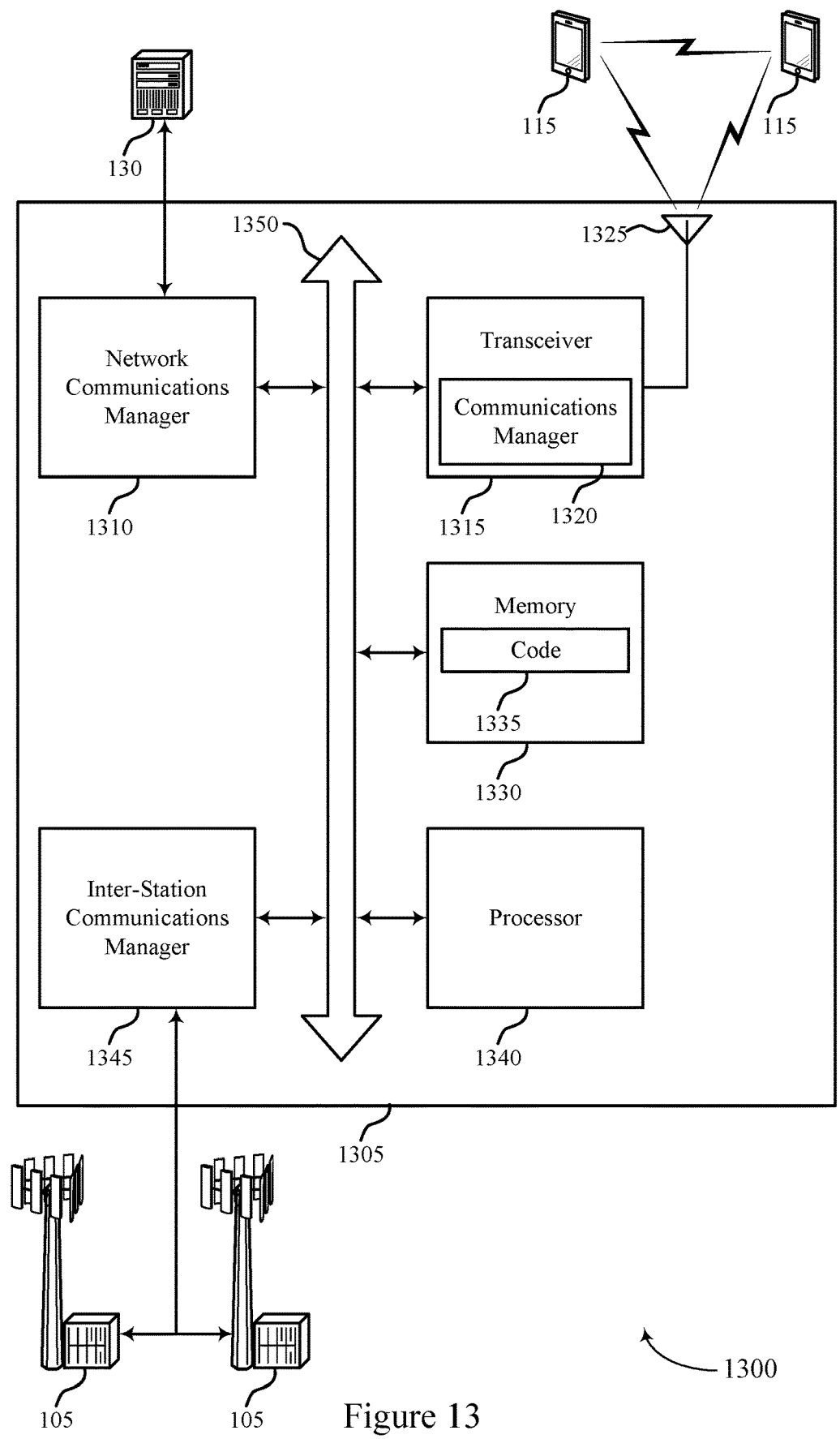

FIG. 13 shows a block diagram 1300 of an example device 1305 that supports communications resource allocation for rateless coding. The device 1305 may be an example of one or more components of a BS 105 and may communicate wirelessly with one or more BSs 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (such as operatively, communicatively, functionally, electronically, electrically) via one or more buses (such as a bus 1350).

The network communications manager 1310 may manage communications with a core network 130 (such as via one or more wired backhaul links). For example, the network communications manager 1310 may manage the transfer of data communications for client devices, such as one or more UEs 115.

In some implementations, the device 1305 may include a single antenna 1325. However, in some other implementations, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 also may include a modem to modulate the packets, to provide the modulated packets to one or more antennas 1325 for transmission, and to demodulate packets received from the one or more antennas 1325.

In some implementations, the transceiver 1315 may include one or more interfaces, such as one or more interfaces coupled with the one or more antennas 1325 that are configured to support various receiving or obtaining operations, or one or more interfaces coupled with the one or more antennas 1325 that are configured to support various transmitting or outputting operations, or a combination thereof. In some implementations, the transceiver 1315 may include or be configured for coupling with one or more processors or memory components that are operable to perform or support operations based on received or obtained information or signals, or to generate information or other signals for transmission or other outputting, or any combination thereof. In some implementations, the transceiver 1315, or the transceiver 1315 and the one or more antennas 1325, or the transceiver 1315 and the one or more antennas 1325 and one or more processors or memory components (such as the processor 1340, or the memory 1330, or both), may be included in a chip or chip assembly that is installed in the device 1305.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some implementations, the code 1335 may not be directly executable by the processor 1340 but may cause a computer (such as when compiled and executed) to perform functions described herein. In some implementations, the memory 1330 may contain, among other things, a BIOS which may control basic hardware or software operation such as the interaction with peripheral components or devices.

The processor 1340 may be any one or more suitable processors capable of executing scripts or instructions of one or more software programs stored in the device 1305 (such as within the memory 1330). In some implementations, the processor 1340 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1340, or the transceiver 1315, or the communications manager 1320, or other components or combinations of components of the device 1305.

The processing system of the device 1305 may interface with other components of the device 1305, and may process information received from other components (such as inputs or signals) or output information to other components. For example, a chip or modem of the device 1305 may include a processing system, a first interface to output information, and a second interface to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

The inter-station communications manager 1345 may manage communications with other BSs 105, and may include a controller or scheduler for controlling communications with UEs 115 in cooperation with other BSs 105. For example, the inter-station communications manager 1345 may coordinate scheduling for transmissions to UEs 115 for various interference mitigation techniques such as beamforming or joint transmission. In some implementations, the inter-station communications manager 1345 may provide an X2 interface within an LTE/LTE-A wireless communications network technology to provide communication between BSs 105.

The communications manager 1320 may support wireless communication at a wireless device in accordance with examples as disclosed herein. For example, the communications manager 1320 may be configured as or otherwise support a means for receiving an indication of a resource mapping scheme associated with a rateless coding, where the rateless coding is associated with a set of multiple coding indices, where the resource mapping scheme indicates a respective set of communications resources for at least one coding index of the set of multiple coding indices. The communications manager 1320 may be configured as or otherwise support a means for receiving a message encoded in accordance with the rateless coding, where the message is received via the respective set of communications resources for a coding index of the set of multiple coding indices.

In some implementations, to support receiving the indication of the resource mapping scheme, the communications manager 1320 may be configured as or otherwise support a means for receiving an indication that each coding index of the set of multiple coding indices is associated with a real component and an imaginary component of a modulation constellation.

In some implementations, to support receiving the indication of the resource mapping scheme, the communications manager 1320 may be configured as or otherwise support a means for receiving an indication that each coding index of a first subset of the set of multiple coding indices is associated with a real component of a modulation constellation and that each coding index of a second subset of the set of multiple coding indices is associated with an imaginary component of the modulation constellation.

In some implementations, to support receiving the indication of the resource mapping scheme, the communications manager 1320 may be configured as or otherwise support a means for receiving an indication that each coding index of the set of multiple coding indices is associated with a set of multiple spatial layers.

In some implementations, to support receiving the indication of the resource mapping scheme, the communications manager 1320 may be configured as or otherwise support a means for receiving an indication that each coding index of a first subset of the set of multiple coding indices is associated with a first set of one or more spatial layers and that each coding index of a second subset of the set of multiple coding indices is associated with a second set of one or more spatial layers.

In some implementations, to support receiving the message encoded in accordance with the rateless coding, the communications manager 1320 may be configured as or otherwise support a means for receiving, over a symbol duration and in accordance with the first set of one or more spatial layers, a first transmission of a first set of segments of the message that are encoded in accordance with a first coding index of the first subset. In some implementations, to support receiving the message encoded in accordance with the rateless coding, the communications manager 1320 may be configured as or otherwise support a means for receiving, over the symbol duration and in accordance with the second set of one or more spatial layers, a second transmission of a second set of segments of the message that are encoded in accordance with a second coding index of the second subset.

In some implementations, to support receiving the indication of the resource mapping scheme, the communications manager 1320 may be configured as or otherwise support a means for receiving an indication that two or more coding indices of the set of multiple coding indices are associated with a combined mapping to a multi-dimensional modulation constellation.

In some implementations, to support receiving the message, the communications manager 1320 may be configured as or otherwise support a means for determining, from a measured constellation point of the multi-dimensional modulation constellation, a first estimated symbol value corresponding to a first quantity of message segments of the message encoded in accordance with a first coding index of the set of multiple coding indices. In some implementations, to support receiving the message, the communications manager 1320 may be configured as or otherwise support a means for determining, from the measured constellation point, a second estimated symbol value corresponding to a second quantity of message segments of the message encoded in accordance with a second coding index of the set of multiple coding indices. In some implementations, to support receiving the message, the communications manager 1320 may be configured as or otherwise support a means for evaluating first decoding hypotheses for the first coding index based on the first estimated symbol value and a first decoding metric. In some implementations, to support receiving the message, the communications manager 1320 may be configured as or otherwise support a means for evaluating second decoding hypotheses for the second coding index based on the second estimated symbol value and a second decoding metric that is different than the second decoding metric.

In some implementations, to support receiving the message, the communications manager 1320 may be configured as or otherwise support a means for attempting to decode one or more signals associated with the message using a decoder metric calculated in accordance with the received indication of the resource mapping scheme.

In some implementations, to support receiving the indication of the resource mapping scheme, the communications manager 1320 may be configured as or otherwise support a means for receiving an indication of a constellation size for one or more of the set of multiple coding indices.

In some implementations, to support receiving the indication of the resource mapping scheme, the communications manager 1320 may be configured as or otherwise support a means for receiving an indication of a first constellation size for a first set of one or more spatial layers. In some implementations, to support receiving the indication of the resource mapping scheme, the communications manager 1320 may be configured as or otherwise support a means for receiving an indication of a second constellation size for a second set of one or more layers that is different than the first set of one or more spatial layers.

In some implementations, each coding index of the set of multiple coding indices corresponding to a cumulative encoding of a respective quantity of message segments. In some implementations, each coding index of the set of multiple coding indices corresponds to a different coding rate of the rateless coding.

Additionally, or alternatively, the communications manager 1320 may support wireless communication at a wireless device in accordance with examples as disclosed herein. For example, the communications manager 1320 may be configured as or otherwise support a means for transmitting an indication of a resource mapping scheme associated with a rateless coding, where the rateless coding is associated with a set of multiple coding indices, and where the resource mapping scheme indicates a respective set of communications resources for at least one coding index of the set of multiple coding indices. The communications manager 1320 may be configured as or otherwise support a means for transmitting a message encoded in accordance with the rateless coding, where the message is transmitted using the respective set of communications resources for a coding index of the set of multiple coding indices.

In some implementations, to support transmitting the indication of the resource mapping scheme, the communications manager 1320 may be configured as or otherwise support a means for transmitting an indication that each coding index of the set of multiple coding indices is associated with a real component and an imaginary component of a modulation constellation.

In some implementations, to support transmitting the indication of the resource mapping scheme, the communications manager 1320 may be configured as or otherwise support a means for transmitting an indication that each coding index of a first subset of the set of multiple coding indices is associated with a real component of a modulation constellation and that each coding index of a second subset of the set of multiple coding indices is associated with an imaginary component of the modulation constellation.

In some implementations, to support transmitting the indication of the resource mapping scheme, the communications manager 1320 may be configured as or otherwise support a means for transmitting an indication that each coding index of the set of multiple coding indices is associated with a set of multiple spatial layers.

In some implementations, to support transmitting the indication of the resource mapping scheme, the communications manager 1320 may be configured as or otherwise support a means for transmitting an indication that each coding index of a first subset of the set of multiple coding indices is associated with a first set of one or more spatial layers and that each coding index of a second subset of the set of multiple coding indices is associated with a second set of one or more spatial layers.

In some implementations, to support transmitting the message encoded in accordance with the rateless coding, the communications manager 1320 may be configured as or otherwise support a means for transmitting, over a symbol duration and in accordance with the first set of one or more spatial layers, a first transmission of a first set of segments of the message that are encoded in accordance with a first coding index of the first subset. In some implementations, to support transmitting the message encoded in accordance with the rateless coding, the communications manager 1320 may be configured as or otherwise support a means for transmitting, over the symbol duration and in accordance with the second set of one or more spatial layers, a second transmission of a second set of segments of the message that are encoded in accordance with a second coding index of the second subset.

In some implementations, to support transmitting the indication of the resource mapping scheme, the communications manager 1320 may be configured as or otherwise support a means for transmitting an indication that two or more coding indices of the set of multiple coding indices are associated with a combined mapping to constellation points of a multi-dimensional modulation constellation.

In some implementations, to support transmitting the message, the communications manager 1320 may be configured as or otherwise support a means for determining a first encoded symbol value corresponding to a first quantity of message segments of the message encoded in accordance with a first coding index of the set of multiple coding indices. In some implementations, to support transmitting the message, the communications manager 1320 may be configured as or otherwise support a means for determining a second encoded symbol value corresponding to a second quantity of message segments of the message encoded in accordance with a second coding index of the set of multiple coding indices. In some implementations, to support transmitting the message, the communications manager 1320 may be configured as or otherwise support a means for mapping a linear combination of the first encoded symbol value and the second encoded symbol value to a constellation point of the multi-dimensional modulation constellation.

In some implementations, to support transmitting the indication of the resource mapping scheme, the communications manager 1320 may be configured as or otherwise support a means for transmitting an indication of a constellation size for one or more of the set of multiple coding indices.

In some implementations, to support transmitting the indication of the resource mapping scheme, the communications manager 1320 may be configured as or otherwise support a means for transmitting an indication of a first constellation size for a first set of one or more spatial layers. In some implementations, to support transmitting the indication of the resource mapping scheme, the communications manager 1320 may be configured as or otherwise support a means for transmitting an indication of a second constellation size for a second set of one or more layers that is different than the first set of one or more spatial layers.

In some implementations, each coding index of the set of multiple coding indices corresponding to a cumulative encoding of a respective quantity of message segments. In some implementations, each coding index of the set of multiple coding indices corresponds to a different coding rate of the rateless coding.

In some implementations, the communications manager 1320 may be configured to perform various operations (such as receiving, monitoring, transmitting) using or otherwise in cooperation with the transceiver 1315, the one or more antennas 1325, or any combination thereof. Although the communications manager 1320 is illustrated as a separate component, in some implementations, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of communications resource allocation for rateless coding as described herein, or the processor 1340 and the memory 1330 may be otherwise configured to perform or support such operations.

Figure 14:
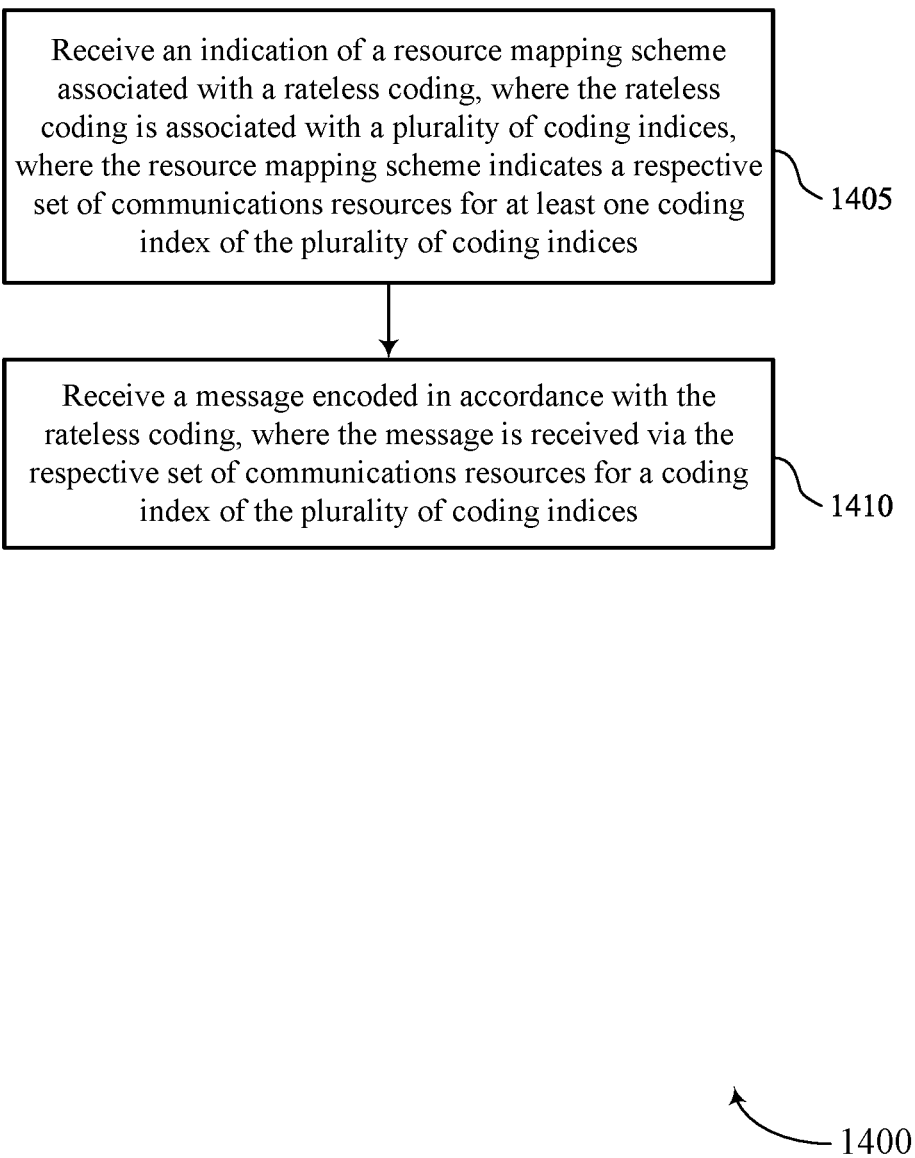
FIGS. 14 and 15 show flowcharts illustrating example methods that support communications resource allocation for rateless coding.

FIG. 14 shows a flowchart illustrating an example method 1400 that supports communications resource allocation for rateless coding. The operations of the method 1400 may be implemented by a UE or a BS or its components as described herein. For example, the operations of the method 1400 may be performed by a UE 115 or a BS 105 as described with reference to FIGS. 1-13. In some implementations, a UE or a BS may execute a set of instructions to control the functional elements of the UE or the BS to perform the described functions. Additionally, or alternatively, the UE or the BS may perform aspects of the described functions using special-purpose hardware.

At 1405, the method may include receiving an indication of a resource mapping scheme associated with a rateless coding, where the rateless coding is associated with a set of multiple coding indices, where the resource mapping scheme indicates a respective set of communications resources for at least one coding index of the set of multiple coding indices. The operations of 1405 may be performed in accordance with examples as disclosed herein.

At 1410, the method may include receiving a message encoded in accordance with the rateless coding, where the message is received via the respective set of communications resources for a coding index of the set of multiple coding indices. The operations of 1410 may be performed in accordance with examples as disclosed herein.

Figure 15:
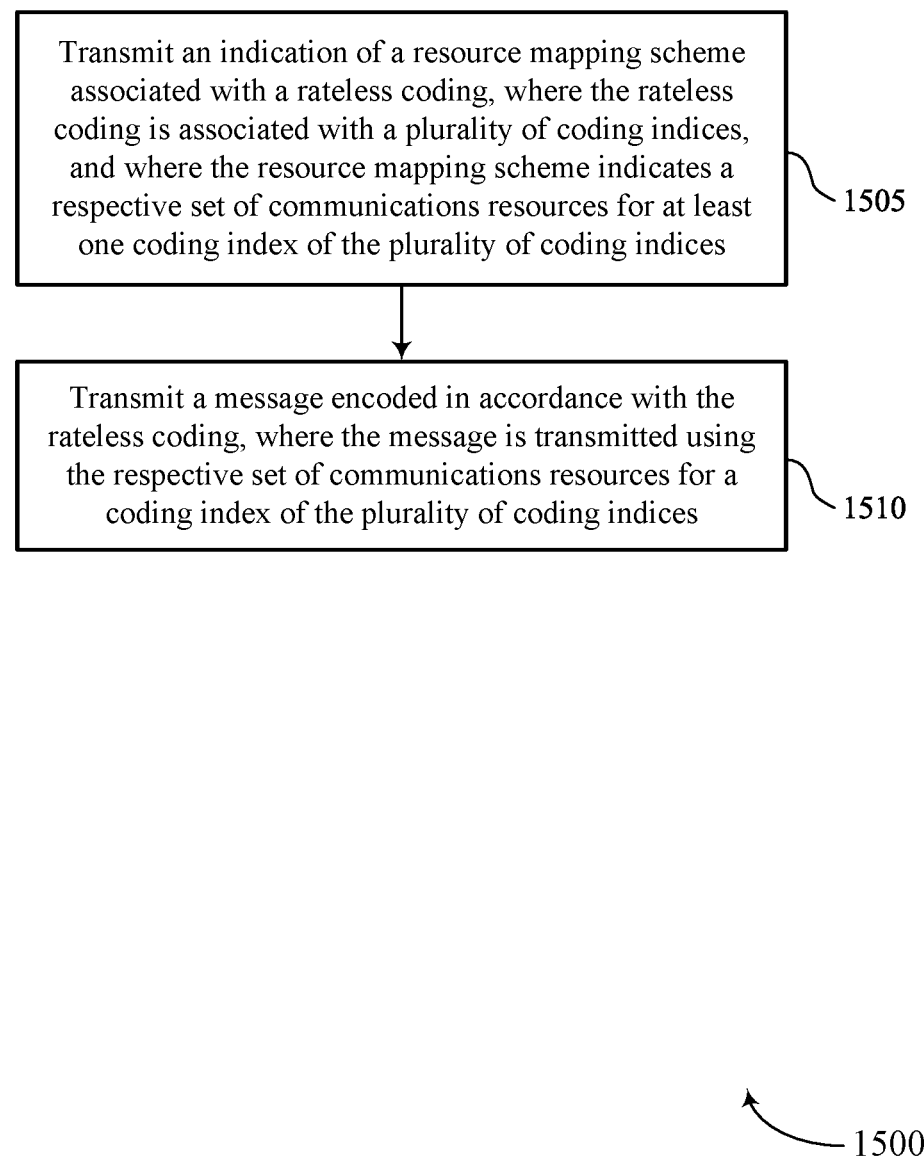

FIG. 15 shows a flowchart illustrating an example method 1500 that supports communications resource allocation for rateless coding. The operations of the method 1500 may be implemented by a UE or a BS or its components as described herein. For example, the operations of the method 1500 may be performed by a UE 115 or a BS 105 as described with reference to FIGS. 1-13. In some implementations, a UE or a BS may execute a set of instructions to control the functional elements of the UE or the BS to perform the described functions. Additionally, or alternatively, the UE or the BS may perform aspects of the described functions using special-purpose hardware.

At 1505, the method may include transmitting an indication of a resource mapping scheme associated with a rateless coding, where the rateless coding is associated with a set of multiple coding indices, and where the resource mapping scheme indicates a respective set of communications resources for at least one coding index of the set of multiple coding indices. The operations of 1505 may be performed in accordance with examples as disclosed herein.

At 1510, the method may include transmitting a message encoded in accordance with the rateless coding, where the message is transmitted using the respective set of communications resources for a coding index of the set of multiple coding indices. The operations of 1510 may be performed in accordance with examples as disclosed herein.

The following provides an overview of some aspects of the present disclosure:

Aspect 1: A method for wireless communication at a wireless device, including: receiving an indication of a resource mapping scheme associated with a rateless coding, where the rateless coding is associated with a set of multiple coding indices, where the resource mapping scheme indicates a respective set of communications resources for at least one coding index of the set of multiple coding indices; and receiving a message encoded in accordance with the rateless coding, where the message is received via the respective set of communications resources for a coding index of the set of multiple coding indices.

Aspect 2: The method of aspect 1, where receiving the indication of the resource mapping scheme includes: receiving an indication that each coding index of the set of multiple coding indices is associated with a real component and an imaginary component of a modulation constellation.

Aspect 3: The method of aspect 1, where receiving the indication of the resource mapping scheme includes: receiving an indication that each coding index of a first subset of the set of multiple coding indices is associated with a real component of a modulation constellation and that each coding index of a second subset of the set of multiple coding indices is associated with an imaginary component of the modulation constellation.

Aspect 4: The method of any of aspects 1-3, where receiving the indication of the resource mapping scheme includes: receiving an indication that each coding index of the set of multiple coding indices is associated with a set of multiple spatial layers.

Aspect 5: The method of any of aspects 1-3, where receiving the indication of the resource mapping scheme includes: receiving an indication that each coding index of a first subset of the set of multiple coding indices is associated with a first set of one or more spatial layers and that each coding index of a second subset of the set of multiple coding indices is associated with a second set of one or more spatial layers.

Aspect 6: The method of aspect 5, where receiving the signaling associated with the message encoded in accordance with the rateless coding includes: receiving, over a symbol duration and in accordance with the first set of one or more spatial layers, a first transmission of a first set of segments of the message that are encoded in accordance with a first coding index of the first subset; and receiving, over the symbol duration and in accordance with the second set of one or more spatial layers, a second transmission of a second set of segments of the message that are encoded in accordance with a second coding index of the second subset.

Aspect 7: The method of any of aspects 1-6, where receiving the indication of the resource mapping scheme includes: receiving an indication that two or more coding indices of the set of multiple coding indices are associated with a combined mapping to a multi-dimensional modulation constellation.

Aspect 8: The method of aspect 7, where receiving the message includes: determining, from a measured constellation point of the multi-dimensional modulation constellation, a first estimated symbol value corresponding to a first quantity of message segments of the message encoded in accordance with a first coding index of the set of multiple coding indices; determining, from the measured constellation point, a second estimated symbol value corresponding to a second quantity of message segments of the message encoded in accordance with a second coding index of the set of multiple coding indices; evaluating first decoding hypotheses for the first coding index based on the first estimated symbol value and a first decoding metric; and evaluating second decoding hypotheses for the second coding index based on the second estimated symbol value and a second decoding metric that is different than the second decoding metric.

Aspect 9: The method of any of aspects 1-8, where receiving the message includes: attempting to decode one or more signals associated with the message using a decoder metric calculated in accordance with the received indication of the resource mapping scheme.

Aspect 10: The method of any of aspects 1-9, where receiving the indication of the resource mapping scheme includes: receiving an indication of a constellation size for one or more of the set of multiple coding indices.

Aspect 11: The method of any of aspects 1-10, where receiving the indication of the resource mapping scheme includes: receiving an indication of a first constellation size for a first set of one or more spatial layers; and receiving an indication of a second constellation size for a second set of one or more layers that is different than the first set of one or more spatial layers.

Aspect 12: The method of any of aspects 1-11, where each coding index of the set of multiple coding indices corresponding to a cumulative encoding of a respective quantity of message segments.

Aspect 13: The method of any of aspects 1-12, where each coding index of the set of multiple coding indices corresponds to a different coding rate of the rateless coding.

Aspect 14: A method for wireless communication at a wireless device, including: transmitting an indication of a resource mapping scheme associated with a rateless coding, where the rateless coding is associated with a set of multiple coding indices, and where the resource mapping scheme indicates a respective set of communications resources for at least one coding index of the set of multiple coding indices; and transmitting a message encoded in accordance with the rateless coding, where the message is transmitted using the respective set of communications resources for a coding index of the set of multiple coding indices.

Aspect 15: The method of aspect 14, where transmitting the indication of the resource mapping scheme includes: transmitting an indication that each coding index of the set of multiple coding indices is associated with a real component and an imaginary component of a modulation constellation.

Aspect 16: The method of aspect 14, where transmitting the indication of the resource mapping scheme includes: transmitting an indication that each coding index of a first subset of the set of multiple coding indices is associated with a real component of a modulation constellation and that each coding index of a second subset of the set of multiple coding indices is associated with an imaginary component of the modulation constellation.

Aspect 17: The method of any of aspects 14-16, where transmitting the indication of the resource mapping scheme includes: transmitting an indication that each coding index of the set of multiple coding indices is associated with a set of multiple spatial layers.

Aspect 18: The method of any of aspects 14-16, where transmitting the indication of the resource mapping scheme includes: transmitting an indication that each coding index of a first subset of the set of multiple coding indices is associated with a first set of one or more spatial layers and that each coding index of a second subset of the set of multiple coding indices is associated with a second set of one or more spatial layers.

Aspect 19: The method of aspect 18, where transmitting the signaling associated with the message encoded in accordance with the rateless coding includes: transmitting, over a symbol duration and in accordance with the first set of one or more spatial layers, a first transmission of a first set of segments of the message that are encoded in accordance with a first coding index of the first subset; and transmitting, over the symbol duration and in accordance with the second set of one or more spatial layers, a second transmission of a second set of segments of the message that are encoded in accordance with a second coding index of the second subset.

Aspect 20: The method of any of aspects 14-19, where transmitting the indication of the resource mapping scheme includes: transmitting an indication that two or more coding indices of the set of multiple coding indices are associated with a combined mapping to constellation points of a multi-dimensional modulation constellation.

Aspect 21: The method of aspect 20, where transmitting the message includes: determining a first encoded symbol value corresponding to a first quantity of message segments of the message encoded in accordance with a first coding index of the set of multiple coding indices; determining a second encoded symbol value corresponding to a second quantity of message segments of the message encoded in accordance with a second coding index of the set of multiple coding indices; and mapping a linear combination of the first encoded symbol value and the second encoded symbol value to a constellation point of the multi-dimensional modulation constellation.

Aspect 22: The method of any of aspects 14-21, where transmitting the indication of the resource mapping scheme includes: transmitting an indication of a constellation size for one or more of the set of multiple coding indices.

Aspect 23: The method of any of aspects 14-22, where transmitting the indication of the resource mapping scheme includes: transmitting an indication of a first constellation size for a first set of one or more spatial layers; and transmitting an indication of a second constellation size for a second set of one or more layers that is different than the first set of one or more spatial layers.

Aspect 24: The method of any of aspects 14-23, where each coding index of the set of multiple coding indices corresponding to a cumulative encoding of a respective quantity of message segments.

Aspect 25: The method of any of aspects 14-24, where each coding index of the set of multiple coding indices corresponds to a different coding rate of the rateless coding.

Aspect 26: An apparatus for wireless communication at a wireless device, including: a processor; memory coupled with the processor; and instructions stored in the memory and executable by the processor to cause the apparatus to: receive an indication of a resource mapping scheme associated with a rateless coding, where the rateless coding is associated with a set of multiple coding indices, where the resource mapping scheme indicates a respective set of communications resources for at least one coding index of the set of multiple coding indices; and receive a message encoded in accordance with the rateless coding, where the message is received via the respective set of communications resources for a coding index of the set of multiple coding indices.

Aspect 27: The apparatus of aspect 26, where the instructions to receive the indication of the resource mapping scheme are executable by the processor to cause the apparatus to: receive an indication that each coding index of the set of multiple coding indices is associated with a real component and an imaginary component of a modulation constellation.

Aspect 28: The apparatus of aspect 26, where the instructions to receive the indication of the resource mapping scheme are executable by the processor to cause the apparatus to: receive an indication that each coding index of a first subset of the set of multiple coding indices is associated with a real component of a modulation constellation and that each coding index of a second subset of the set of multiple coding indices is associated with an imaginary component of the modulation constellation.

Aspect 29: The apparatus of any of aspects 26-28, where the instructions to receive the indication of the resource mapping scheme are executable by the processor to cause the apparatus to: receive an indication that each coding index of the set of multiple coding indices is associated with a set of multiple spatial layers.

Aspect 30: The apparatus of any of aspects 26-28, where the instructions to receive the indication of the resource mapping scheme are executable by the processor to cause the apparatus to: receive an indication that each coding index of a first subset of the set of multiple coding indices is associated with a first set of one or more spatial layers and that each coding index of a second subset of the set of multiple coding indices is associated with a second set of one or more spatial layers.

Aspect 31: The apparatus of aspect 30, where the instructions to receive the signaling associated with the message encoded in accordance with the rateless coding are executable by the processor to cause the apparatus to: receive, over a symbol duration and in accordance with the first set of one or more spatial layers, a first transmission of a first set of segments of the message that are encoded in accordance with a first coding index of the first subset; and receive, over the symbol duration and in accordance with the second set of one or more spatial layers, a second transmission of a second set of segments of the message that are encoded in accordance with a second coding index of the second subset.

Aspect 32: The apparatus of any of aspects 26-31, where the instructions to receive the indication of the resource mapping scheme are executable by the processor to cause the apparatus to: receive an indication that two or more coding indices of the set of multiple coding indices are associated with a combined mapping to a multi-dimensional modulation constellation.

Aspect 33: The apparatus of aspect 32, where the instructions to receive the message are executable by the processor to cause the apparatus to: determine, from a measured constellation point of the multi-dimensional modulation constellation, a first estimated symbol value corresponding to a first quantity of message segments of the message encoded in accordance with a first coding index of the set of multiple coding indices; determine, from the measured constellation point, a second estimated symbol value corresponding to a second quantity of message segments of the message encoded in accordance with a second coding index of the set of multiple coding indices; evaluate first decoding hypotheses for the first coding index based on the first estimated symbol value and a first decoding metric; and evaluate second decoding hypotheses for the second coding index based on the second estimated symbol value and a second decoding metric that is different than the second decoding metric.

Aspect 34: The apparatus of any of aspects 26-33, where the instructions to receive the message are executable by the processor to cause the apparatus to: attempt to decode one or more signals associated with the message using a decoder metric calculated in accordance with the received indication of the resource mapping scheme.

Aspect 35: The apparatus of any of aspects 26-34, where the instructions to receive the indication of the resource mapping scheme are executable by the processor to cause the apparatus to: receive an indication of a constellation size for one or more of the set of multiple coding indices.

Aspect 36: The apparatus of any of aspects 26-35, where the instructions to receive the indication of the resource mapping scheme are executable by the processor to cause the apparatus to: receive an indication of a first constellation size for a first set of one or more spatial layers; and receive an indication of a second constellation size for a second set of one or more layers that is different than the first set of one or more spatial layers.

Aspect 37: The apparatus of any of aspects 26-36, where each coding index of the set of multiple coding indices corresponding to a cumulative encoding of a respective quantity of message segments.

Aspect 38: The apparatus of any of aspects 26-37, where each coding index of the set of multiple coding indices corresponds to a different coding rate of the rateless coding.

Aspect 39: An apparatus for wireless communication at a wireless device, including: a processor; memory coupled with the processor; and instructions stored in the memory and executable by the processor to cause the apparatus to: transmit an indication of a resource mapping scheme associated with a rateless coding, where the rateless coding is associated with a set of multiple coding indices, and where the resource mapping scheme indicates a respective set of communications resources for at least one coding index of the set of multiple coding indices; and transmit a message encoded in accordance with the rateless coding, where the message is transmitted using the respective set of communications resources for a coding index of the set of multiple coding indices.

Aspect 40: The apparatus of aspect 39, where the instructions to transmit the indication of the resource mapping scheme are executable by the processor to cause the apparatus to: transmit an indication that each coding index of the set of multiple coding indices is associated with a real component and an imaginary component of a modulation constellation.

Aspect 41: The apparatus of aspect 39, where the instructions to transmit the indication of the resource mapping scheme are executable by the processor to cause the apparatus to: transmit an indication that each coding index of a first subset of the set of multiple coding indices is associated with a real component of a modulation constellation and that each coding index of a second subset of the set of multiple coding indices is associated with an imaginary component of the modulation constellation.

Aspect 42: The apparatus of any of aspects 39-41, where the instructions to transmit the indication of the resource mapping scheme are executable by the processor to cause the apparatus to: transmit an indication that each coding index of the set of multiple coding indices is associated with a set of multiple spatial layers.

Aspect 43: The apparatus of any of aspects 39-41, where the instructions to transmit the indication of the resource mapping scheme are executable by the processor to cause the apparatus to: transmit an indication that each coding index of a first subset of the set of multiple coding indices is associated with a first set of one or more spatial layers and that each coding index of a second subset of the set of multiple coding indices is associated with a second set of one or more spatial layers.

Aspect 44: The apparatus of aspect 43, where the instructions to transmit the signaling associated with the message encoded in accordance with the rateless coding are executable by the processor to cause the apparatus to: transmit, over a symbol duration and in accordance with the first set of one or more spatial layers, a first transmission of a first set of segments of the message that are encoded in accordance with a first coding index of the first subset; and transmit, over the symbol duration and in accordance with the second set of one or more spatial layers, a second transmission of a second set of segments of the message that are encoded in accordance with a second coding index of the second subset.

Aspect 45: The apparatus of any of aspects 39-44, where the instructions to transmit the indication of the resource mapping scheme are executable by the processor to cause the apparatus to: transmit an indication that two or more coding indices of the set of multiple coding indices are associated with a combined mapping to constellation points of a multi-dimensional modulation constellation.

Aspect 46: The apparatus of aspect 45, where the instructions to transmit the message are executable by the processor to cause the apparatus to: determine a first encoded symbol value corresponding to a first quantity of message segments of the message encoded in accordance with a first coding index of the set of multiple coding indices; determine a second encoded symbol value corresponding to a second quantity of message segments of the message encoded in accordance with a second coding index of the set of multiple coding indices; and map a linear combination of the first encoded symbol value and the second encoded symbol value to a constellation point of the multi-dimensional modulation constellation.

Aspect 47: The apparatus of any of aspects 39-46, where the instructions to transmit the indication of the resource mapping scheme are executable by the processor to cause the apparatus to: transmit an indication of a constellation size for one or more of the set of multiple coding indices.

Aspect 48: The apparatus of any of aspects 39-47, where the instructions to transmit the indication of the resource mapping scheme are executable by the processor to cause the apparatus to: transmit an indication of a first constellation size for a first set of one or more spatial layers; and transmit an indication of a second constellation size for a second set of one or more layers that is different than the first set of one or more spatial layers.

Aspect 49: The apparatus of any of aspects 39-48, where each coding index of the set of multiple coding indices corresponding to a cumulative encoding of a respective quantity of message segments.

Aspect 50: The apparatus of any of aspects 39-49, where each coding index of the set of multiple coding indices corresponds to a different coding rate of the rateless coding.

Aspect 51: An apparatus for wireless communication at a wireless device, including: means for receiving an indication of a resource mapping scheme associated with a rateless coding, where the rateless coding is associated with a set of multiple coding indices, where the resource mapping scheme indicates a respective set of communications resources for at least one coding index of the set of multiple coding indices; and means for receiving a message encoded in accordance with the rateless coding, where the message is received via the respective set of communications resources for a coding index of the set of multiple coding indices.

Aspect 52: The apparatus of aspect 51, where the means for receiving the indication of the resource mapping scheme include: means for receiving an indication that each coding index of the set of multiple coding indices is associated with a real component and an imaginary component of a modulation constellation.

Aspect 53: The apparatus of aspect 51, where the means for receiving the indication of the resource mapping scheme include: means for receiving an indication that each coding index of a first subset of the set of multiple coding indices is associated with a real component of a modulation constellation and that each coding index of a second subset of the set of multiple coding indices is associated with an imaginary component of the modulation constellation.

Aspect 54: The apparatus of any of aspects 51-53, where the means for receiving the indication of the resource mapping scheme include: means for receiving an indication that each coding index of the set of multiple coding indices is associated with a set of multiple spatial layers.

Aspect 55: The apparatus of any of aspects 51-53, where the means for receiving the indication of the resource mapping scheme include: means for receiving an indication that each coding index of a first subset of the set of multiple coding indices is associated with a first set of one or more spatial layers and that each coding index of a second subset of the set of multiple coding indices is associated with a second set of one or more spatial layers.

Aspect 56: The apparatus of aspect 55, where the means for receiving the signaling associated with the message encoded in accordance with the rateless coding include: means for receiving, over a symbol duration and in accordance with the first set of one or more spatial layers, a first transmission of a first set of segments of the message that are encoded in accordance with a first coding index of the first subset; and means for receiving, over the symbol duration and in accordance with the second set of one or more spatial layers, a second transmission of a second set of segments of the message that are encoded in accordance with a second coding index of the second subset.

Aspect 57: The apparatus of any of aspects 51-56, where the means for receiving the indication of the resource mapping scheme include: means for receiving an indication that two or more coding indices of the set of multiple coding indices are associated with a combined mapping to a multi-dimensional modulation constellation.

Aspect 58: The apparatus of aspect 57, where the means for receiving the message include: means for determining, from a measured constellation point of the multi-dimensional modulation constellation, a first estimated symbol value corresponding to a first quantity of message segments of the message encoded in accordance with a first coding index of the set of multiple coding indices; means for determining, from the measured constellation point, a second estimated symbol value corresponding to a second quantity of message segments of the message encoded in accordance with a second coding index of the set of multiple coding indices; means for evaluating first decoding hypotheses for the first coding index based on the first estimated symbol value and a first decoding metric; and means for evaluating second decoding hypotheses for the second coding index based on the second estimated symbol value and a second decoding metric that is different than the second decoding metric.

Aspect 59: The apparatus of any of aspects 51-58, where the means for receiving the message include: means for attempting to decode one or more signals associated with the message using a decoder metric calculated in accordance with the received indication of the resource mapping scheme.

Aspect 60: The apparatus of any of aspects 51-59, where the means for receiving the indication of the resource mapping scheme include: means for receiving an indication of a constellation size for one or more of the set of multiple coding indices.

Aspect 61: The apparatus of any of aspects 51-60, where the means for receiving the indication of the resource mapping scheme include: means for receiving an indication of a first constellation size for a first set of one or more spatial layers; and means for receiving an indication of a second constellation size for a second set of one or more layers that is different than the first set of one or more spatial layers.

Aspect 62: The apparatus of any of aspects 51-61, where each coding index of the set of multiple coding indices corresponding to a cumulative encoding of a respective quantity of message segments.

Aspect 63: The apparatus of any of aspects 51-62, where each coding index of the set of multiple coding indices corresponds to a different coding rate of the rateless coding.

Aspect 64: An apparatus for wireless communication at a wireless device, including: means for transmitting an indication of a resource mapping scheme associated with a rateless coding, where the rateless coding is associated with a set of multiple coding indices, and where the resource mapping scheme indicates a respective set of communications resources for at least one coding index of the set of multiple coding indices; and means for transmitting a message encoded in accordance with the rateless coding, where the message is transmitted using the respective set of communications resources for a coding index of the set of multiple coding indices.

Aspect 65: The apparatus of aspect 64, where the means for transmitting the indication of the resource mapping scheme include: means for transmitting an indication that each coding index of the set of multiple coding indices is associated with a real component and an imaginary component of a modulation constellation.

Aspect 66: The apparatus of aspect 64, where the means for transmitting the indication of the resource mapping scheme include: means for transmitting an indication that each coding index of a first subset of the set of multiple coding indices is associated with a real component of a modulation constellation and that each coding index of a second subset of the set of multiple coding indices is associated with an imaginary component of the modulation constellation.

Aspect 67: The apparatus of any of aspects 64-66, where the means for transmitting the indication of the resource mapping scheme include: means for transmitting an indication that each coding index of the set of multiple coding indices is associated with a set of multiple spatial layers.

Aspect 68: The apparatus of any of aspects 64-66, where the means for transmitting the indication of the resource mapping scheme include: means for transmitting an indication that each coding index of a first subset of the set of multiple coding indices is associated with a first set of one or more spatial layers and that each coding index of a second subset of the set of multiple coding indices is associated with a second set of one or more spatial layers.

Aspect 69: The apparatus of aspect 68, where the means for transmitting the signaling associated with the message encoded in accordance with the rateless coding include: means for transmitting, over a symbol duration and in accordance with the first set of one or more spatial layers, a first transmission of a first set of segments of the message that are encoded in accordance with a first coding index of the first subset; and means for transmitting, over the symbol duration and in accordance with the second set of one or more spatial layers, a second transmission of a second set of segments of the message that are encoded in accordance with a second coding index of the second subset.

Aspect 70: The apparatus of any of aspects 64-69, where the means for transmitting the indication of the resource mapping scheme include: means for transmitting an indication that two or more coding indices of the set of multiple coding indices are associated with a combined mapping to constellation points of a multi-dimensional modulation constellation.

Aspect 71: The apparatus of aspect 70, where the means for transmitting the message include: means for determining a first encoded symbol value corresponding to a first quantity of message segments of the message encoded in accordance with a first coding index of the set of multiple coding indices; means for determining a second encoded symbol value corresponding to a second quantity of message segments of the message encoded in accordance with a second coding index of the set of multiple coding indices; and means for mapping a linear combination of the first encoded symbol value and the second encoded symbol value to a constellation point of the multi-dimensional modulation constellation.

Aspect 72: The apparatus of any of aspects 64-71, where the means for transmitting the indication of the resource mapping scheme include: means for transmitting an indication of a constellation size for one or more of the set of multiple coding indices.

Aspect 73: The apparatus of any of aspects 64-72, where the means for transmitting the indication of the resource mapping scheme include: means for transmitting an indication of a first constellation size for a first set of one or more spatial layers; and means for transmitting an indication of a second constellation size for a second set of one or more layers that is different than the first set of one or more spatial layers.

Aspect 74: The apparatus of any of aspects 64-73, where each coding index of the set of multiple coding indices corresponding to a cumulative encoding of a respective quantity of message segments.

Aspect 75: The apparatus of any of aspects 64-74, where each coding index of the set of multiple coding indices corresponds to a different coding rate of the rateless coding.

Aspect 76: A non-transitory computer-readable medium storing code for wireless communication at a wireless device, the code including instructions executable by a processor to: receive an indication of a resource mapping scheme associated with a rateless coding, where the rateless coding is associated with a set of multiple coding indices, where the resource mapping scheme indicates a respective set of communications resources for at least one coding index of the set of multiple coding indices; and receive a message encoded in accordance with the rateless coding, where the message is received via the respective set of communications resources for a coding index of the set of multiple coding indices.

Aspect 77: The non-transitory computer-readable medium of aspect 76, where the instructions to receive the indication of the resource mapping scheme are executable by the processor to: receive an indication that each coding index of the set of multiple coding indices is associated with a real component and an imaginary component of a modulation constellation.

Aspect 78: The non-transitory computer-readable medium of aspect 76, where the instructions to receive the indication of the resource mapping scheme are executable by the processor to: receive an indication that each coding index of a first subset of the set of multiple coding indices is associated with a real component of a modulation constellation and that each coding index of a second subset of the set of multiple coding indices is associated with an imaginary component of the modulation constellation.

Aspect 79: The non-transitory computer-readable medium of any of aspects 76-78, where the instructions to receive the indication of the resource mapping scheme are executable by the processor to: receive an indication that each coding index of the set of multiple coding indices is associated with a set of multiple spatial layers.

Aspect 80: The non-transitory computer-readable medium of any of aspects 76-78, where the instructions to receive the indication of the resource mapping scheme are executable by the processor to: receive an indication that each coding index of a first subset of the set of multiple coding indices is associated with a first set of one or more spatial layers and that each coding index of a second subset of the set of multiple coding indices is associated with a second set of one or more spatial layers.

Aspect 81: The non-transitory computer-readable medium of aspect 80, where the instructions to receive the signaling associated with the message encoded in accordance with the rateless coding are executable by the processor to: receive, over a symbol duration and in accordance with the first set of one or more spatial layers, a first transmission of a first set of segments of the message that are encoded in accordance with a first coding index of the first subset; and receive, over the symbol duration and in accordance with the second set of one or more spatial layers, a second transmission of a second set of segments of the message that are encoded in accordance with a second coding index of the second subset.

Aspect 82: The non-transitory computer-readable medium of any of aspects 76-81, where the instructions to receive the indication of the resource mapping scheme are executable by the processor to: receive an indication that two or more coding indices of the set of multiple coding indices are associated with a combined mapping to a multi-dimensional modulation constellation.

Aspect 83: The non-transitory computer-readable medium of aspect 82, where the instructions to receive the message are executable by the processor to: determine, from a measured constellation point of the multi-dimensional modulation constellation, a first estimated symbol value corresponding to a first quantity of message segments of the message encoded in accordance with a first coding index of the set of multiple coding indices; determine, from the measured constellation point, a second estimated symbol value corresponding to a second quantity of message segments of the message encoded in accordance with a second coding index of the set of multiple coding indices; evaluate first decoding hypotheses for the first coding index based on the first estimated symbol value and a first decoding metric; and evaluate second decoding hypotheses for the second coding index based on the second estimated symbol value and a second decoding metric that is different than the second decoding metric.

Aspect 84: The non-transitory computer-readable medium of any of aspects 76-83, where the instructions to receive the message are executable by the processor to: attempt to decode one or more signals associated with the message using a decoder metric calculated in accordance with the received indication of the resource mapping scheme.

Aspect 85: The non-transitory computer-readable medium of any of aspects 76-84, where the instructions to receive the indication of the resource mapping scheme are executable by the processor to: receive an indication of a constellation size for one or more of the set of multiple coding indices.

Aspect 86: The non-transitory computer-readable medium of any of aspects 76-85, where the instructions to receive the indication of the resource mapping scheme are executable by the processor to: receive an indication of a first constellation size for a first set of one or more spatial layers; and receive an indication of a second constellation size for a second set of one or more layers that is different than the first set of one or more spatial layers.

Aspect 87: The non-transitory computer-readable medium of any of aspects 76-86, where each coding index of the set of multiple coding indices corresponding to a cumulative encoding of a respective quantity of message segments.

Aspect 88: The non-transitory computer-readable medium of any of aspects 76-87, where each coding index of the set of multiple coding indices corresponds to a different coding rate of the rateless coding.

Aspect 89: A non-transitory computer-readable medium storing code for wireless communication at a wireless device, the code including instructions executable by a processor to: transmit an indication of a resource mapping scheme associated with a rateless coding, where the rateless coding is associated with a set of multiple coding indices, and where the resource mapping scheme indicates a respective set of communications resources for at least one coding index of the set of multiple coding indices; and transmit a message encoded in accordance with the rateless coding, where the message is transmitted using the respective set of communications resources for a coding index of the set of multiple coding indices.

Aspect 90: The non-transitory computer-readable medium of aspect 89, where the instructions to transmit the indication of the resource mapping scheme are executable by the processor to: transmit an indication that each coding index of the set of multiple coding indices is associated with a real component and an imaginary component of a modulation constellation.

Aspect 91: The non-transitory computer-readable medium of aspect 89, where the instructions to transmit the indication of the resource mapping scheme are executable by the processor to: transmit an indication that each coding index of a first subset of the set of multiple coding indices is associated with a real component of a modulation constellation and that each coding index of a second subset of the set of multiple coding indices is associated with an imaginary component of the modulation constellation.

Aspect 92: The non-transitory computer-readable medium of any of aspects 89-91, where the instructions to transmit the indication of the resource mapping scheme are executable by the processor to: transmit an indication that each coding index of the set of multiple coding indices is associated with a set of multiple spatial layers.

Aspect 93: The non-transitory computer-readable medium of any of aspects 89-91, where the instructions to transmit the indication of the resource mapping scheme are executable by the processor to: transmit an indication that each coding index of a first subset of the set of multiple coding indices is associated with a first set of one or more spatial layers and that each coding index of a second subset of the set of multiple coding indices is associated with a second set of one or more spatial layers.

Aspect 94: The non-transitory computer-readable medium of aspect 93, where the instructions to transmit the signaling associated with the message encoded in accordance with the rateless coding are executable by the processor to: transmit, over a symbol duration and in accordance with the first set of one or more spatial layers, a first transmission of a first set of segments of the message that are encoded in accordance with a first coding index of the first subset; and transmit, over the symbol duration and in accordance with the second set of one or more spatial layers, a second transmission of a second set of segments of the message that are encoded in accordance with a second coding index of the second subset.

Aspect 95: The non-transitory computer-readable medium of any of aspects 89-94, where the instructions to transmit the indication of the resource mapping scheme are executable by the processor to: transmit an indication that two or more coding indices of the set of multiple coding indices are associated with a combined mapping to constellation points of a multi-dimensional modulation constellation.

Aspect 96: The non-transitory computer-readable medium of aspect 95, where the instructions to transmit the message are executable by the processor to: determine a first encoded symbol value corresponding to a first quantity of message segments of the message encoded in accordance with a first coding index of the set of multiple coding indices; determine a second encoded symbol value corresponding to a second quantity of message segments of the message encoded in accordance with a second coding index of the set of multiple coding indices; and map a linear combination of the first encoded symbol value and the second encoded symbol value to a constellation point of the multi-dimensional modulation constellation.

Aspect 97: The non-transitory computer-readable medium of any of aspects 89-96, where the instructions to transmit the indication of the resource mapping scheme are executable by the processor to: transmit an indication of a constellation size for one or more of the set of multiple coding indices.

Aspect 98: The non-transitory computer-readable medium of any of aspects 89-97, where the instructions to transmit the indication of the resource mapping scheme are executable by the processor to: transmit an indication of a first constellation size for a first set of one or more spatial layers; and transmit an indication of a second constellation size for a second set of one or more layers that is different than the first set of one or more spatial layers.

Aspect 99: The non-transitory computer-readable medium of any of aspects 89-98, where each coding index of the set of multiple coding indices corresponding to a cumulative encoding of a respective quantity of message segments.

Aspect 100: The non-transitory computer-readable medium of any of aspects 89-99, where each coding index of the set of multiple coding indices corresponds to a different coding rate of the rateless coding.

Aspect 101: An apparatus for wireless communication at a wireless device, including: an interface configured to: obtain an indication of a resource mapping scheme associated with a rateless coding, where the rateless coding is associated with a set of multiple coding indices, where the resource mapping scheme indicates a respective set of communications resources for at least one coding index of the set of multiple coding indices; and obtain a message encoded in accordance with the rateless coding, where the message is obtained via the respective set of communications resources for a coding index of the set of multiple coding indices.

Aspect 102: The apparatus of aspect 101, where, to obtain the indication of the resource mapping scheme, the interface is further configured to: obtain an indication that each coding index of the set of multiple coding indices is associated with a real component and an imaginary component of a modulation constellation.

Aspect 103: The apparatus of aspect 101, where, to obtain the indication of the resource mapping scheme, the interface is further configured to: obtain an indication that each coding index of a first subset of the set of multiple coding indices is associated with a real component of a modulation constellation and that each coding index of a second subset of the set of multiple coding indices is associated with an imaginary component of the modulation constellation.

Aspect 104: The apparatus of any of aspects 101-103, where, to obtain the indication of the resource mapping scheme, the interface is further configured to: obtain an indication that each coding index of the set of multiple coding indices is associated with a set of multiple spatial layers.

Aspect 105: The apparatus of any of aspects 101-103, where, to obtain the indication of the resource mapping scheme, the interface is further configured to: obtain an indication that each coding index of a first subset of the set of multiple coding indices is associated with a first set of one or more spatial layers and that each coding index of a second subset of the set of multiple coding indices is associated with a second set of one or more spatial layers.

Aspect 106: The apparatus of aspect 105, where, to obtain the message, the interface is further configured to: obtain, over a symbol duration and in accordance with the first set of one or more spatial layers, a first transmission of a first set of segments of the message that are encoded in accordance with a first coding index of the first subset; and obtain, over the symbol duration and in accordance with the second set of one or more spatial layers, a second transmission of a second set of segments of the message that are encoded in accordance with a second coding index of the second subset.

Aspect 107: The apparatus of any of aspects 101-106, where, to obtain the indication of the resource mapping scheme, the interface is further configured to: obtain an indication that two or more coding indices of the set of multiple coding indices are associated with a combined mapping to a multi-dimensional modulation constellation.

Aspect 108: The apparatus of aspect 107, where, to obtain the message, a processing system is configured to: determine, from a measured constellation point of the multi-dimensional modulation constellation, a first estimated symbol value corresponding to a first quantity of message segments of the message encoded in accordance with a first coding index of the set of multiple coding indices; determine, from the measured constellation point, a second estimated symbol value corresponding to a second quantity of message segments of the message encoded in accordance with a second coding index of the set of multiple coding indices; evaluate first decoding hypotheses for the first coding index based on the first estimated symbol value and a first decoding metric; and evaluate second decoding hypotheses for the second coding index based on the second estimated symbol value and a second decoding metric that is different than the second decoding metric.

Aspect 109: The apparatus of any of aspects 101-108, where, to obtain the message, a processing system is configured to: attempt to decode one or more signals associated with the message using a decoder metric calculated in accordance with the obtained indication of the resource mapping scheme.

Aspect 110: The apparatus of any of aspects 101-109, where, to obtain the indication of the resource mapping scheme, the interface is further configured to: obtain an indication of a constellation size for one or more of the set of multiple coding indices.

Aspect 111: The apparatus of any of aspects 101-110, where, to obtain the indication of the resource mapping scheme, the interface is further configured to: obtain an indication of a first constellation size for a first set of one or more spatial layers; and obtain an indication of a second constellation size for a second set of one or more layers that is different than the first set of one or more spatial layers.

Aspect 112: The apparatus of any of aspects 101-111, where each coding index of the set of multiple coding indices corresponding to a cumulative encoding of a respective quantity of message segments.

Aspect 113: The apparatus of any of aspects 101-112, where each coding index of the set of multiple coding indices corresponds to a different coding rate of the rateless coding.

Aspect 114: An apparatus for wireless communication at a wireless device, including: an interface configured to: output an indication of a resource mapping scheme associated with a rateless coding, where the rateless coding is associated with a set of multiple coding indices, and where the resource mapping scheme indicates a respective set of communications resources for at least one coding index of the set of multiple coding indices; and output a message encoded in accordance with the rateless coding, where the message is output using the respective set of communications resources for a coding index of the set of multiple coding indices.

Aspect 115: The apparatus of aspect 114, where, to output the indication of the resource mapping scheme, the interface is further configured to: output an indication that each coding index of the set of multiple coding indices is associated with a real component and an imaginary component of a modulation constellation.

Aspect 116: The apparatus of aspect 114, where, to output the indication of the resource mapping scheme, the interface is further configured to: output an indication that each coding index of a first subset of the set of multiple coding indices is associated with a real component of a modulation constellation and that each coding index of a second subset of the set of multiple coding indices is associated with an imaginary component of the modulation constellation.

Aspect 117: The apparatus of any of aspects 114-116, where, to output the indication of the resource mapping scheme, the interface is further configured to: output an indication that each coding index of the set of multiple coding indices is associated with a set of multiple spatial layers.

Aspect 118: The apparatus of any of aspects 114-116, where, to output the indication of the resource mapping scheme, the interface is further configured to: output an indication that each coding index of a first subset of the set of multiple coding indices is associated with a first set of one or more spatial layers and that each coding index of a second subset of the set of multiple coding indices is associated with a second set of one or more spatial layers.

Aspect 119: The apparatus of aspect 118, where, to output the message, the interface is further configured to: output, over a symbol duration and in accordance with the first set of one or more spatial layers, a first transmission of a first set of segments of the message that are encoded in accordance with a first coding index of the first subset; and output, over the symbol duration and in accordance with the second set of one or more spatial layers, a second transmission of a second set of segments of the message that are encoded in accordance with a second coding index of the second subset.

Aspect 120: The apparatus of any of aspects 114-119, where, to output the indication of the resource mapping scheme, the interface is further configured to: output an indication that two or more coding indices of the set of multiple coding indices are associated with a combined mapping to constellation points of a multi-dimensional modulation constellation.

Aspect 121: The apparatus of aspect 120, where, to output the message, a processing system is configured to: determine a first encoded symbol value corresponding to a first quantity of message segments of the message encoded in accordance with a first coding index of the set of multiple coding indices; determine a second encoded symbol value corresponding to a second quantity of message segments of the message encoded in accordance with a second coding index of the set of multiple coding indices; and map a linear combination of the first encoded symbol value and the second encoded symbol value to a constellation point of the multi-dimensional modulation constellation.

Aspect 122: The apparatus of any of aspects 114-121, where, to output the indication of the resource mapping scheme, the interface is further configured to: output an indication of a constellation size for one or more of the set of multiple coding indices.

Aspect 123: The apparatus of any of aspects 114-122, where, to output the indication of the resource mapping scheme, the interface is further configured to: output an indication of a first constellation size for a first set of one or more spatial layers; and output an indication of a second constellation size for a second set of one or more layers that is different than the first set of one or more spatial layers.

Aspect 124: The apparatus of any of aspects 114-123, where each coding index of the set of multiple coding indices corresponding to a cumulative encoding of a respective quantity of message segments.

Aspect 125: The apparatus of any of aspects 114-124, where each coding index of the set of multiple coding indices corresponds to a different coding rate of the rateless coding.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a wireless device, comprising:
a processing system that includes one or more processors and one or more memories coupled with the one or more processors, the processing system configured to cause the apparatus to:
obtain an indication of a resource mapping scheme associated with a rateless coding, the rateless coding associated with a plurality of coding indices each corresponding to a cumulative encoding of a respective quantity of message segments and each mapped to a real component, or an imaginary component, or a combination thereof of a respective modulation constellation in accordance with the resource mapping scheme, each coding index of a first subset of the plurality of coding indices mapped to a first set of one or more spatial layers, and each coding index of a second subset of the plurality of coding indices mapped to a second set of one or more spatial layers different than the first set of one or more spatial layers, the resource mapping scheme indicating a respective set of communications resources for at least one coding index of the plurality of coding indices; and
obtain a message encoded in accordance with the rateless coding, the message obtained via the respective set of communications resources for a coding index of the plurality of coding indices.

2. The apparatus of claim 1, wherein the processing system is further configured to cause the apparatus to:
obtain an indication that each coding index of the plurality of coding indices is associated with a plurality of spatial layers.

3. The apparatus of claim 1, wherein the processing system is further configured to cause the apparatus to:
obtain, over a symbol duration and in accordance with the first set of one or more spatial layers, a first transmission of a first set of segments of the message that are encoded in accordance with a first coding index of the first subset; and
obtain, over the symbol duration and in accordance with the second set of one or more spatial layers, a second transmission of a second set of segments of the message that are encoded in accordance with a second coding index of the second subset.

4. The apparatus of claim 1, wherein the processing system is further configured to cause the apparatus to:
obtain an indication that two or more coding indices of the plurality of coding indices are associated with a combined mapping to a multi-dimensional modulation constellation.

5. The apparatus of claim 4, wherein the processing system is further configured to cause the apparatus to:
evaluate first decoding hypotheses for a first coding index in accordance with a first estimated symbol value and a first decoding metric, the first estimated symbol value associated with a measured constellation point of the multi-dimensional modulation constellation and corresponding to a first quantity of message segments of the message encoded in accordance with the first coding index of the plurality of coding indices; and
evaluate second decoding hypotheses for a second coding index in accordance with a second estimated symbol value and a second decoding metric that is different than the first decoding metric, the second estimated symbol value associated with the measured constellation point and corresponding to a second quantity of message segments of the message encoded in accordance with the second coding index of the plurality of coding indices.

6. The apparatus of claim 1, wherein the processing system is further configured to cause the apparatus to:
attempt to decode one or more signals associated with the message using a decoder metric calculated in accordance with the indication of the resource mapping scheme.

7. The apparatus of claim 1, wherein the processing system is further configured to cause the apparatus to:
obtain an indication of a constellation size for one or more of the plurality of coding indices.

8. The apparatus of claim 1, wherein the processing system is further configured to cause the apparatus to:
obtain an indication of a first constellation size for the first set of one or more spatial layers; and
obtain an indication of a second constellation size for the second set of one or more spatial layers.

9. The apparatus of claim 1, wherein the first set of one or more spatial layers includes a first plurality of spatial layers and the second set of one or more spatial layers includes a second plurality of spatial layers.

10. An apparatus for wireless communication at a wireless device, comprising:
a processing system that includes one or more processors and one or more memories coupled with the one or more processors, the processing system configured to cause the apparatus to:
output an indication of a resource mapping scheme associated with a rateless coding, the rateless coding associated with a plurality of coding indices each corresponding to a cumulative encoding of a respective quantity of message segments and each mapped to a real component, or an imaginary component, or a combination thereof of a respective modulation constellation in accordance with the resource mapping scheme, each coding index of a first subset of the plurality of coding indices mapped to a first set of one or more spatial layers, and each coding index of a second subset of the plurality of coding indices mapped to a second set of one or more spatial layers different than the first set of one or more spatial layers, the resource mapping scheme indicating a respective set of communications resources for at least one coding index of the plurality of coding indices; and output a message encoded in accordance with the rateless coding, the message output using the respective set of communications resources for a coding index of the plurality of coding indices.

11. The apparatus of claim 10, wherein the processing system is further configured to cause the apparatus to:
output an indication that each coding index of the plurality of coding indices is associated with a plurality of spatial layers.

12. The apparatus of claim 10, wherein the processing system is further configured to cause the apparatus to:
output, over a symbol duration and in accordance with the first set of one or more spatial layers, a first transmission of a first set of segments of the message that are encoded in accordance with a first coding index of the first subset; and
output, over the symbol duration and in accordance with the second set of one or more spatial layers, a second transmission of a second set of segments of the message that are encoded in accordance with a second coding index of the second subset.

13. The apparatus of claim 10, wherein the processing system is further configured to cause the apparatus to:
output an indication that two or more coding indices of the plurality of coding indices are associated with a combined mapping to constellation points of a multi-dimensional modulation constellation.

14. The apparatus of claim 13, wherein the processing system is further configured to cause the apparatus to:
map a linear combination of a first encoded symbol value and a second encoded symbol value to a constellation point of the multi-dimensional modulation constellation, the first encoded symbol value corresponding to a first quantity of message segments of the message encoded in accordance with a first coding index of the plurality of coding indices, and the second encoded symbol value corresponding to a second quantity of message segments of the message encoded in accordance with a second coding index of the plurality of coding indices.

15. The apparatus of claim 10, wherein the processing system is further configured to cause the apparatus to:
output an indication of a constellation size for one or more of the plurality of coding indices.

16. The apparatus of claim 10, wherein the processing system is further configured to cause the apparatus to:
output an indication of a first constellation size for the first set of one or more spatial layers; and
output an indication of a second constellation size for the second set of one or more spatial layers that is different than the first set of one or more spatial layers.

17. The apparatus of claim 10, wherein the first set of one or more spatial layers includes a first plurality of spatial layers and the second set of one or more spatial layers includes a second plurality of spatial layers.

18. A method for wireless communication at a wireless device, comprising:
receiving an indication of a resource mapping scheme associated with a rateless coding, the rateless coding associated with a plurality of coding indices each corresponding to a cumulative encoding of a respective quantity of message segments and each mapped to a real component, or an imaginary component, or a combination thereof of a respective modulation constellation in accordance with the resource mapping scheme, each coding index of a first subset of the plurality of coding indices mapped to a first set of one or more spatial layers, and each coding index of a second subset of the plurality of coding indices mapped to a second set of one or more spatial layers different than the first set of one or more spatial layers, the resource mapping scheme indicating a respective set of communications resources for at least one coding index of the plurality of coding indices; and receiving a message encoded in accordance with the rateless coding, the message received via the respective set of communications resources for a coding index of the plurality of coding indices.

19. The method of claim 18, wherein receiving the indication of the resource mapping scheme comprises:
receiving an indication that each coding index of the plurality of coding indices is associated with a plurality of spatial layers.

20. The method of claim 18, wherein receiving the message comprises:
receiving, over a symbol duration and in accordance with the first set of one or more spatial layers, a first transmission of a first set of segments of the message that are encoded in accordance with a first coding index of the first subset; and
receiving, over the symbol duration and in accordance with the second set of one or more spatial layers, a second transmission of a second set of segments of the message that are encoded in accordance with a second coding index of the second subset.

21. The method of claim 18, wherein the first set of one or more spatial layers includes a first plurality of spatial layers and the second set of one or more spatial layers includes a second plurality of spatial layers.

22. A method for wireless communication at a wireless device, comprising:
transmitting an indication of a resource mapping scheme associated with a rateless coding, the rateless coding associated with a plurality of coding indices each corresponding to a cumulative encoding of a respective quantity of message segments and each mapped to a real component, or an imaginary component, or a combination thereof of a respective modulation constellation in accordance with the resource mapping scheme, each coding index of a first subset of the plurality of coding indices mapped to a first set of one or more spatial layers, and each coding index of a second subset of the plurality of coding indices mapped to a second set of one or more spatial layers different than the first set of one or more spatial layers, the resource mapping scheme indicating a respective set of communications resources for at least one coding index of the plurality of coding indices; and transmitting a message encoded in accordance with the rateless coding, the message transmitted using the respective set of communications resources for a coding index of the plurality of coding indices.

23. The method of claim 22, wherein transmitting the indication of the resource mapping scheme comprises:
transmitting an indication that each coding index of the plurality of coding indices is associated with a plurality of spatial layers.

24. The method of claim 22, wherein the first set of one or more spatial layers includes a first plurality of spatial layers and the second set of one or more spatial layers includes a second plurality of spatial layers.

* * * * *